United States Patent [19]

Seto et al.

[11] Patent Number: 5,581,358
[45] Date of Patent: Dec. 3, 1996

[54] INFORMATION RECORDING APPARATUS WITH SMOOTHING PROCESSING VIA PIXEL FEATURE DETECTION AND RECORDING DENSITY VARIATION AND TONER CONSERVATION

[75] Inventors: Kaoru Seto, Chigasaki; Atsushi Kashihara, Hachioji, both of Japan

[73] Assignee: Canon Kabushiki Kaisha, Tokyo, Japan

[21] Appl. No.: 257,381

[22] Filed: Jun. 9, 1994

[30] Foreign Application Priority Data

Jun. 14, 1993 [JP] Japan .................. 5-142015

[51] Int. Cl.6 ............................................ H04N 1/46
[52] U.S. Cl. ........................... 358/298; 358/534
[58] Field of Search ........................ 358/298, 300, 358/532–534; 382/264, 269; 347/161, 254; 395/147

[56] References Cited

U.S. PATENT DOCUMENTS

| | | | |
|---|---|---|---|
| 5,304,988 | 4/1994 | Seto | 341/141 |
| 5,381,522 | 1/1995 | Seto et al. | 395/143 |
| 5,465,157 | 11/1995 | Seto et al. | 358/298 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

This invention provides an information recording apparatus, which can save the consumption amount of a toner without thinning out an image in units of pixels, and can realize smoothing processing with high image quality. In input data, a pixel corresponding to an edge portion is subjected to smoothing processing. Data of a black pixel which is not subjected to smoothing processing is recorded while saving toner by controlling the print pulse width or the print pulse number upon recording of the black pixel on the basis of a print density command.

10 Claims, 62 Drawing Sheets

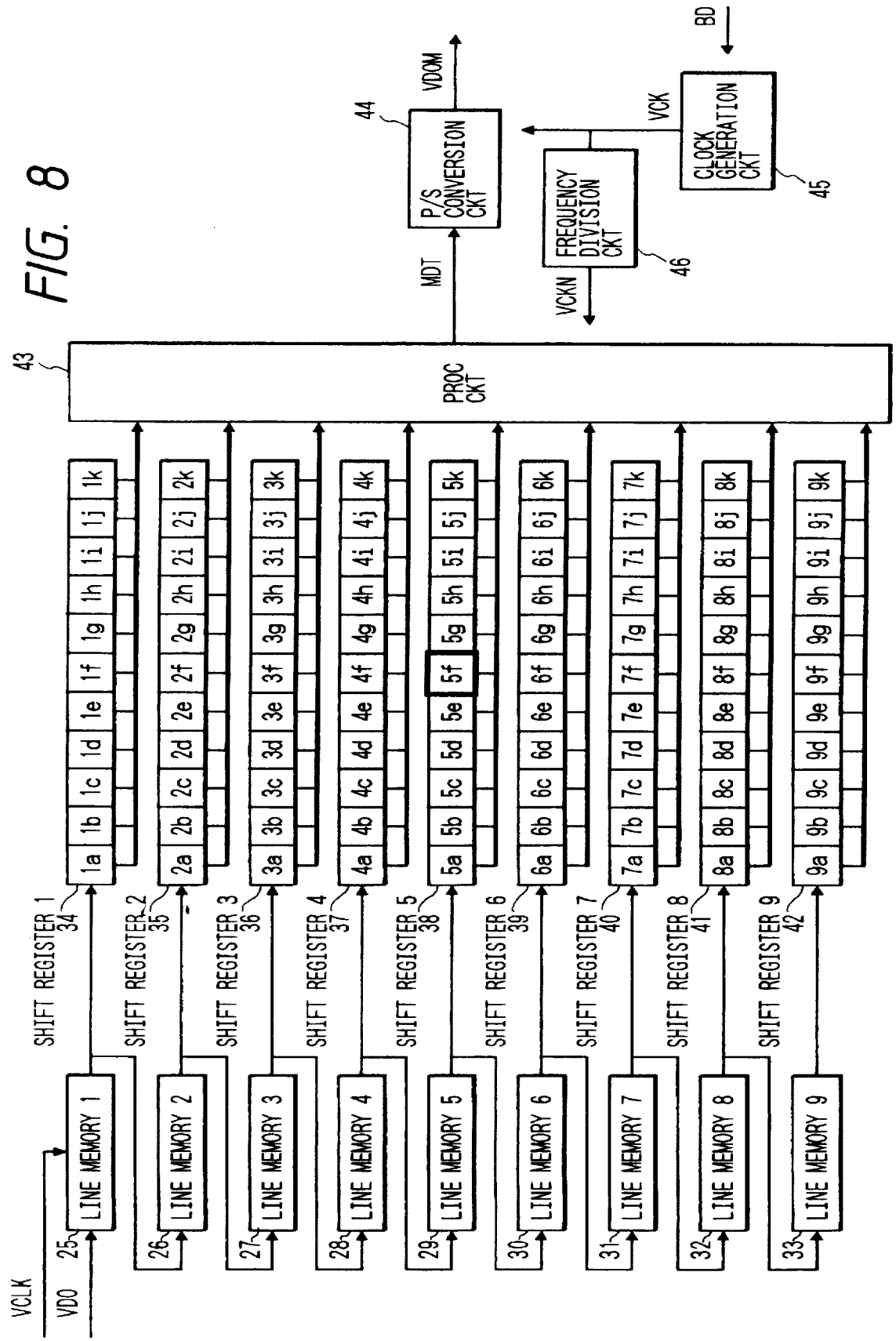

ORIGINAL PIXEL

MODIFIED PIXEL SIZE

MODIFIED PIXEL SIZE

MODIFIED PIXEL SIZE

FIG. 11A
FIG. 11B
FIG. 12
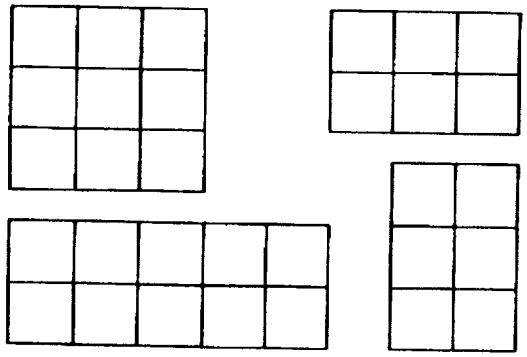
MOVEMEMT REFERENCE SMALL WINDOW
CHECK DOTS WITHIN LEFT-MENTIONED AREAS
IN A CASE WHERE ALL DOTS ARE THE SAME : $X_n=0$ OR $Y_n=0$
IN A CASE WHERE EVEN ONE DOT IS DIFFERENT : $X_n=1$ OR $Y_n=1$

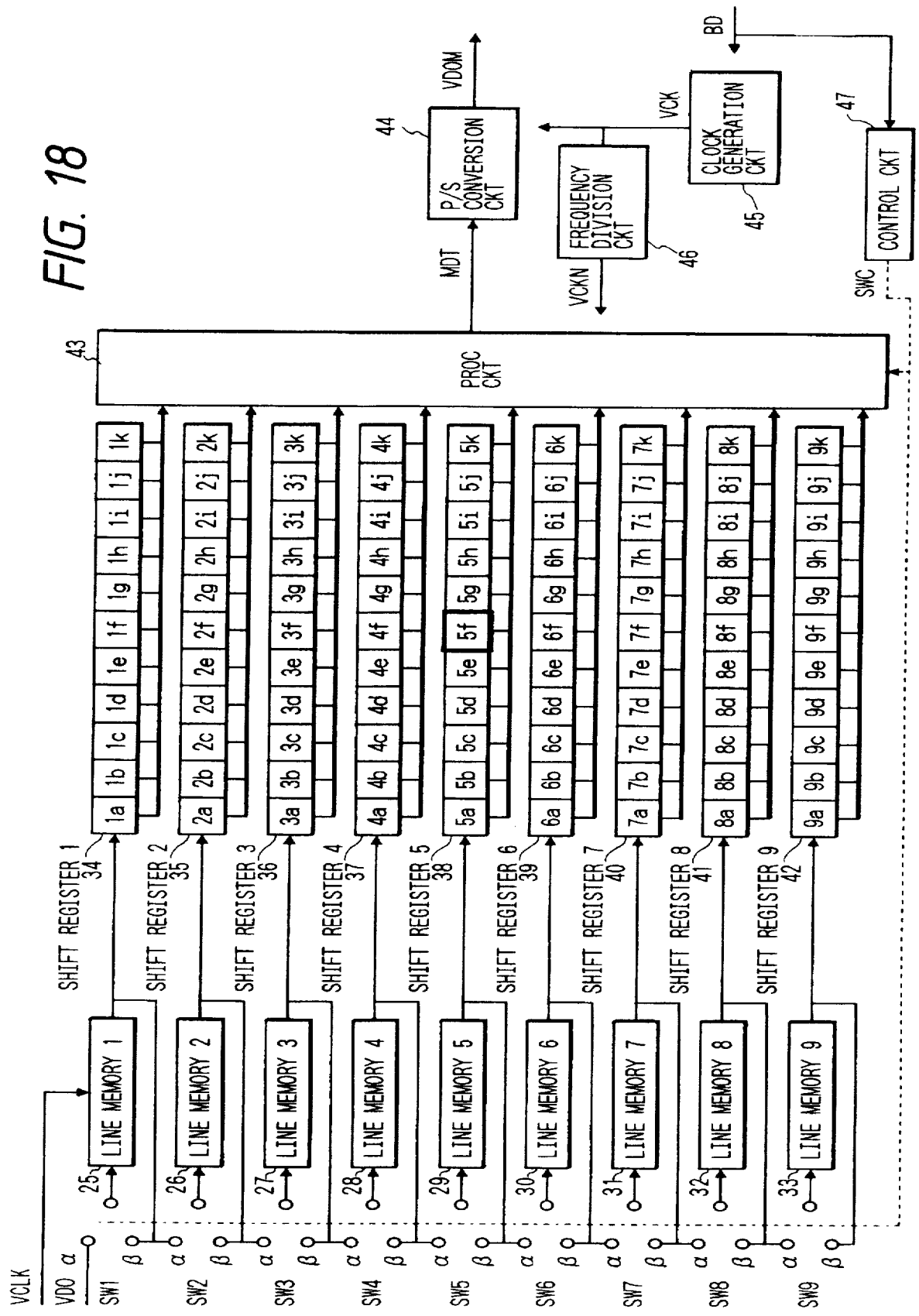

FIG. 23A
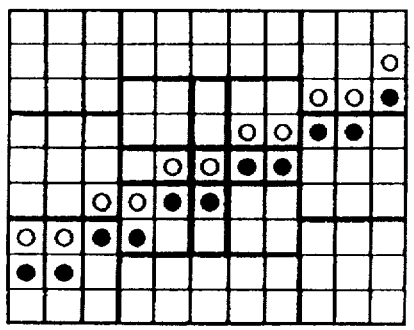 
FIG. 23C
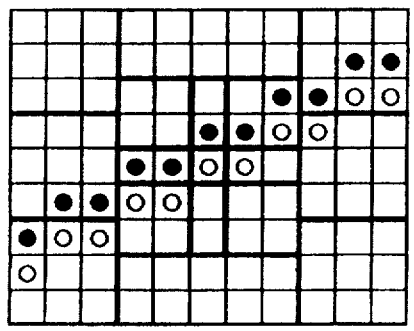
FIG. 23B
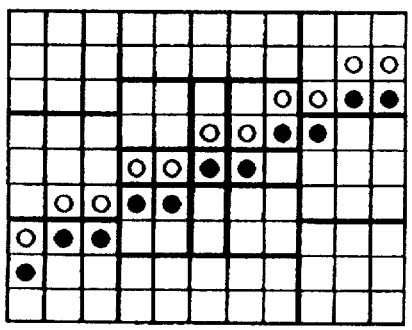 
FIG. 23D
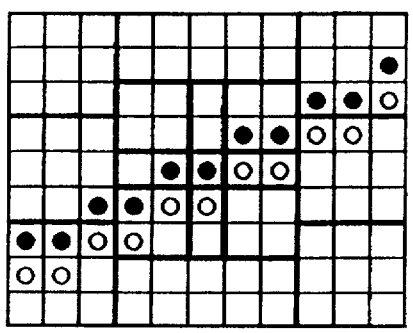
FIG. 24
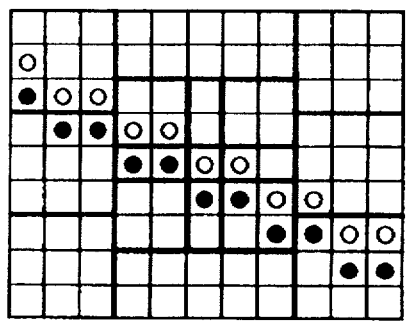 

FIG. 25A
FIG. 25B
- X5=X2=0
- AT LEAST ONE OF Y1 TO Y8, X3, X4 IS "0"
THEN
FIG. 25C
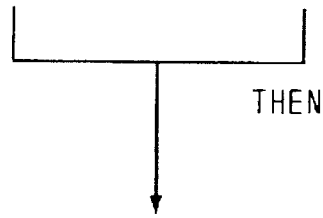
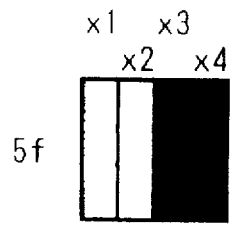

FIG. 26A
FIG. 26B
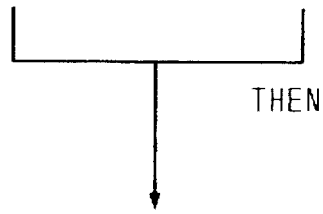
- X1 = 0
- AT LEAST ONE OF Y1 TO Y8, X7, X3, X4 IS "0"
THEN
FIG. 26C
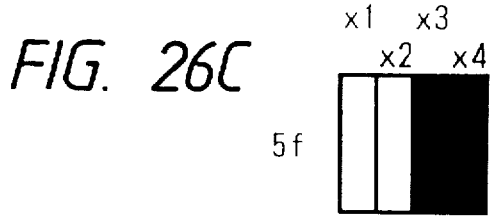

FIG. 27A
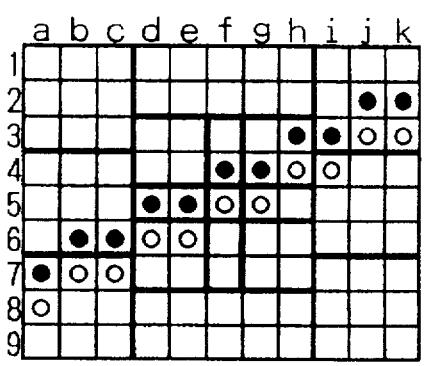
FIG. 27B
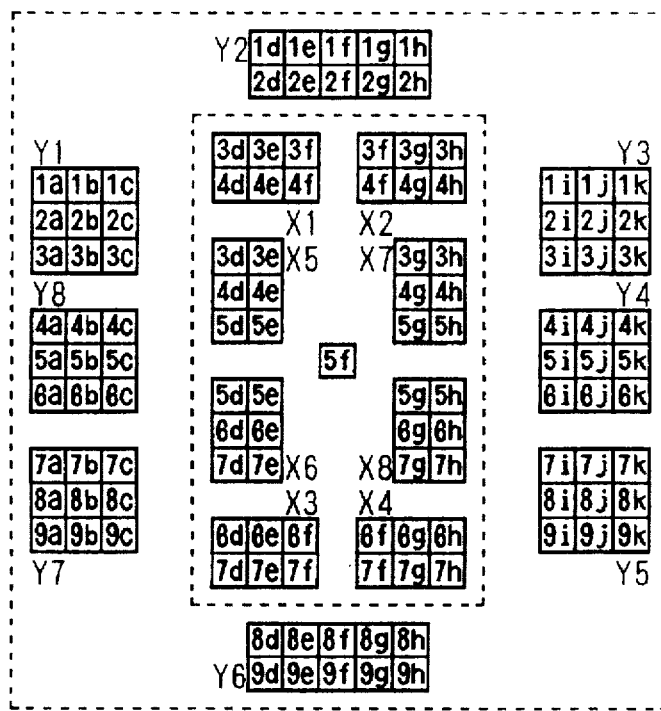
- X8 = X3 = 0
- AT LEAST ONE OF Y1 TO Y8, X1, X2 IS "0"
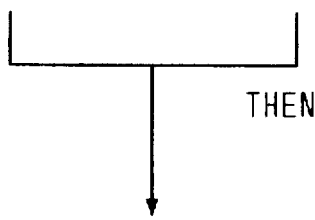
THEN
FIG. 27C
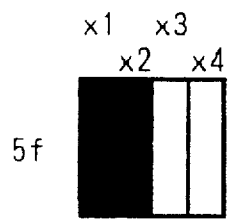

- X4 = X8 = 0
- AT LEAST ONE OF Y1 TO Y8, X1, X2, X6 IS "0"

THEN

FIG. 35A
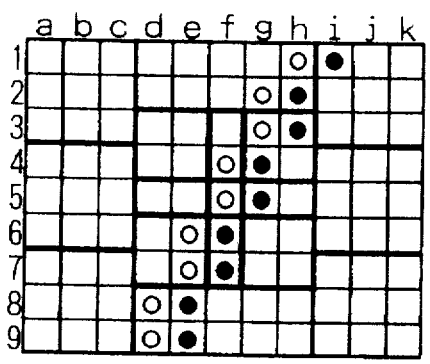
FIG. 35B
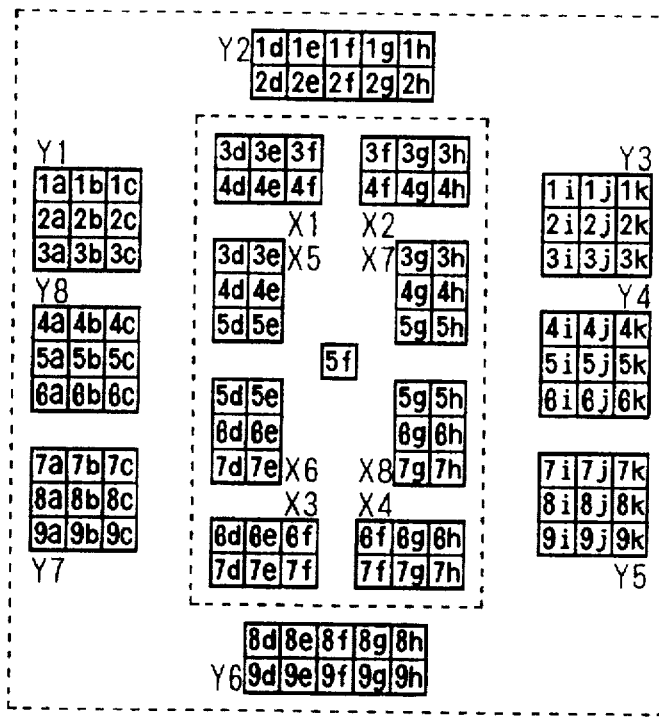
- X1 = X6 = 0
- AT LEAST ONE OF Y1 TO Y8, X4, X7 IS "0"
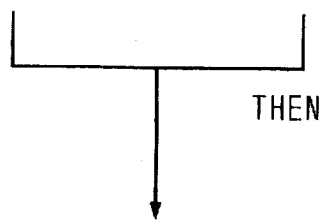
THEN
FIG. 35C
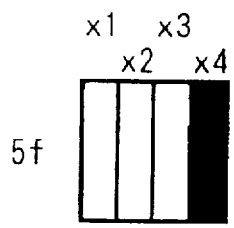

FIG. 36A
FIG. 36B
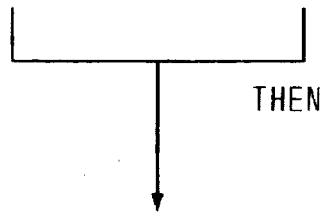
- X5=0
- AT LEAST ONE OF Y1 TO Y8, X3, X8, X7 IS "0"
THEN
FIG. 36C
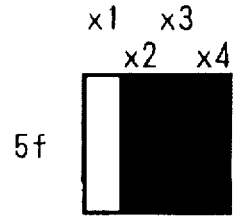

FIG. 37A
FIG. 37B
- X4 = X7 = 0
- AT LEAST ONE OF Y1 TO Y8, X1, X6 IS "0"
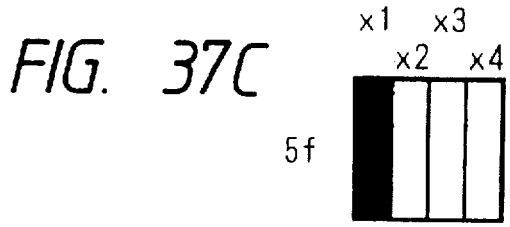
THEN
FIG. 37C
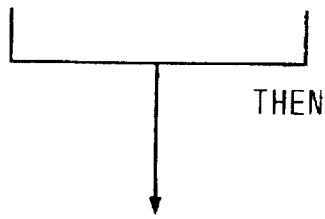

FIG. 38A
FIG. 38B
- X4 = X8 = 0
- AT LEAST ONE OF Y1 TO Y8, X1, X6 IS "0"
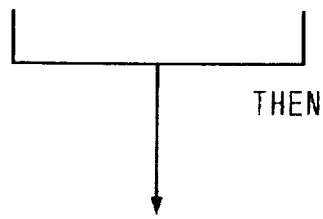
THEN
FIG. 38C
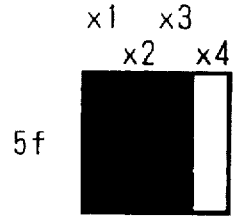

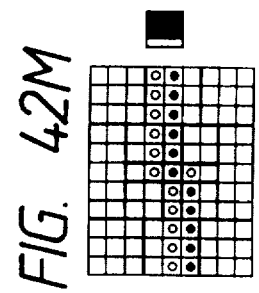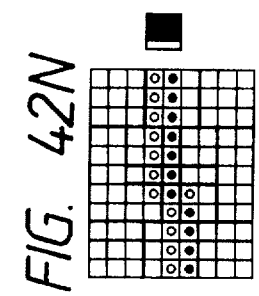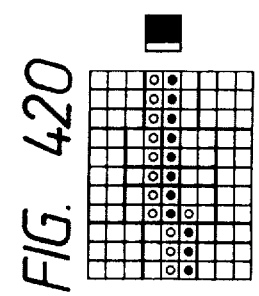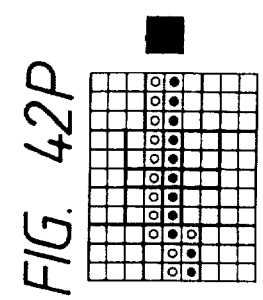
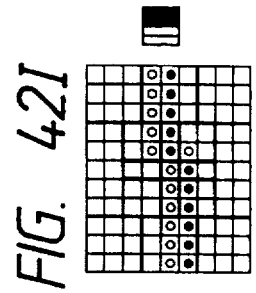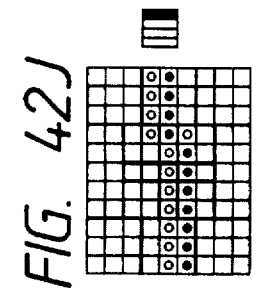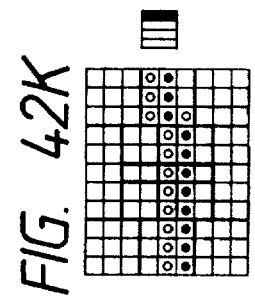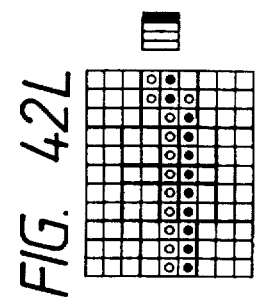
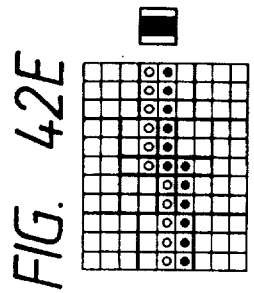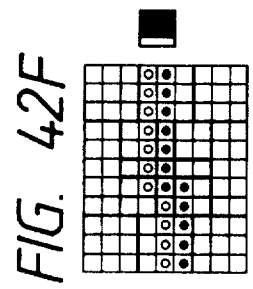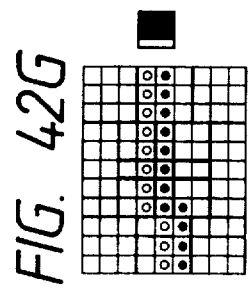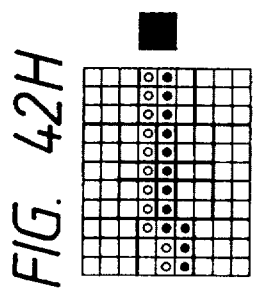
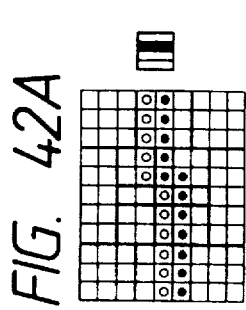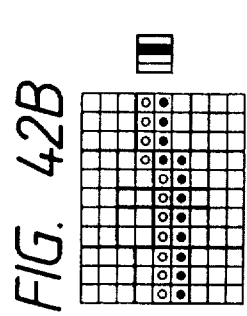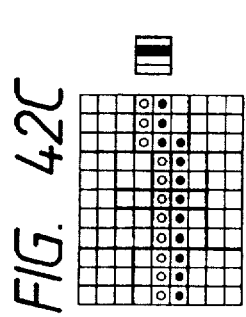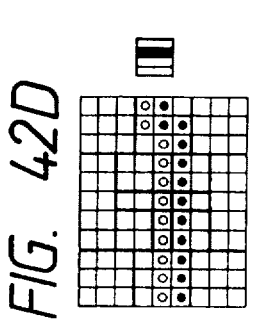

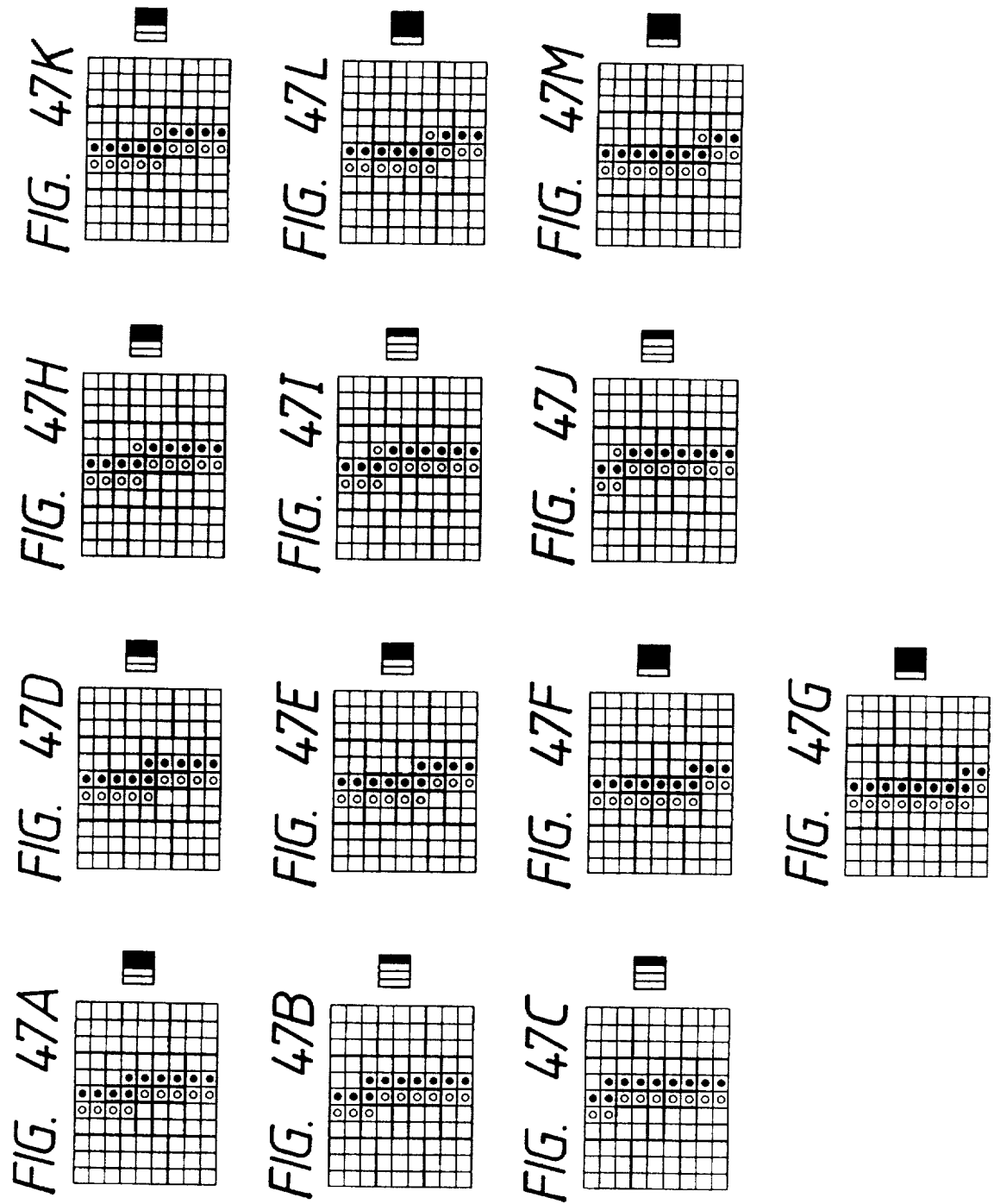

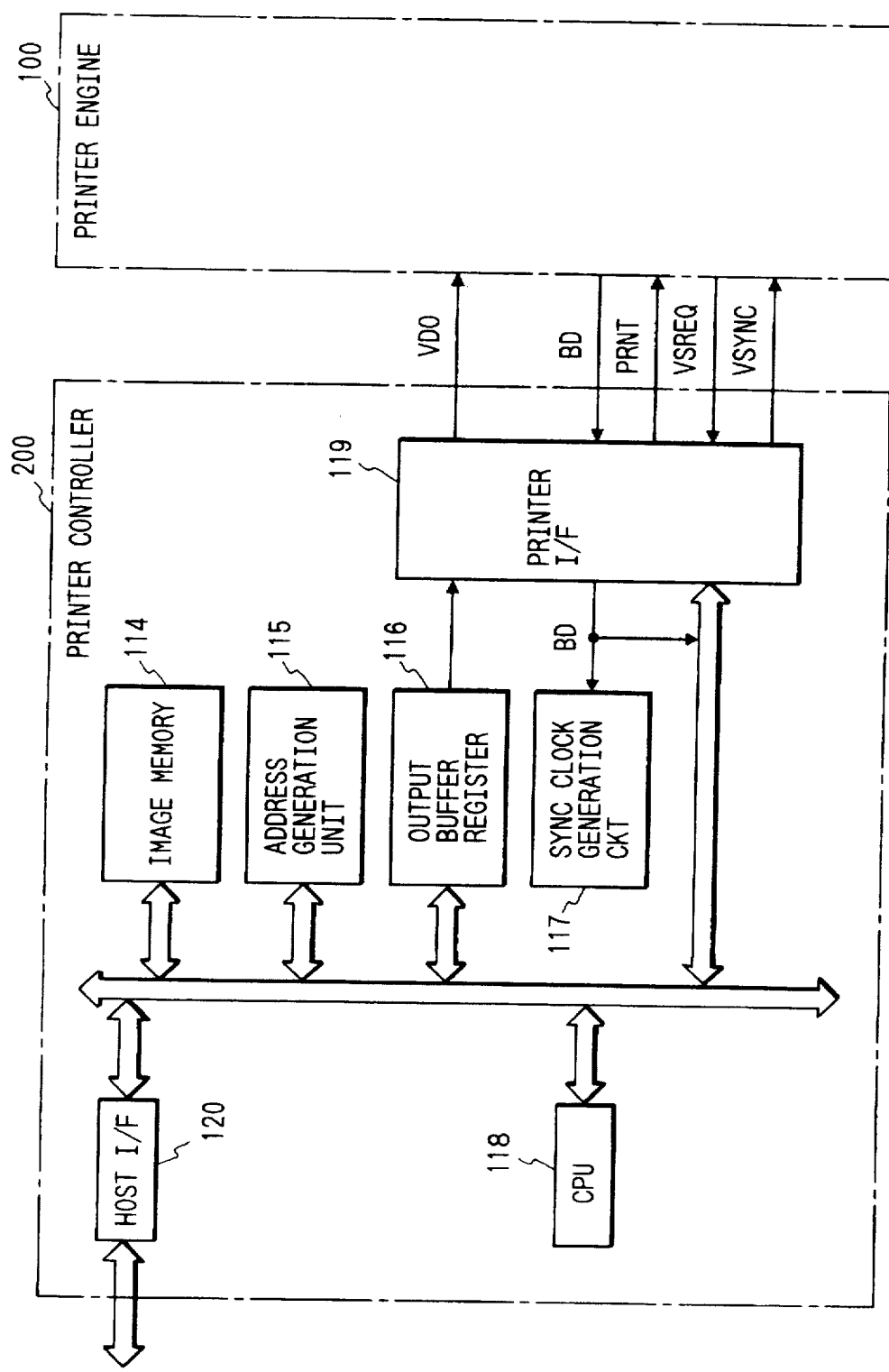

FIG. 56

| SB5 | SB4 | SB3 | SB2 | SB1 | SB0 | PLS3 | PLS2 | PLS1 | PM7 | PM6 | PM5 | PM4 | PM3 | PM2 | PM1 | PM0 |
|---|---|---|---|---|---|---|---|---|---|---|---|---|---|---|---|---|
| 0 | 0 | 0 | - | - | - | 0 | 0 | 1 | 0 | 0 | 0 | 0 | 0 | 0 | 0 | 0 |
|   |   |   |   |   |   | 0 | 1 | 0 | 0 | 0 | 0 | 0 | 0 | 0 | 0 | 0 |
|   |   |   |   |   |   | 1 | 0 | 0 | - | - | - | - | - | - | - | - |
|   |   |   |   |   |   | OTHER THAN ABOVE | | | - | - | - | - | - | - | - | - |
| 0 | 0 | 1 | - | - | - | 0 | 0 | 1 | 0 | 0 | 0 | 0 | 1 | 0 | 0 | 0 |
|   |   |   |   |   |   | 0 | 1 | 0 | 0 | 0 | 0 | 1 | 0 | 0 | 0 | 0 |
|   |   |   |   |   |   | 1 | 0 | 0 | - | - | - | - | - | - | - | - |
|   |   |   |   |   |   | OTHER THAN ABOVE | | | - | - | - | - | - | - | - | - |
| 0 | 1 | 0 | - | - | - | 0 | 0 | 1 | 0 | 0 | 0 | 1 | 1 | 0 | 0 | 0 |
|   |   |   |   |   |   | 0 | 1 | 0 | 0 | 0 | 1 | 1 | 0 | 0 | 0 | 0 |
|   |   |   |   |   |   | 1 | 0 | 0 | - | - | - | - | - | - | - | - |
|   |   |   |   |   |   | OTHER THAN ABOVE | | | - | - | - | - | - | - | - | - |
| 0 | 1 | 1 | - | - | - | 0 | 0 | 1 | 0 | 0 | 0 | 1 | 0 | 1 | 0 | 0 |
|   |   |   |   |   |   | 0 | 1 | 0 | 0 | 0 | 1 | 0 | 1 | 0 | 0 | 0 |
|   |   |   |   |   |   | 1 | 0 | 0 | - | - | - | - | - | - | - | - |
|   |   |   |   |   |   | OTHER THAN ABOVE | | | - | - | - | - | - | - | - | - |
| 1 | 0 | 0 | - | - | - | 0 | 0 | 1 | 0 | 0 | 1 | 0 | 0 | 0 | 1 | 0 |
|   |   |   |   |   |   | 0 | 1 | 0 | 0 | 1 | 0 | 0 | 0 | 1 | 0 | 0 |
|   |   |   |   |   |   | 1 | 0 | 0 | - | - | - | - | - | - | - | - |
|   |   |   |   |   |   | OTHER THAN ABOVE | | | - | - | - | - | - | - | - | - |
| 1 | 0 | 1 | - | - | - | 0 | 0 | 1 | 0 | 0 | 1 | 0 | 1 | 0 | 1 | 0 |
|   |   |   |   |   |   | 0 | 1 | 0 | 0 | 1 | 0 | 1 | 0 | 1 | 0 | 0 |
|   |   |   |   |   |   | 1 | 0 | 0 | - | - | - | - | - | - | - | - |
|   |   |   |   |   |   | OTHER THAN ABOVE | | | - | - | - | - | - | - | - | - |
| 1 | 1 | 0 | - | - | - | 0 | 0 | 1 | 0 | 1 | 0 | 1 | 0 | 1 | 0 | 1 |
|   |   |   |   |   |   | 0 | 1 | 0 | 1 | 0 | 1 | 0 | 1 | 0 | 1 | 0 |
|   |   |   |   |   |   | 1 | 0 | 0 | - | - | - | - | - | - | - | - |
|   |   |   |   |   |   | OTHER THAN ABOVE | | | - | - | - | - | - | - | - | - |
| 1 | 1 | 1 | - | - | - | 0 | 0 | 1 | 1 | 1 | 1 | 1 | 1 | 1 | 1 | 1 |
|   |   |   |   |   |   | 0 | 1 | 0 | 1 | 1 | 1 | 1 | 1 | 1 | 1 | 1 |
|   |   |   |   |   |   | 1 | 0 | 0 | - | - | - | - | - | - | - | - |
|   |   |   |   |   |   | OTHER THAN ABOVE | | | - | - | - | - | - | - | - | - |

FIG. 57

| SB5 | SB4 | SB3 | SB2 | SB1 | SB0 | PLS3 | PLS2 | PLS1 | PM7 | PM6 | PM5 | PM4 | PM3 | PM2 | PM1 | PM0 |
|---|---|---|---|---|---|---|---|---|---|---|---|---|---|---|---|---|
| - | - | - | 0 | 0 | 0 | 0 | 0 | 1 | - | - | - | - | - | - | - | - |
|   |   |   |   |   |   | 0 | 1 | 0 | - | - | - | - | - | - | - | - |
|   |   |   |   |   |   | 1 | 0 | 0 | 0 | 0 | 0 | 0 | 0 | 0 | 0 | 0 |
|   |   |   |   |   |   | OTHER THAN ABOVE | | | - | - | - | - | - | - | - | - |
| - | - | - | 0 | 0 | 1 | 0 | 0 | 1 | - | - | - | - | - | - | - | - |
|   |   |   |   |   |   | 0 | 1 | 0 | - | - | - | - | - | - | - | - |
|   |   |   |   |   |   | 1 | 0 | 0 | 0 | 0 | 1 | 0 | 0 | 1 | 0 | 0 |
|   |   |   |   |   |   | OTHER THAN ABOVE | | | - | - | - | - | - | - | - | - |
| - | - | - | 0 | 1 | 0 | 0 | 0 | 1 | - | - | - | - | - | - | - | - |
|   |   |   |   |   |   | 0 | 1 | 0 | - | - | - | - | - | - | - | - |
|   |   |   |   |   |   | 1 | 0 | 0 | 0 | 1 | 1 | 0 | 0 | 1 | 1 | 0 |
|   |   |   |   |   |   | OTHER THAN ABOVE | | | - | - | - | - | - | - | - | - |
| - | - | - | 0 | 1 | 1 | 0 | 0 | 1 | - | - | - | - | - | - | - | - |
|   |   |   |   |   |   | 0 | 1 | 0 | - | - | - | - | - | - | - | - |
|   |   |   |   |   |   | 1 | 0 | 0 | 0 | 1 | 0 | 1 | 1 | 0 | 1 | 0 |
|   |   |   |   |   |   | OTHER THAN ABOVE | | | - | - | - | - | - | - | - | - |
| - | - | - | 1 | 0 | 0 | 0 | 0 | 1 | - | - | - | - | - | - | - | - |
|   |   |   |   |   |   | 0 | 1 | 0 | - | - | - | - | - | - | - | - |
|   |   |   |   |   |   | 1 | 0 | 0 | 1 | 1 | 1 | 0 | 0 | 1 | 1 | 1 |
|   |   |   |   |   |   | OTHER THAN ABOVE | | | - | - | - | - | - | - | - | - |
| - | - | - | 1 | 0 | 1 | 0 | 0 | 1 | - | - | - | - | - | - | - | - |
|   |   |   |   |   |   | 0 | 1 | 0 | - | - | - | - | - | - | - | - |
|   |   |   |   |   |   | 1 | 0 | 0 | 1 | 1 | 0 | 1 | 1 | 0 | 1 | 1 |
|   |   |   |   |   |   | OTHER THAN ABOVE | | | - | - | - | - | - | - | - | - |
| - | - | - | 1 | 1 | 0 | 0 | 0 | 1 | - | - | - | - | - | - | - | - |
|   |   |   |   |   |   | 0 | 1 | 0 | - | - | - | - | - | - | - | - |
|   |   |   |   |   |   | 1 | 0 | 0 | 0 | 1 | 1 | 1 | 1 | 1 | 1 | 0 |
|   |   |   |   |   |   | OTHER THAN ABOVE | | | - | - | - | - | - | - | - | - |
| - | - | - | 1 | 1 | 1 | 0 | 0 | 1 | - | - | - | - | - | - | - | - |
|   |   |   |   |   |   | 0 | 1 | 0 | - | - | - | - | - | - | - | - |
|   |   |   |   |   |   | 1 | 0 | 0 | 1 | 1 | 1 | 1 | 1 | 1 | 1 | 1 |
|   |   |   |   |   |   | OTHER THAN ABOVE | | | - | - | - | - | - | - | - | - |

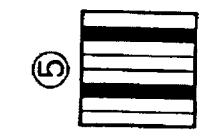
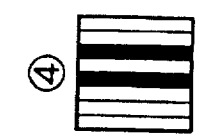
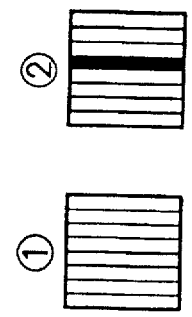
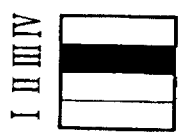
FIG. 58A
FIG. 58B

⑧
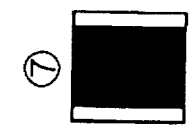
⑦
⑥
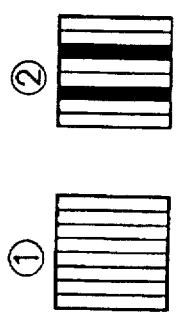
⑤
④
③
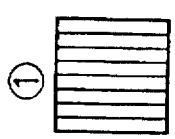
②
①
I II III IV
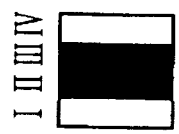
FIG. 60A
FIG. 60B ORIGINAL IMAGE
(240 OR 300dpi)

AFTER PROC

300dpi

240dpi

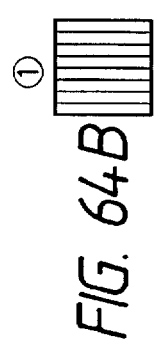

1

INFORMATION RECORDING APPARATUS WITH SMOOTHING PROCESSING VIA PIXEL FEATURE DETECTION AND RECORDING DENSITY VARIATION AND TONER CONSERVATION

BACKGROUND OF THE INVENTION

1. Field of the Invention

The present invention relates to an information recording apparatus such as a laser beam printer and, more particularly, to an information recording apparatus which can perform print processing with high image quality without deteriorating smooth print quality even when the apparatus simultaneously adopts both a technique for improving print quality by smoothing the edges of characters and figures which are printed by smoothing bit-map data representing characters and figures, and a technique for saving toner by adjusting the recording density.

2. Related Background Art

In recent years, laser beam printers using an electrophotographic technique are widely used as information recording apparatuses such as output apparatuses for computers, output units for facsimile systems, so-called digital copying machines for printing image data read from image scanners, and the like.

A laser beam printer will be exemplified below.

In a conventional laser beam printer, a technique for smoothing the edge portions of characters and figures is known.

A laser beam printer adopting such a technique performs a print operation at a resolution of, e.g., 300 dots/inch.

In this case, a character or figure is drawn by printing black dots (● marks) and white dots (○ marks) at lattice positions of 300 dots/inch, as shown in FIG. 4. FIG. 4 shows a dot pattern of an English letter "a". At the resolution of 300 dots/inch, the interval between adjacent dots is about 85 microns. In general, the human eye can visually recognize an object as small as about 20 microns. Thus, at the above-mentioned resolution (about 85 microns), the edge portion of a character or figure formed by dots looks jaggy, and such a print operation does not always assure high image quality.

In order to solve this problem, the following approaches are available.

As the first approach, a method of simply increasing the resolution (e.g., 1,200 dots/inch) comes into mind. However, in this case, in order to express an identical area, a bit-map memory having a capacity 16 times (=4×4) that of a memory for 300 dots/inch is required, resulting in a very expensive apparatus.

As the second approach, a method of equivalently increasing the resolution in the main scanning direction or in both the main scanning and sub-scanning directions by adding only a buffer memory having a small capacity without increasing the capacity of a bit-map memory, and by modifying print data of a pixel of interest with reference to dot data around the pixel of interest to be printed, is known.

The modified pixel size will be described below with reference to FIGS. 9A to 9D in association with the lower limit of segmentation processing of the modified pixel unit size upon modification of a pixel of interest by a smoothing processing circuit. FIG. 9A shows an original pixel before smoothing modification. FIG. 9B shows a case wherein the modified pixel size for smoothing modification is set to be ¼ of the size of the original pixel, FIG. 9C shows a case wherein the modified pixel size for smoothing modification is set to be ⅛ of the size of the original pixel, and FIG. 9D shows a case wherein the modified pixel size for smoothing modification is set to be ¹/₁₆ of the size of the original pixel.

As the modified pixel unit size becomes smaller, finer smoothing processing can be realized. However, the driving frequency of the smoothing processing circuit increases accordingly, and the smoothing processing circuit must be designed using Bi-CMOS logic or ECL logic, resulting in an expensive circuit.

On the other hand, when the modified pixel unit size is set to be large, pixels with the modified pixel unit size are printed while being sufficiently resolved, and a smoothed portion is printed as a "whisker"-like portion rather than a "blurred" portion, as would be preferable. As a result, the desired smoothing effect cannot be sufficiently expected.

The modified pixel unit size which can satisfy the above-mentioned two contradictory conditions largely varies depending on the toner particle size. Commercially available laser beam printers normally use a toner having a toner particle size of 10 to 12 microns (to be referred to as a normal particle size toner hereinafter). On the other hand, in recent years, in order to improve the resolution, printers which use a toner having a toner particle size of 5 to 6 microns (to be referred to as a small particle size toner hereinafter) are developed or commercially available. In addition to the toner particle size, the optimal modified pixel unit size also varies depending on the light-emission response characteristics of a laser due to a difference in laser driving circuit, the conditions of an electrophotography process, and the like.

In general, a smoothing processing circuit is normally designed as an integrated circuit such as a gate array, i.e., a CMOS including 3,000 to 10,000 gates. In this case, it is not advisable to develop another gate array in correspondence with the above-mentioned difference in toner. When processing corresponding to the difference in toner is assembled in a single gate array, not only does the number of gates increase, but also the integrated circuit requires a logic which can respond to high frequency, e.g., a Bi-CMOS logic, ECL logic, or the like, resulting in an increase in cost. Even when the same toner is used, the modified pixel size changes depending on the light-emission rise characteristics and the electrophotography process of a laser. Therefore, it is not practical to pre-program smoothing processing modes corresponding to many conditions.

The second drawback is a problem posed when the smoothing processing circuit is applied to a printer engine which can switch the print resolution. For example, when the print resolution is switched between 240 dpi and 300 dpi or between 300 dpi and 600 dpi in response to a command, it is difficult to optimize the smoothing effects for these two print densities. More specifically, even when an algorithm which can improve the smoothing effect for one print resolution is used, the smoothing effect for the other print resolution cannot always be optimized.

The third drawback is associated with optimization of smoothing processing for a printer engine which has a function of changing the density of an image to be printed to a relatively low or high density by, e.g., changing the high voltage applied to a developer. When the print density is changed, the effect on a smoothed portion also changes, resulting in deterioration of image quality.

The fourth drawback is associated with the influence, on the smoothing effect, of the use environmental conditions such as the temperature, humidity, and the like of a printer engine. When an environmental condition such as the temperature, humidity, and the like changes, the print density of a printed image changes, and the effect on a smoothed portion also changes, resulting in deterioration of image quality.

As a smoothing processing technique for eliminating these drawbacks, the assignee of the present invention has filed U.S. Pat. No. 5,465,157, U.S. application Ser. No. 07/855,083, filed Mar. 20, 1992, U.S. Pat. No. 5,381,522, U.S. application Ser. No. 07/858,075, filed Mar. 26, 1992, refiled as application Ser. No. 08/430,161, and U.S. application Ser. No. 08/012,634, filed Feb. 3, 1993.

The process of a laser beam printer is set to obtain always the best image density, so that the toner consumption amount per unit area is constant. For this reason, even in a test print mode of an original, the printer consumes toner to obtain the best image density. In this case, in general, as long as characters are sufficiently legible, print cost per page is to be reduced by suppressing toner consumption even if the image density is lowered to some extent.

As a method of controlling the image density, a method of controlling the consumption amount of a toner by controlling the application voltage of a developing bias is a known technique. An image density control method of this type suffers the following drawback since the process condition upon recording is changed.

More specifically, when the recording density is lowered by controlling the developing bias voltage, another image quality deterioration occurs in addition to a decrease in density. That is, when the density is lowered by this method, image fogging (an unnecessary toner is uniformly attached to a non-print portion to deteriorate printed image quality), or image scattering (a toner is scattered to a portion around a printed portion to deteriorate printed image quality) often occurs as a result of the decrease in density. Also, it is difficult to stably maintain a low density in correspondence with a change in environmental condition such as a change in temperature, humidity, and the like. The recording density may be lowered by thinning out recording pixels. In this case, image quality considerably deteriorates. Therefore, when the above-mentioned smoothing processing is performed, the smoothing effect changes at a low density, thus losing smoothness of an edge.

SUMMARY OF THE INVENTION

The present invention has been made to eliminate the above-mentioned drawbacks of the prior art, and has as its object to provide an information processing apparatus which can decrease the image density by suppressing the toner consumption per unit area, and can reduce print cost.

It is another object of the present invention to provide an information processing apparatus which can maintain high image quality without lowering the smoothing processing effect even when a print operation is performed in a toner consumption save mode.

It is still another object of the present invention to provide an information processing apparatus which can perform smoothing processing and toner-save processing using a simple circuit arrangement.

According to one aspect of the present invention, these objects are achieved by providing an information recording apparatus which smooths an input information signal when that signal represents a predetermined pattern. The apparatus also subjects the signal, for any pixel not subjected to such smoothing, to recording density change processing. The image is then recorded, based on the signals processed by either the smoothing processing or the recording density change processing. Preferably, when the input signal for a plurality of pixels is an edge pattern, the smoothing processing involves conversion of the information signal of one pixel into information signals for a multiplicity of areas. The recording density change processing, too, preferably involves conversion of an information signal of one pixel into a signal for plural areas, the number of which is controlled by a command from a controller of the information recording apparatus. The method of using such apparatus is another aspect of the invention.

The above and other objects of the present invention will become apparent from the following detailed description taken in conjunction with the accompanying drawings.

BRIEF DESCRIPTION OF THE DRAWINGS

FIG. 8 is a block diagram according to the first embodiment of the present invention;

FIGS. 11A, 11B, and 12 are views for explaining a feature extraction algorithm of data to be applied to the present invention;

FIG. 18 is a block diagram showing an arrangement for performing smoothing processing by dividing a pixel of interest in the main scanning and sub-scanning directions;

FIGS. 23A to 23D are views for explaining smoothing processing for a lateral line inclined at 45° or less;

FIG. 24 is a view showing a state wherein the pattern shown in FIG. 23A is reversed in the horizontal direction;

FIGS. 25A to 28C are views showing examples of a feature extraction algorithm of this embodiment;

FIGS. 35A to 38C are views showing examples of a feature extraction algorithm of this embodiment;

FIGS. 42A to 42P are views showing a smoothing algorithm of FIGS. 41A to 41F;

FIGS. 47A to 47M are views showing a smoothing algorithm of FIGS. 46A to 46D;

FIG. 48 is a block diagram showing the flow of a print operation in a printer controller;

FIGS. 53A to 55E are views showing examples of a pulse modulation pattern;

FIG. 56 is a table showing an operation logic for performing pattern conversion shown in FIGS. 58A to 59B;

FIG. 57 is a table showing an operation logic for performing pattern conversion shown in FIGS. 60A and 60B;

FIGS. 58A to 65B are views showing examples of pattern conversion;

DETAILED DESCRIPTION OF THE PREFERRED EMBODIMENT

The preferred embodiment of the present invention will be described hereinafter with reference to the accompanying drawings.

Figure 1:
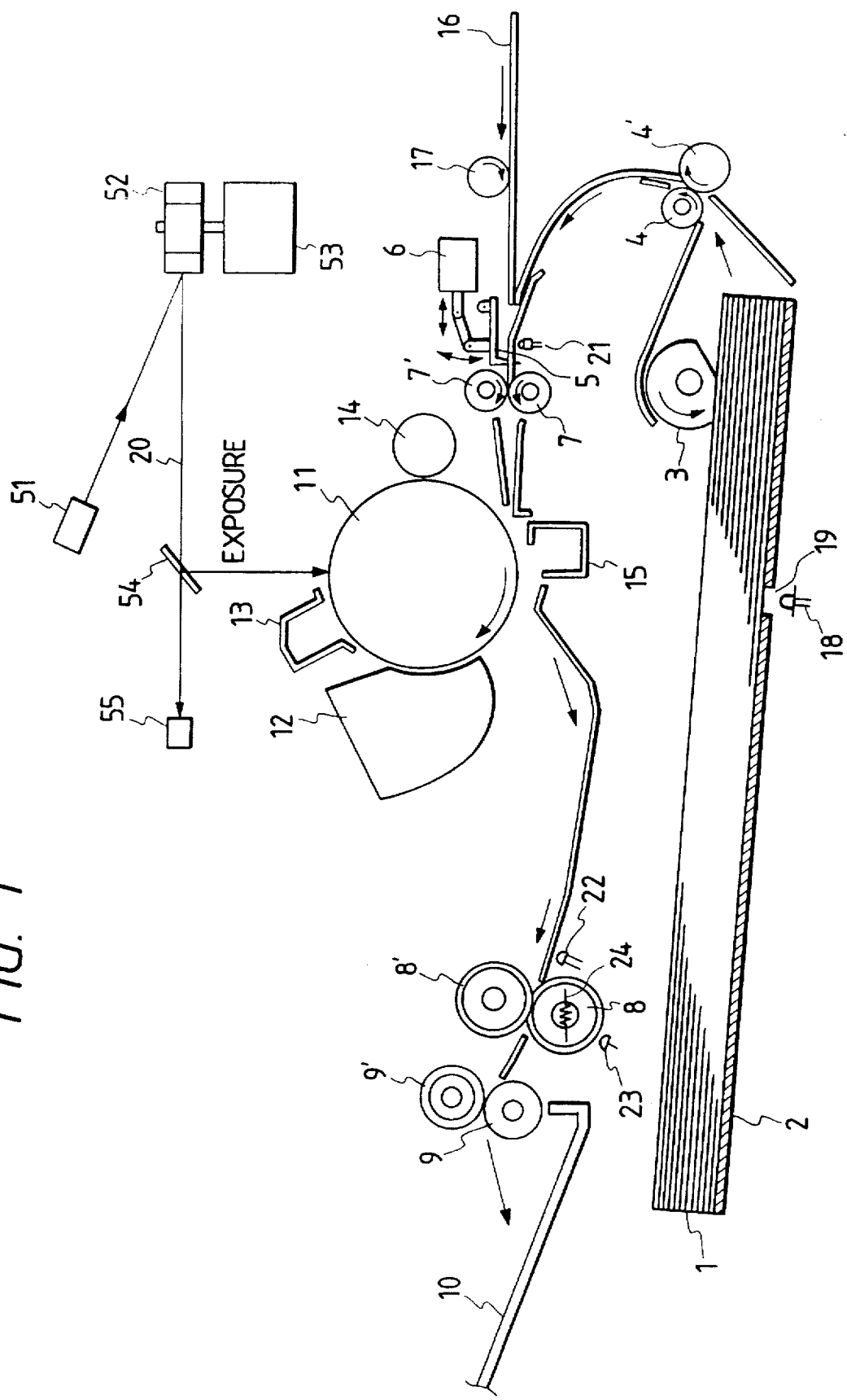
FIG. 1 is a schematic view showing an engine section of a laser beam printer according to an embodiment of the present invention.
Figure 2:
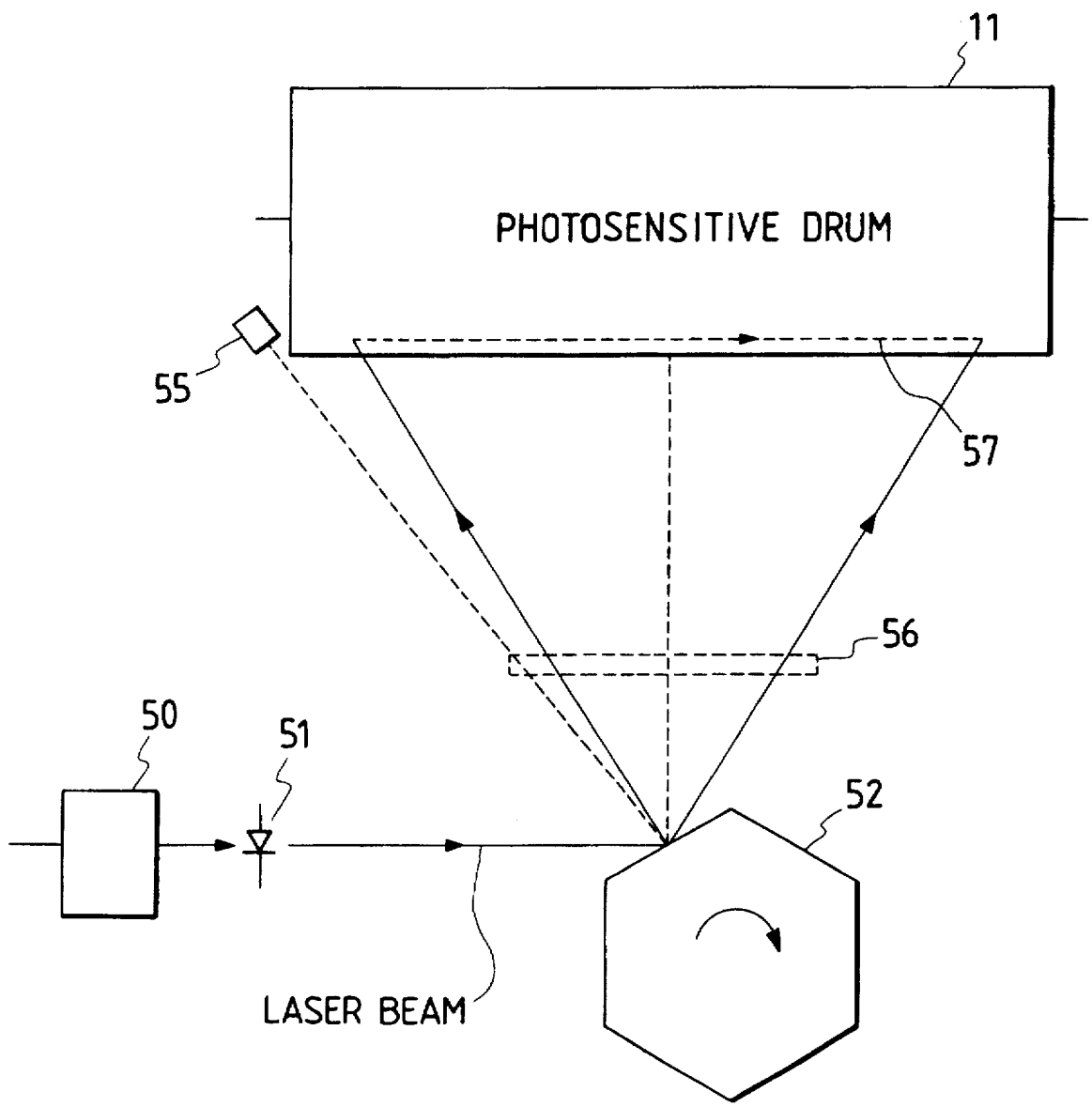
FIG. 2 is a view for explaining in detail a portion of the engine section shown in FIG. 1.

FIGS. 1 and 2 are views showing an engine section of a laser beam printer to which the present invention is applied.

Referring to FIGS. 1 and 2, a sheet cassette 2 holds paper sheets 1 as recording media. A sheet feed cam 3 picks up only the uppermost sheet from the paper sheets 1 stacked on the sheet cassette 2, and feeds the leading end portion of the picked-up paper sheet to the position of sheet supply rollers 4 and 4' by a driving means (not shown). The sheet feed cam 3 is intermittently rotated every time a paper sheet is supplied, and feeds one paper sheet per rotation.

A reflection type photosensor 18 detects the presence/absence of a paper sheet by detecting light reflected by the paper sheet 1 via a hole portion 19 formed in the bottom portion of the sheet cassette 2.

When a paper sheet is fed by the sheet supply cam 3 to a roller portion, the sheet supply rollers 4 and 4' are rotated while lightly pressing the paper sheet 1, thereby feeding the paper sheet 1. When the paper sheet 1 is fed, and its leading end portion reaches the position of a registration shutter 5, the feed operation of the paper sheet 1 is stopped by the registration shutter, and the sheet supply rollers 4 and 4' are kept rotated to generate a feed torque while slipping on the paper sheet 1. In this case, when a registration solenoid 6 is driven to release the registration shutter 5 upward, the paper sheet 1 is fed to feed rollers 7 and 7'. The registration shutter 5 is driven in synchronism with the supply timing of an image formed by a laser beam 20 on a photosensitive drum 11. Note that a photosensor 21 detects whether or not the paper sheet 1 is present at the position of the registration shutter 5.

Figure 4:
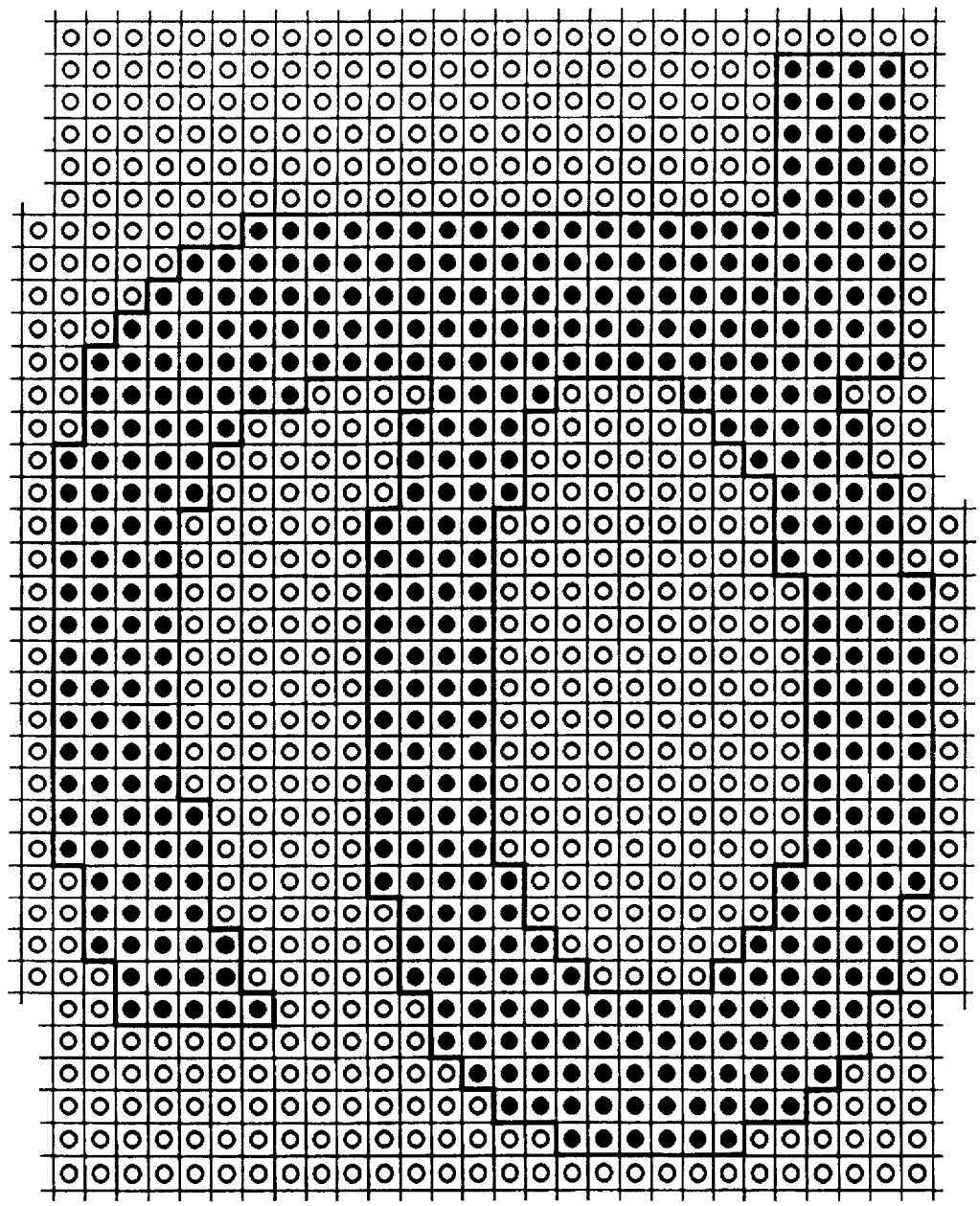
FIG. 4 is a view showing an example of a pattern expressed by dot data.

A rotary polygonal mirror 52 is driven by a motor 53. A laser driver 50 drives a semiconductor laser 51 in correspondence with dot data supplied from a character generator (not shown) for generating bit data. The character generator may generate bit data of katakana characters, hiragana characters, kanji characters, and the like as Japanese characters in addition to English letters, as shown in FIG. 4.

The laser beam 20 emitted from the semiconductor laser 51 driven by the laser driver 50 is scanned in the main scanning direction by the rotary polygonal mirror 52, and is guided to the photosensitive drum 11 via an f-θ lens 56 arranged between the rotary polygonal mirror 52 and a reflection mirror 54, and via the reflection mirror 54. The laser beam 20 is imaged on the photosensitive drum 11, and is scanned in the main scanning direction to form a latent image on a main scan line 57. Note that a beam detector 55 is arranged near the photosensitive drum 11.

In this case, the ON time of the laser required for recording one dot when the print resolution is 300 dots/inch and the print speed is 8 sheets/min (A4- or letter-size sheets) is about 540 nsec, the ON time of the laser required for recording one dot when the print resolution is 300 dots/inch and the print speed is 16 sheets/min is about 270 nsec, and the ON time of the laser required for recording one dot when the print resolution is 300 dots/inch and the print speed is 4 sheets/min is about 1,080 nsec.

The ON time of the laser required for recording one dot when the print resolution is 600 dots/inch and the print speed is 8 sheets/min is about 135 nsec, the ON time of the laser required for recording one dot when the print resolution is 600 dots/inch and the print speed is 16 sheets/min is about 68 nsec, and the ON time of the laser required for recording one dot when the print resolution is 600 dots/inch and the print speed is 4 sheets/min is about 270 nsec.

The ON time of the laser required for recording one dot when the print resolution is 240 dots/inch and the print speed is 8 sheets/min is about 844 nsec, the ON time of the laser required for recording one dot when the print resolution is 240 dots/inch and the print speed is 16 sheets/min is about 422 nsec, and the ON time of the laser required for recording one dot when the print resolution is 240 dots/inch and the print speed is 4 sheets/min is about 1,688 nsec.

Figure 9A:
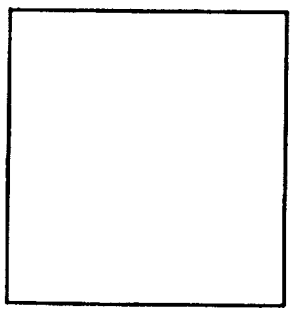
FIGS. 9A to 9D are views for explaining the modified pixel size.
Figure 9B:
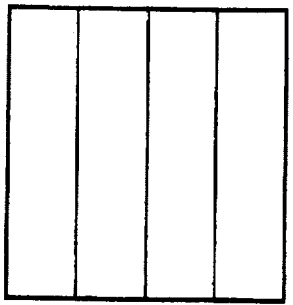
Figure 9C:
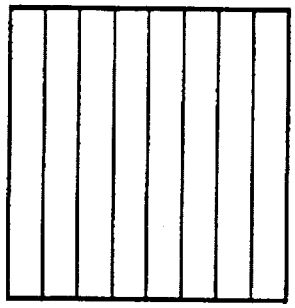
Figure 9D:
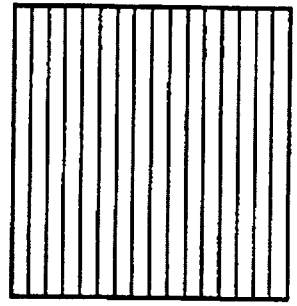

The ON times of the laser corresponding to the modified pixel unit sizes shown in FIGS. 9B to 9D above are as follows.

When the modified pixel size is set to be ¼ that of the original pixel (FIG. 9B), the ON time of the laser required for recording one modified pixel size when the print resolution is 300 dots/inch and the print speed is 8 sheets/min (A4- or letter-size sheets) is about 135 nsec, the ON time of the laser required for recording one modified pixel size when the print resolution is 300 dots/inch and the print speed is 16 sheets/min is about 67.5 nsec, and the ON time of the laser required for recording one modified pixel size when the print resolution is 300 dots/inch and the print speed is 4 sheets/min is about 270 nsec.

The ON time of the laser required for recording one modified pixel size when the print resolution is 600 dots/inch and the print speed is 8 sheets/min is about 33.8 nsec, the ON time of the laser required for recording one modified pixel size when the print resolution is 600 dots/inch and the print speed is 16 sheets/min is about 17 nsec, and the ON time of the laser required for recording one modified pixel size when the print resolution is 600 dots/inch and the print speed is 4 sheets/min is about 68 nsec.

The ON time of the laser required for recording one modified pixel size when the print resolution is 240 dots/inch and the print speed is 8 sheets/min is about 211 nsec, the ON time of the laser required for recording one modified pixel size when the print resolution is 240 dots/inch and the print speed is 16 sheets/min is about 105 nsec, and the ON time of the laser required for recording one modified pixel size when the print resolution is 240 dots/inch and the print speed is 4 sheets/min is about 422 nsec.

When the modified pixel size is set to be ⅛ that of the original pixel (FIG. 9C), the ON time of the laser required for recording one modified pixel size when the print resolution is 300 dots/inch and the print speed is 8 sheets/min (A4- or letter-size sheets) is about 67.5 nsec, the ON time of the laser required for recording one modified pixel size when the print resolution is 300 dots/inch and the print speed is 16 sheets/min is about 33.8 nsec, and the ON time of the laser required for recording one modified pixel size when the print resolution is 300 dots/inch and the print speed is 4 sheets/min is about 135 nsec.

The ON time of the laser required for recording one modified pixel size when the print resolution is 600 dots/inch and the print speed is 8 sheets/min is about 16.9 nsec, the ON time of the laser required for recording one modified pixel size when the print resolution is 600 dots/inch and the print speed is 16 sheets/min is about 8.5 nsec, and the ON time of the laser required for recording one modified pixel size when the print resolution is 600 dots/inch and the print speed is 4 sheets/min is about 33.8 nsec.

The ON time of the laser required for recording one modified pixel size when the print resolution is 240 dots/inch and the print speed is 8 sheets/min is about 105 nsec, the ON time of the laser required for recording one modified pixel size when the print resolution is 240 dots/inch and the print speed is 16 sheets/min is about 52.8 nsec, and the ON time of the laser required for recording one modified pixel size when the print resolution is 240 dots/inch and the print speed is 4 sheets/min is about 211 nsec.

When the modified pixel size is set to be ¹⁄₁₆ that of the original pixel (FIG. 9D), the ON time of the laser required for recording one modified pixel size when the print resolution is 300 dots/inch and the print speed is 8 sheets/min (A4- or letter-size sheets) is about 33.8 nsec, the ON time of the laser required for recording one modified pixel size when the print resolution is 300 dots/inch and the print speed is 16 sheets/min is about 16.9 nsec, and the ON time of the laser required for recording one modified pixel size when the print resolution is 300 dots/inch and the print speed is 4 sheets/min is about 67.6 nsec.

The ON time of the laser required for recording one modified pixel size when the print resolution is 600 dots/inch and the print speed is 8 sheets/min is about 8.5 nsec, the ON time of the laser required for recording one modified pixel size when the print resolution is 600 dots/inch and the print speed is 16 sheets/min is about 4.3 nsec, and the ON time of the laser required for recording one modified pixel size when the print resolution is 600 dots/inch and the print speed is 4 sheets/min is about 17 nsec.

The ON time of the laser required for recording one modified pixel size when the print resolution is 240 dots/inch and the print speed is 8 sheets/min is about 52.8 nsec, the ON time of the laser required for recording one modified pixel size when the print resolution is 240 dots/inch and the print speed is 16 sheets/min is about 26.4 nsec, and the ON time of the laser required for recording one modified pixel size when the print resolution is 240 dots/inch and the print speed is 4 sheets/min is about 105 nsec.

With the existing technique, the shortest pulse ON time which can be achieved by the driving performance of the laser driver 50 used in a laser beam printer of this type is about 4 nsec (ON rise time of about 1 nsec; OFF fall time of about 1 nsec). Therefore, even if it is attempted to turn on the laser for a time shorter than this shortest ON time, the laser cannot be turned on, or, if it is possible, the ON time and ON light amount are unstable. Therefore, the shortest laser ON pulse width to be modified for smoothing must be set to be an ON time of 4 nsec or longer. The beam detector 55 arranged at the scanning start position of the laser beam 20 detects a BD signal as a synchronization signal for determining the image start timing in the main scanning direction upon detection of the laser beam 20.

The paper sheet 1 receives a feed torque from the feed rollers 7 and 7' in place of the sheet supply rollers 4 and 4', and is fed to the photosensitive drum 11. The surface, charged by a charger 13, of the photosensitive drum 11 is exposed by the laser beam 20, and a latent image is formed thereon. The latent image corresponding to a portion exposed with the laser beam is visualized as a toner image by a developer 14, and the toner image is then transferred onto the surface of the paper sheet 1 by a transfer charger 15. Note that a cleaner 12 cleans the drum surface after the toner image is transferred onto the paper sheet 1.

The toner image transferred onto the paper sheet 1 is then fixed by fixing rollers 8 and 8', and thereafter, the paper sheet 1 is exhausted onto an exhaust tray 10 by exhaust rollers 9 and 9'.

A sheet supply table 16 allows a manual supply operation of paper sheets one by one in addition to the sheet supply operation from the sheet cassette 2. A paper sheet manually supplied to a manual sheet supply roller 17 on the sheet supply table 16 is lightly pressed by the roller 17, and is fed until its leading end portion reaches the registration shutter 5, in the same manner as the sheet supply rollers 4 and 4'. When the leading end portion of the paper sheet reaches the registration shutter 5, the roller 17 is kept rotated while slipping on the paper sheet. The following feed sequence is the same as that executed when a paper sheet is supplied from the cassette.

Note that the fixing roller 8 includes a fixing heater 24. The fixing heater 24 controls the surface temperature of the fixing roller 8 to a predetermined temperature on the basis of the temperature detected by a thermistor 23 which is in slip-contact with the roller surface of the fixing roller, thereby thermally fixing the toner image on the paper sheet 1. A photosensor 22 detects whether or not a paper sheet is present at the position of the fixing rollers 8 and 8'.

The above-mentioned printer is connected to a controller via an interface means, and executes a print sequence upon reception of a print command and an image signal from the controller. Signals exchanged via the interface means will be briefly described below.

Figure 3:
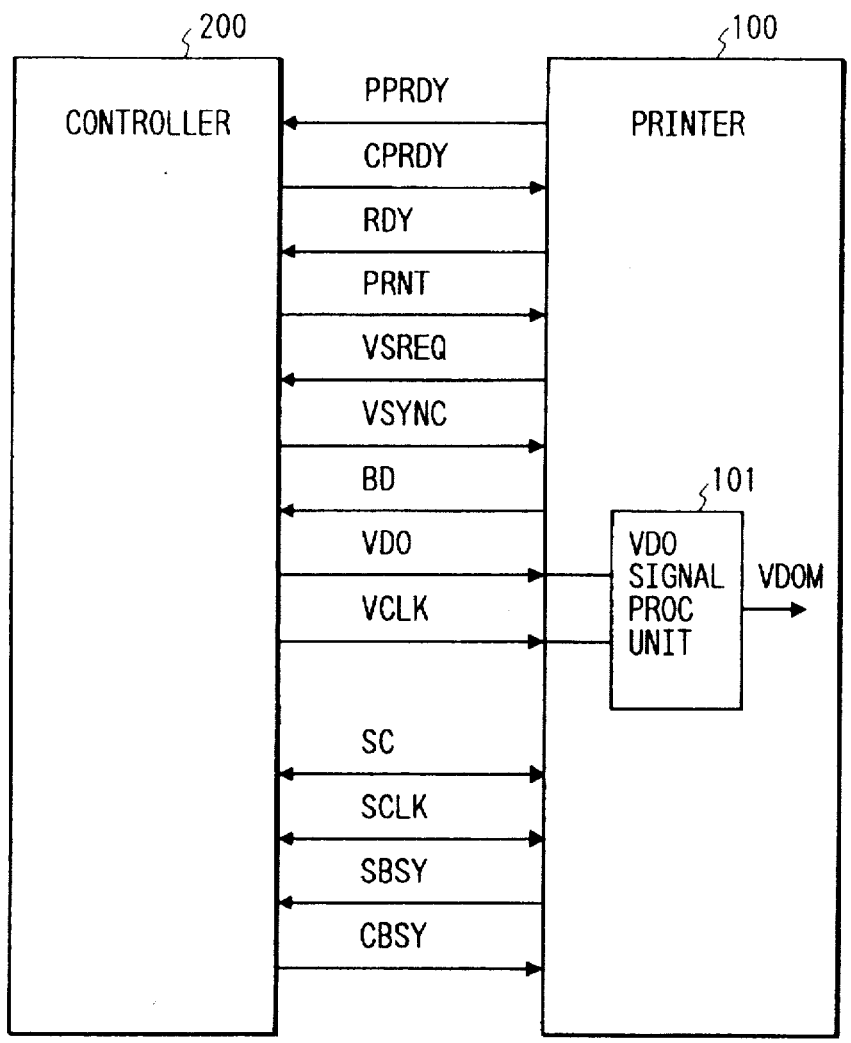
FIG. 3 is a diagram showing interface signals between a printer engine unit and a controller.

FIG. 3 shows interface signals between the printer engine section (100) and the controller (200) for generating image data. Interface signals shown in FIG. 3 will be described in turn below.

A signal PPRDY is a signal which is supplied from the printer to the controller, and informs that the power supply of the printer is turned on, and the printer is ready to operate.

A signal CPRDY is a signal which is supplied from the controller to the printer, and informs that the power supply of the controller is turned on, and the controller is ready to operate.

A signal RDY is a signal which is supplied from the printer to the controller, and indicates that the printer is ready to start or maintain a print operation when it receives a signal PRNT (to be described later). For example, when all sheets in the sheet cassette 2 are used up, and a print operation can no longer be executed, the signal becomes "false".

A signal PRNT is a signal which is supplied from the controller to the printer, and instructs to start or continue a print operation. Upon reception of the signal PRNT, the printer starts a print operation.

A signal VSREQ is a signal which is supplied from the printer to the controller, and indicates that the printer is ready to receive image data after the print operation start instruction is issued by setting the signal PRNT to "true" level by the controller when the signal RDY output from the printer is "true". In this state, the printer can receive a signal VSYNC (to be described later).

A signal VSYNC is a signal which is supplied from the controller to the printer, and is used for achieving output timing synchronization of image data in the sub-scanning direction. With this synchronization, a toner image formed on the drum is transferred onto a paper sheet in synchronism with the paper sheet in the sub-scanning direction.

A signal BD is a signal which is supplied from the printer to the controller, and is used for achieving output timing synchronization of image data in the main scanning direction. With this synchronization, a toner image formed on the drum is transferred onto a paper sheet in synchronism with the paper sheet in the main scanning direction. This signal indicates that the scanned laser beam is located at the start point of a main scan.

A signal VDO is a signal which is supplied from the controller to the printer, and is used for transmitting image data to be printed. The signal VDO is output in synchronism with a signal VCLK (to be described later). The controller receives code data such as PCL codes transmitted from a host apparatus, and causes a character generator to generate character bit signals corresponding to the code data; receives vector data such as postscript codes transmitted from the host apparatus, and generates figure bit data corresponding to the codes; or generates bit image data read by an image scanner. Then, the controller transmits the generated data to the printer as the signal VDO. The printer prints a black image when the signal VDO is "true"; it prints a white image when the signal VDO is "false".

A signal VCLK is a signal which is supplied from the controller to the printer, and serves as a synchronization signal upon transmission and reception of the signal VDO.

A signal SC is a bidirectional serial signal for bidirectionally transmitting and receiving a "command" signal supplied from the controller to the printer, and a "status" signal supplied from the printer to the controller. A signal SCLK (to be described later) is used as a synchronization signal upon transmission or reception of the signal SC. Signals SBSY and CBSY (to be described later) are used as signals for controlling the transmission direction of the bidirectional signal. Note that the "command" signal is an 8-bit serial signal, and is command information used by the controller to instruct, for example, whether the sheet supply mode is a mode for supplying a paper sheet from the cassette or a mode for supplying a paper sheet from a manual insertion port, to the printer. The "status" signal is an 8-bit serial signal, and is information for informing various states of the printer such as a wait state wherein the temperature of the fixing roller of the printer has not reached a printable temperature yet, a paper jam state, a no-sheet state of the sheet cassette, and the like, to the controller.

A signal SCLK is a synchronization pulse used when the printer fetches the "command" signal or when the controller fetches the "status" signal.

A signal CBSY is a signal which is used by the controller to declare rights to the signals SC and SCLK prior to transmission of the "command" signal.

A signal SBSY is a signal which is used by the printer to declare rights to the signals SC and SCLK prior to transmission of the "status" signal.

The signal VDO is input to the printer together with the signal VCLK, and thereafter, is input to a VDO signal processing unit 101 which is arranged in the printer engine and executes signal processing of the present invention. The VDO signal processing unit converts the input signal VDO into a signal VDOM by signal processing to be described later. The converted signal VDOM is input to a laser driver (not shown), thus turning on/off the semiconductor laser 51.

The operation of the interface means will be described below.

When the power switch of the printer is turned on, and the power switch of the controller is also turned on, the printer initializes its internal state, and thereafter, sets the signal PPRDY to be supplied to the controller to "true" level. On the other hand, the controller similarly initializes its internal state, and thereafter, sets the signal CPRDY to be supplied to the printer to "true" level. Thus, both the printer and the controller recognize that the power supply of the other is turned on.

Thereafter, the printer energizes the fixing heater 24 included in the fixing rollers 8 and 8', and when the surface temperature of the fixing roller has reached a fixing temperature, the printer sets the signal RDY to "true" level. Upon detection of the signal RDY of "true" level, the controller sets the signal PRNT to be supplied to the printer to "true" level when data to be printed is present. Upon detection of the signal PRNT of "true" level, the printer rotates the photosensitive drum 11, and uniformly initializes the potential on the surface of the photosensitive drum. At the same time, in the cassette sheet supply mode, the printer drives the sheet supply cam 3 to feed the leading end portion of a paper sheet to the position of the registration shutter 5. In the manual sheet supply mode, the printer feeds a paper sheet manually inserted from the sheet supply table 16 by the manual sheet supply roller 17 to the position of the registration shutter 15. Thereafter, when the printer is ready to receive the signal VDO, it sets the signal VSREQ to "true" level. Upon detection of the signal VSREQ of "true" level, the controller sets the signal VSYNC to "true" level, and at the same time, sequentially outputs the signals VDO in synchronism with the signals BD. Upon detection of the signal VSYNC of "true" level, the printer drives the registration solenoid 6 in synchronism with the signal VSYNC to release the registration shutter 5. Thus, the paper sheet 1 is fed to the photosensitive drum 11. The printer turns on a laser beam at a timing at which an image is to be printed in black, and turns off the laser beam at a timing at which the image is to be printed in white, thereby forming a latent image on the photosensitive drum 11. The latent image is then developed by a toner by the developer 14 so as to form a toner image. The toner image on the drum is transferred onto the paper sheet 1 by the transfer charger 15, and is fixed on the paper sheet 1 by the fixing rollers 8 and 8'. Thereafter, the paper sheet 1 is exhausted onto the exhaust tray.

FIG. 8 is a circuit diagram showing the circuit blocks of the VDO signal processing unit 101 which is arranged in an input section of the printer engine section of the laser beam printer having a print resolution of 300 dots/inch, and executes smoothing processing.

Figure 5:
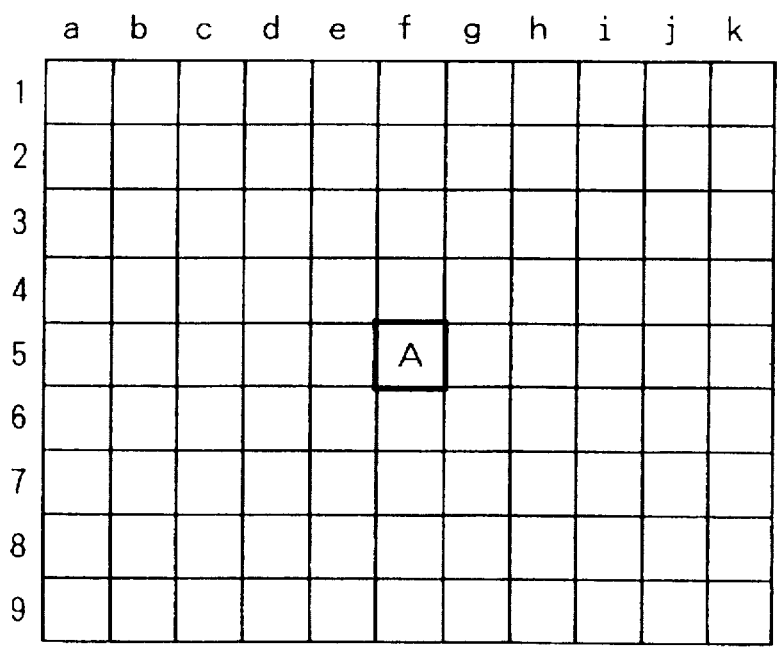
FIG. 5 is a view showing a matrix memory.
Figure 6:
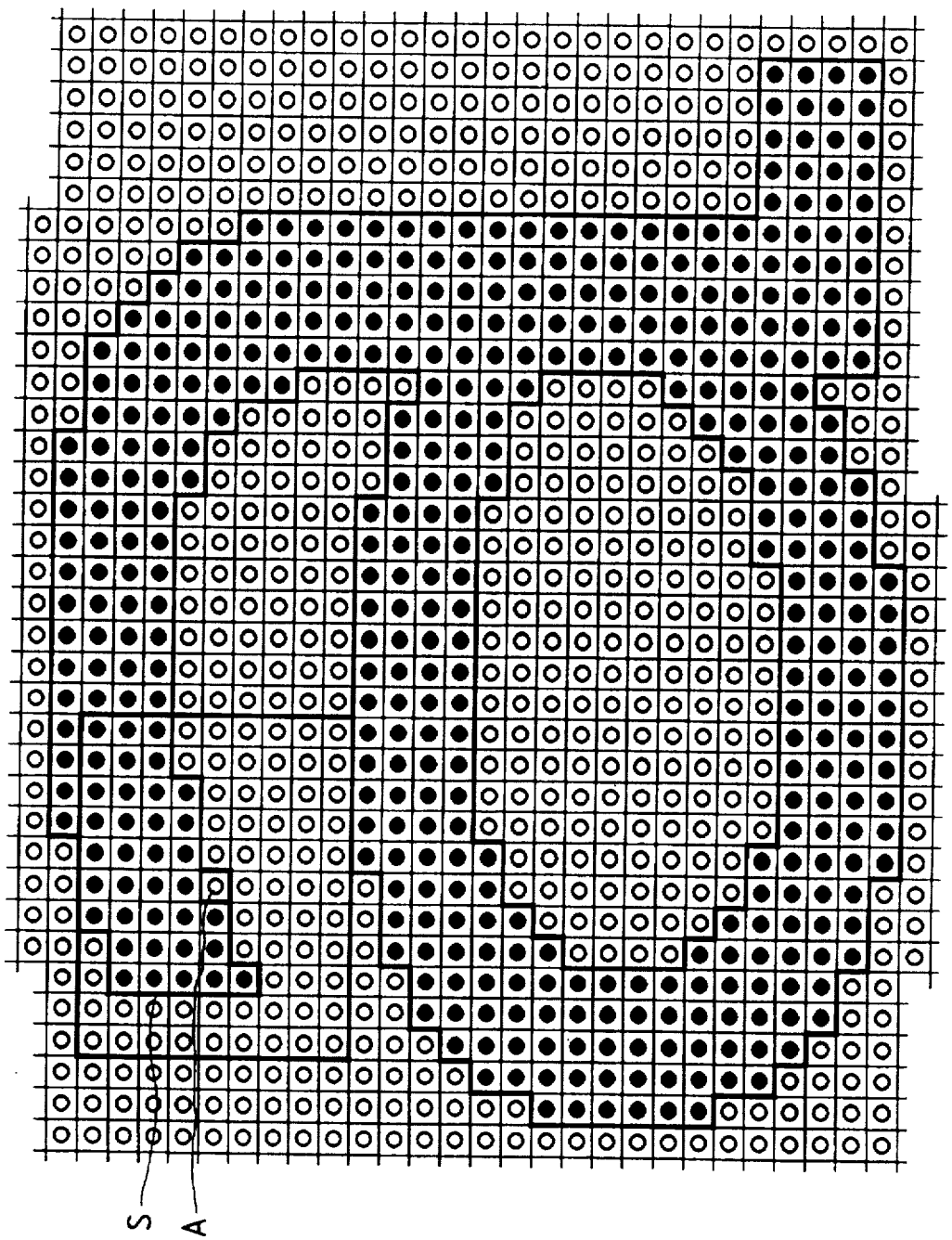
FIG. 6 is a view for explaining a process for storing image data from the dot pattern shown in FIG. 4 in the matrix memory.
Figure 7:
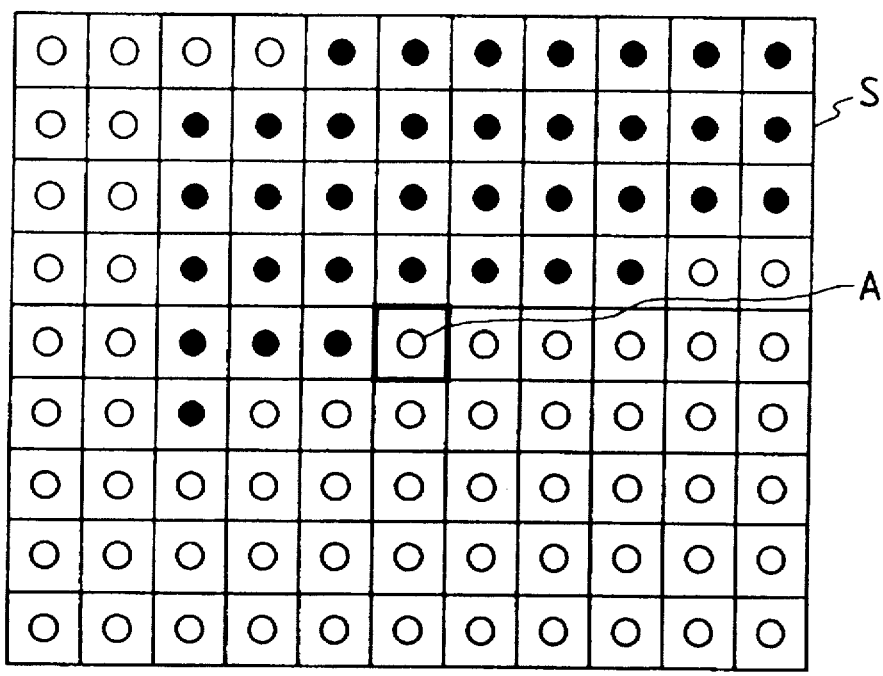
FIG. 7 is a view for explaining a process for storing image data from the dot pattern shown in FIG. 4 in the matrix memory.
Figure 10:
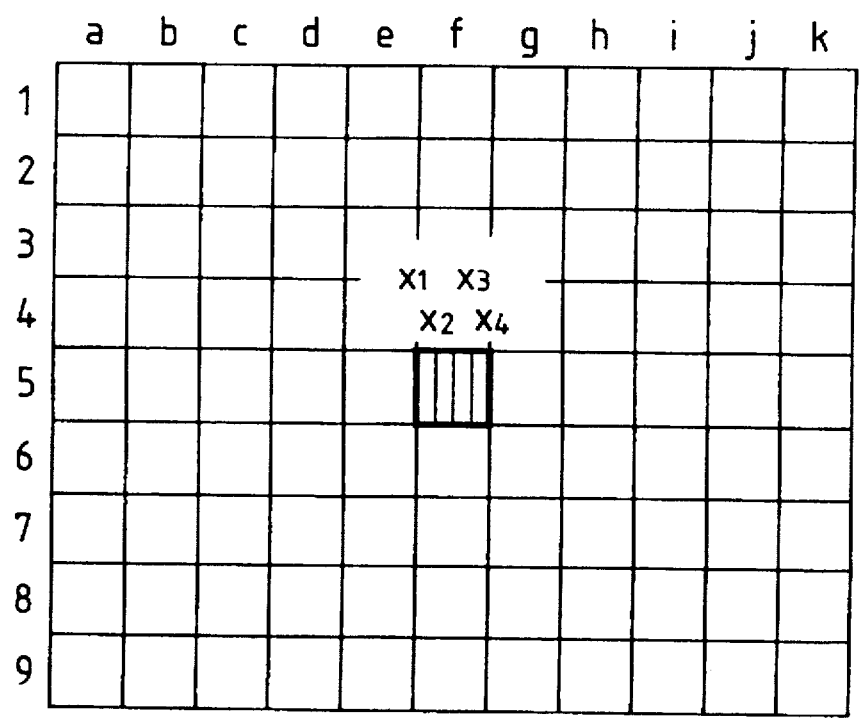
FIG. 10 is a view showing change pixel domains of a pixel of interest adopted in the first embodiment of the present invention.

In the first embodiment of the present invention, as shown in FIG. 5, the features of pixel data in an area (11 pixels in the main scanning direction×9 pixels in the sub-scanning direction=99 pixels) around a pixel A to be printed (the pixel A will be referred to as a pixel of interest hereinafter) are checked, and the pixel of interest is modified in accordance with the checking result. More specifically, when the pixel A of interest in a dot data group of an English letter "a" at a resolution of 300 dots/inch shown in, e.g., FIG. 6 is to be printed, dot data in an area S (11 pixels in the main scanning direction×9 pixels in the sub-scanning direction=99 pixels) around the pixel A of interest are stored in a temporary storage means. Thus, dot information shown in FIG. 7 is stored. Thereafter, the features of the dot data group in the area S are checked, data of the pixel A of interest to be printed is modified in accordance with the features, and the modified data is printed. In this case, the data of the pixel A is changed, so that the edge of a figure constituted by a dot group is smoothly printed. In the first embodiment, as shown in FIG. 10, the pixel A of interest is constituted by four small pixel domains (x1, x2, x3, and x4) divided in the main scanning direction. Therefore, in a print process, the pixel is equivalently printed at a print resolution of 1,200 dots/inch in the main scanning direction×300 dots/inch in the sub-scanning direction.

Referring to FIG. 8, line memories 25 to 33 store an input image signal VDO while shifting it in synchronism with the Clock signal VCLK, and each line memory stores dot information having the main scanning length with respect to a page to be printed. The line memories 25 to 33 are coupled in the order of line memory 1→line memory 2→line memory 3→ ... →line memory 9, and store dot information having the main scanning length for nine nines in the sub-scanning direction. Shift registers (1 to 9) 34 to 42 receive the outputs from the corresponding line memories 1 to 9. The shift registers each have a 11-bit arrangement, and constitute a dot matrix memory (1a to 1k, 2a to 2k, 3a to 3k, ..., 9a to 9k) of 11 dots in the main scanning direction×9 lines in the sub-scanning direction, as shown in FIG. 8. Of the matrix memory, a central dot 5f is defined as a dot of interest. A processing circuit 43 detects the features of data stored in the dot matrix memory for the purpose of smoothing, and modifies the pixel 5f of interest as needed. The processing circuit 43 receives the respective bits (1a to 9k; a total of 99 bits) from the shift registers 1 to 9, and outputs modified parallel signals MDT. The parallel signals MDT are input to a parallel-to-serial (P/S) conversion circuit 44. The P/S conversion circuit 44 converts the input parallel signals MDT into a serial signal VDOM, and thereafter, drives the laser 51 via a laser driver (not shown). In the first embodiment, the parallel signal consists of four bits (X1, X2, X3, and X4).

Similarly, processing for one main scanning line is sequentially performed.

A clock generation circuit 45 receives the signal BD as a main scanning synchronization signal, and generates a clock signal VCK as a clock signal synchronized with the signal BD. The signal VCK has a frequency four times a clock frequency f0 required for realizing recording at 300 dots/inch in the main scanning direction. The serial signal VDOM is sequentially output in synchronism with the clock signal VCK. A frequency division circuit 46 receives the clock signal VCK, and divides the input signal by 4 to generate a clock signal VCKN having the frequency f0. The clock signal VCKN is used as a synchronization clock when the processing circuit 43 fetches dot data from the dot matrix memory.

Referring to FIG. 8, when the controller transmits an image signal VDO at 300 dots/inch to the printer in synchronism with the clock signal VCLK, image dot data are sequentially stored in the line memories 1 to 9, and at the same time, the shift registers 1 to 9 fetch dot matrix information of 11 dots in the main scanning direction×9 dots in the sub-scanning direction from the dot data in the line memories 1 to 9. Thereafter, the processing circuit 43 detects the features of the dot matrix information, and generates and prints modified data consisting of four data X1 to X4 equally divided in the main-scanning direction for the pixel of interest in accordance with the detected features.

FIGS. 11A and 11B, and FIG. 12 are views for explaining an algorithm for extracting the features of a dot pattern from the entire matrix area of 11 dots in the main scanning direction×9 dots in the subscanning direction, and checking if the dot pattern of interest is a dot pattern to be smoothed.

The algorithm will be described below with reference to FIGS. 11A to 12. FIG. 11A shows a reference area of 11 dots in the main scanning direction×9 dots in the subscanning direction. In FIG. 11A, 99 pixels are expressed by a matrix of a, b, c, d, e, f, g, h, i, j, and k in the main scanning direction, and 1, 2, 3, 4, 5, 6, 7, 8, and 9 in the sub-scanning direction. For example, the central pixel is expressed by 5f. The central pixel is selected as a pixel to be modified upon smoothing. FIG. 11B shows 17 areas X1 to X8, Y1 to Y8, and 5f obtained by dividing the reference area shown in FIG. 11A. The area X1 consists of six dots 3d, 3e, 3f, 4d, 4e, and 4*f*; the area X2 consists of six dots 3*f*, 3*g*, 3*h*, 4*f*, 4*g*, and 4*h*; the area X3 consists of six dots 6*d*, 6*e*, 6*f*, 7*d*, 7*e*, and 7*f*; the area X4 consists of six dots 6*f*, 6*g*, 6*h*, 7*f*, 7*g*, and 7*h*; the area X5 consists of six dots 3*d*, 3*e*, 4*d*, 4*e*, 5*d*, and 5*e*; the area X6 consists of six dots 5*d*, 5*e*, 6*d*, 6*e*, 7*d*, and 7*e*; the area X7 consists of six dots 3*g*, 3*h*, 4*g*, 4*h*, 5*g*, and 5*h*; and the area X8 consists of six dots 5*g*, 5*h*, 6*g*, 6*h*, 7*g*, and 7*h*. The area Y1 consists of nine dots 1*a*, 1*b*, 1*c*, 2*a*, 2*b*, 2*c*, 3*a*, 3*b*, and 3*c*; the area Y3 consists of nine dots 1*i*, 1*j*, 1*k*, 2*i*, 2*j*, 2*k*, 3*i*, 3*j*, and 3*k*; the area Y4 consists of nine dots 4*i*, 4*j*, 4*k*, 5*i*, 5*j*, 5*k*, 6*i*, 6*j*, and 6*k*; the area Y5 consists of nine dots 7*i*, 7*j*, 7*k*, 8*i*, 8*j*, 8*k*, 9*i*, 9*j*, and 9*k*; the area Y7 consists of nine dots 7*a*, 7*b*, 7*c*, 8*a*, 8*b*, 8*c*, 9*a*, 9*b*, and 9*c*; and the area Y8 consists of nine dots 4*a*, 4*b*, 4*c*, 5*a*, 5*b*, 5*c*, 6*a*, 6*b*, and 6*c*. The area Y2 consists of ten dots 1*d*, 1*e*, 1*f*, 1*g*, 1*h*, 2*d*, 2*e*, 2*f*, 2*g*, and 2*h*, and the area Y6 consists of ten dots 8*d*, 8*e*, 8*f*, 8*g*, 8*h*, 9*d*, 9*e*, 9*f*, 9*g*, and 9*h*. In this manner, the above-mentioned reference area can be divided into the eight areas (X1 to X8) each consisting of six dots, the six areas (Y1, Y3, Y4, Y5, Y7, and Y8) each consisting of nine dots, the two areas (Y2 and Y6) each consisting of ten dots, and the central pixel 5*f*.

Figure 13:
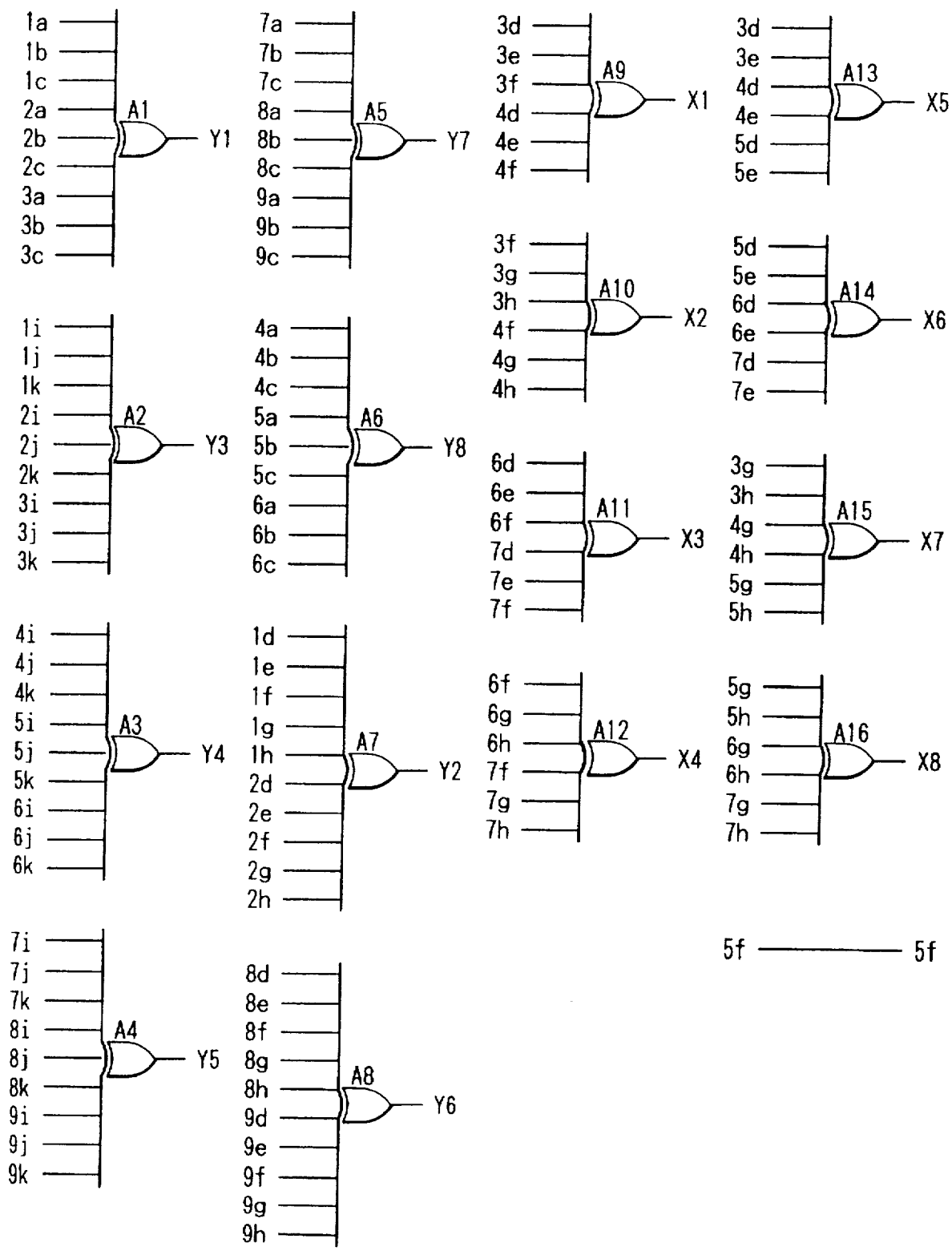
FIGS. 13 to 15 are circuit diagrams showing examples of a circuit of a feature extraction section of the present invention.
Figure 14:
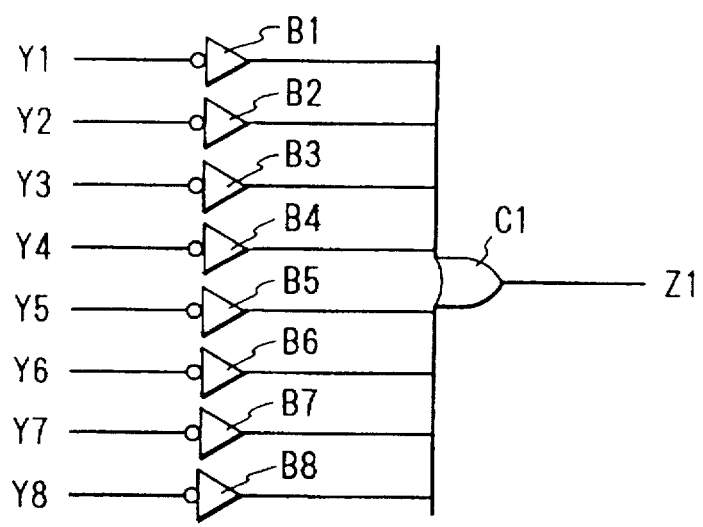

Note that the feature of each area is expressed by X*n* or Y*n*. When dots in each area are the same (all pixels are ● <white pixels> or all pixels are ○ <black pixels>, the feature (X*n* or Y*n*) of the area is set to be "0". On the other hand, when at least one of dots in each area is different from other dots (● <white pixels> and ○ <black pixels> are mixed), the feature (X*n* or Y*n*) of the area is set to be "1". For example, when dots in the area X1 are all ○ dots, the feature of the area X1 is X1="0"; when dots in the area X1 are all ● dots, the feature of the area X1 is X1="0"; and when dots in the area X1 include both ● and ○ dots, the feature of the area X1 is X1="1". The feature of each area is detected by a circuit shown in FIG. 13. Referring to FIG. 13, exclusive OR gates A1 to A16 calculate exclusive ORs (when all input signals are the same, each circuit outputs "0"; when at least one of input signals is different, each circuit outputs "1") of all pixel signals in the corresponding areas (X1 to X8 and Y1 to Y8). In this manner, X1 to X8 and Y1 to Y8 are obtained as the features of the areas. A circuit shown in FIG. 14 .detects if at least one of the features Y*n* of the areas Y1 to Y8 in the features of the areas is "0". Referring to FIG. 14, the circuit includes inverter circuits B1 to B8 and an OR gate C1. More specifically, the feature signals Y1 to Y8 of the areas are logically inverted by the inverter circuits B1 to B8, respectively, and the inverted signals are input to the OR gate C1. The OR gate C1 outputs "1" as an output Z1 when at least one of the signals Y1 to Y8 is "0".

In order to supplement the above description, a further detailed description will be given below.

The print operation process in the controller 200 shown in FIG. 3 will be described below with reference to FIG. 48. Referring to FIG. 48, an image memory 114 stores bit-map data (image data) for one page. An address generation unit 115 generates an address of the image memory 114. An output buffer register 116 converts image data read out from the image memory 114 into an image signal VDO. A sync clock generation circuit 117 generates an image clock signal VCLK synchronous with a known beam detect (BD) signal as a horizontal synchronization signal. A CPU 118 controls the entire controller. A printer interface (I/F) 119 serves as an I/O unit with the printer engine 100. A host I/F 120 serves as an I/O unit of signals with an external host apparatus such as a personal computer.

An operation executed when the image signal VDO is output to the printer engine in the above-mentioned arrangement will be described below.

When image data for one page is prepared in the image memory 114, the controller 200 sends a print request signal PRNT to the printer engine 100. Upon reception of the signal PRNT, the printer engine 100 starts a print operation. When the printer engine 100 is ready to receive a vertical synchronization signal VSYNC and to perform a print operation, it outputs a signal VSREQ to the controller 200. Upon reception of the signal VSREQ, the controller 200 sends the vertical synchronization signal VSYNC to the printer engine 100, and counts a predetermined period of time from the signal VSYNC so as to start the print operation from a predetermined position in the sub-scanning direction. Upon completion of the count operation of the predetermined period of time, the address generation unit 115 sequentially generates addresses from the start address of image data stored in the image memory 114 to read out the image data. The readout image data is input to the output. buffer register 116 in units of main scanning lines. In order to start the print operation from a predetermined position in the main scanning direction, the output buffer register 116 counts a predetermined number of pulses of the image clock signal VCLK from when the signal BD is input for each print line, and thereafter, outputs the data of the corresponding print line to the printer engine 100 as an image signal VDO synchronous with the signal VCLK. Then, the printer engine 100 performs the above-mentioned image formation operation.

When the above-mentioned operation is executed in units of print pages, the print operation can always be started from the same positions on paper sheets.

Figure 49:
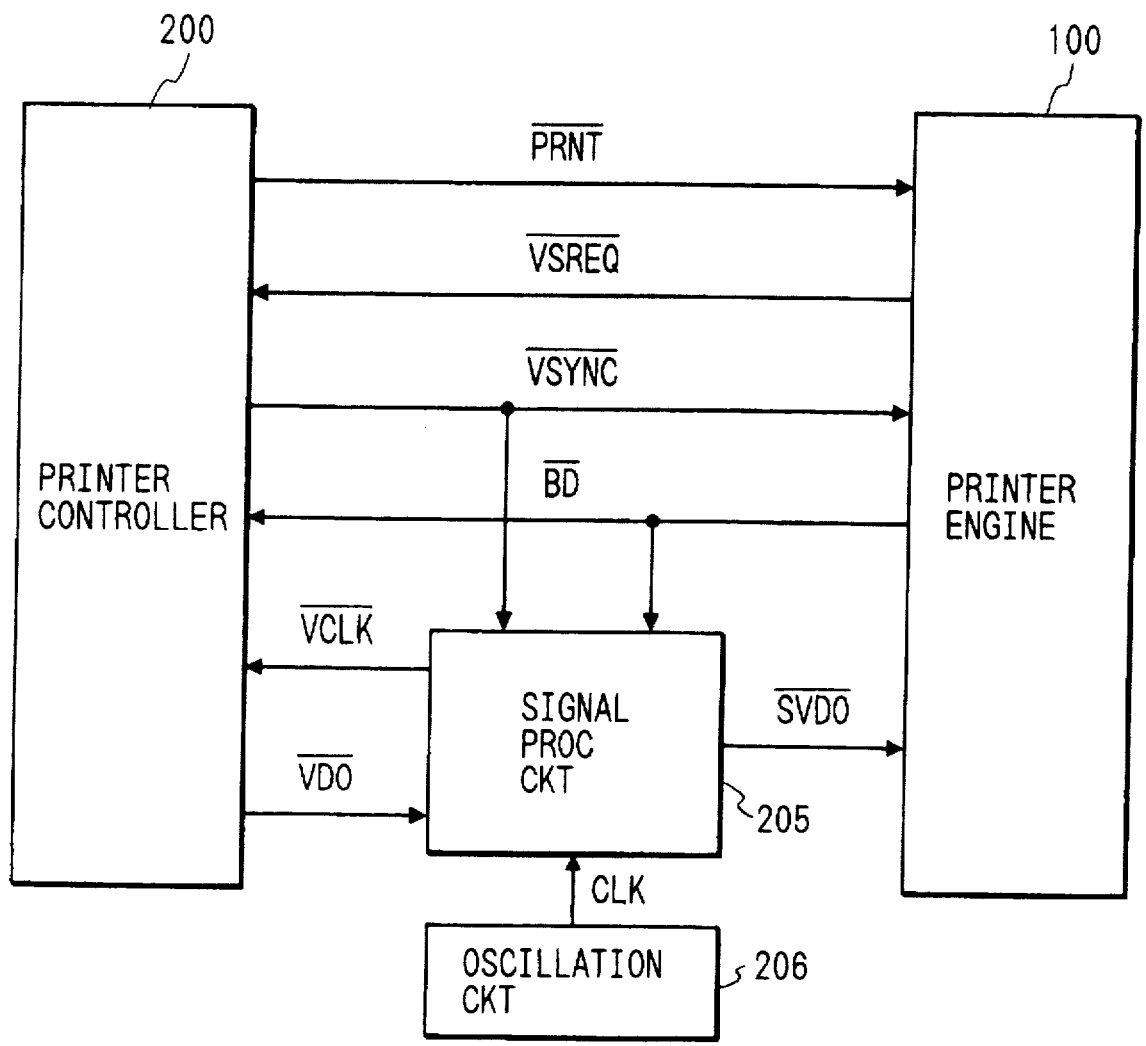
FIGS. 49 and 50 are block diagrams showing in detail a laser beam printer of this embodiment.

FIG. 49 is a block diagram showing in detail an embodiment to which an image processing apparatus according to the present invention is applied. A laser beam printer shown in FIG. 49 is mainly constituted by the printer engine 100, the controller 200, a signal processing circuit 205, and an oscillation circuit 206. The signal processing circuit 205 of this embodiment is functionally located between the controller 200 and the printer engine 100. The signal processing circuit 205 increases the resolution, in the main scanning direction of a 300-dpi image signal VDO output from the controller 200 to 1,200 dpi four times that of the signal VDO, and outputs the processed signal as a smoothed signal SVDO to the printer engine 100.

Other input/output signals of the signal processing circuit 205 will be described below. The circuit 205 receives signals VDO and VSYNC from the controller 200. Also, the circuit 205 receives a horizontal synchronization signal, i.e., a signal BD, from the printer engine 100. The circuit 205 outputs, to the controller 200, an image clock signal, i.e., a signal VCLK which is used as a clock signal for the signal VDO, and is synchronous with the signal BD. Furthermore, a signal CLK input from the oscillation circuit 206 is used as a fundamental clock signal in the signal processing circuit 205, and has a frequency eight times that of the signal VCLK. The signal VCLK is generated by frequency-dividing the signal CLK by 8 at a timing synchronous with the signal BD, and its synchronization accuracy with respect to the signal BD is ⅛ of its own period. Therefore, an image shift (jitter), in the main scanning direction, from the signal BD is maintained within ⅛ of one dot, and high image quality can be assured.

An example of signal processing executed in the signal processing circuit 205 will be described below.

FIGS. 23A to 23D are views for explaining smoothing processing for a figure whose boundary portion has an inclination of ½ (a lateral line inclined at 45° or less). In each of FIGS. 23A to 23D, when the bit pattern in the left figure is detected, the pixel of interest (central pixel) is modified, as shown in the right figure. FIGS. 25A to 28C show the detailed algorithms corresponding to FIGS. 23A to 23D.

FIGS. 25A to 25C show the detailed algorithm corresponding to FIG. 23A. If the areas X5="0" and X2="0" and at least one of the areas Y1 to Y8, X3, and X4 is "0", as shown in FIG. 25B, and if the bit pattern is defined by $7a=7b=6c=6d=5e=5f=4g=4h=3i=3j=2k=0$ and $8a=8b=7c=7d=6e=6f=5g=5h=4i=4j=3k=1$, as shown in FIG. 25A, the pixel of interest (central pixel) $5f$ is modified to $x1=0$, $x2=0$, $x3=1$, and $x4=1$, and the modified pixel is output.

Figure 29:
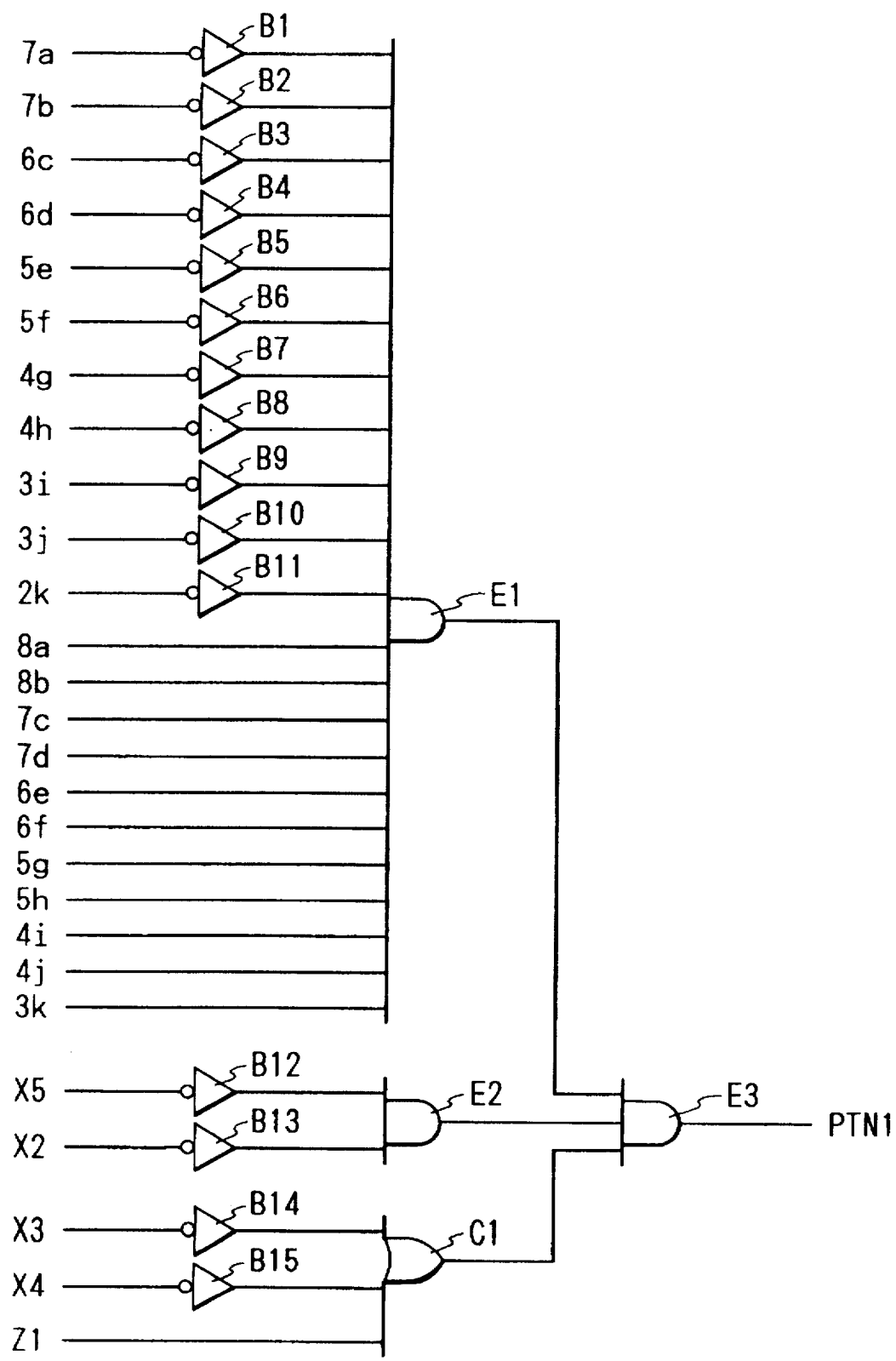
FIG. 29 is a circuit diagram showing a feature extraction circuit corresponding to FIG. 16.

FIG. 29 shows a circuit for realizing the above-mentioned algorithm. Referring to FIG. 29, the circuit includes inverter circuits B1 to B15, AND gates E1 to E3, and an OR gate C1. The AND gate E2 receives information signals of the areas X2 and X5, the OR gate C1 receives information signals of the areas X3, X4, and Y1 to Y8 (Z1), and the AND gate E2 receives information of the bit pattern. When the above-mentioned condition is satisfied, the AND gate E3 outputs "1" as an output PTN1; otherwise, the AND gate E3 outputs "0". The output PTN1 is connected to the input terminal of an OR gate Q4 in a circuit shown in FIG. 15 (to be described later).

FIGS. 26A to 26C are views for explaining the detailed algorithm corresponding to FIG. 23B. If the area X1="0" and at least one of the areas Y1 to Y8, X7, X3, and X4 is "0", as shown in FIG. 26B, and if the bit pattern is defined by $7a=6b=6c=5d=5e=4f=4g=3h=3i=2j=2k=0$ and $8a=7b=7c=6d=6e=5f=5g=4h=4i=3j=3k=1$, as shown in FIG. 26A, the pixel of interest (central pixel) $5f$ is modified to $x1=0$, $x2=0$, $x3=1$, and $x4=1$, and the modified pixel is output.

Figure 30:
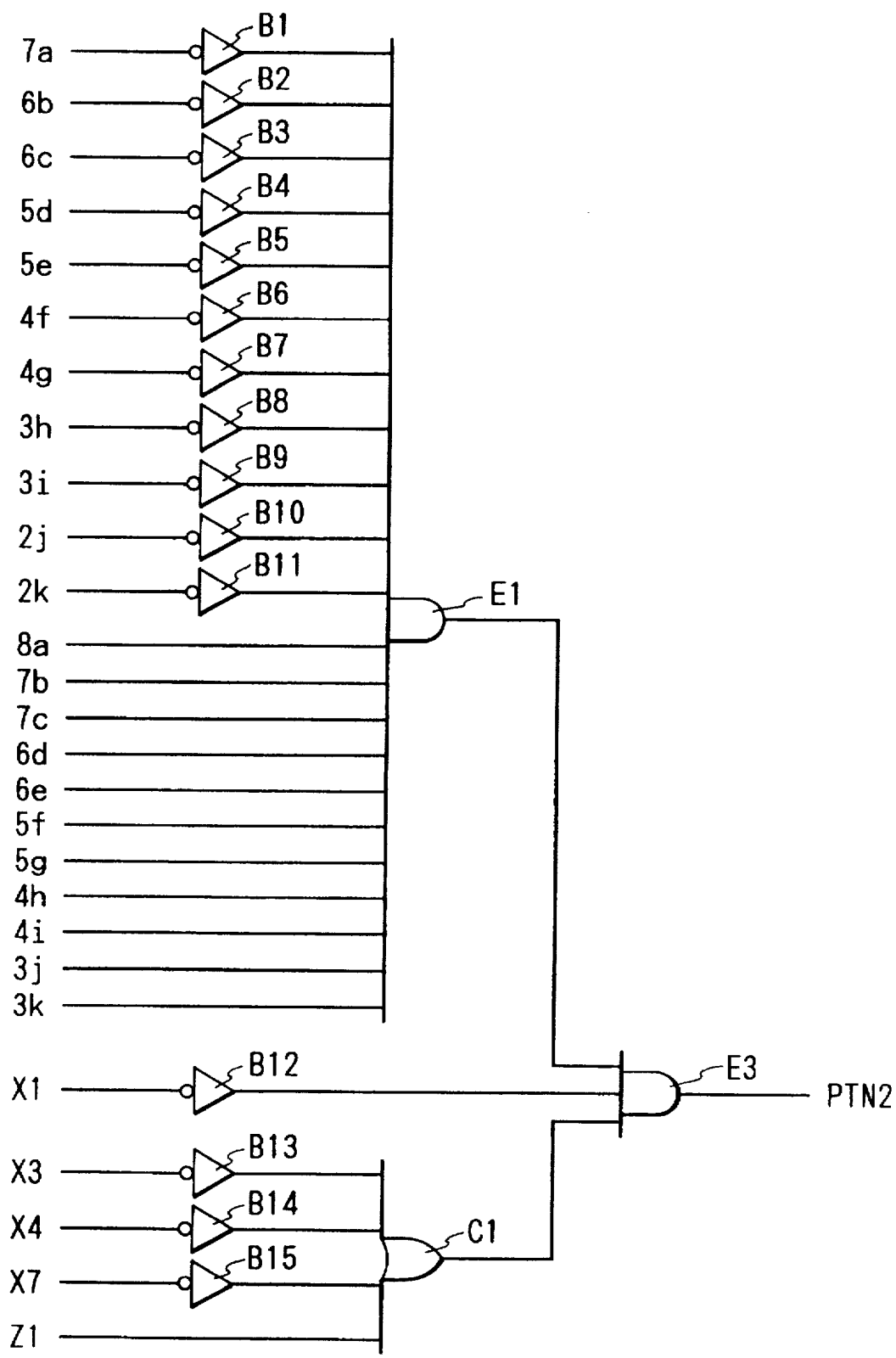
FIG. 30 is a circuit diagram showing a feature extraction circuit corresponding to FIG. 17.

FIG. 30 shows a circuit for realizing the above-mentioned algorithm. Referring to FIG. 30, the circuit includes inverter circuits B1 to B15, AND gates E1 and E3, and an OR gate C1. The inverter circuit B12 receives an information signal of the area X1, and the OR gate C1 receives information signals of the areas X3, X4, X7, and Y1 to Y8 (Z1), and the AND gate E1 receives information of the bit pattern. When the above-mentioned condition is satisfied, the AND gate E3 outputs "1" as an output PTN2; otherwise, the AND gate E3 outputs "0". The output PTN2 is connected to the input terminal of an OR gate Q13 in FIG. 19 (to be described later).

FIGS. 27A to 27C are views for explaining the detailed algorithm corresponding to FIG. 23C. If the area X8="0" and X3="0", and at least one of the areas Y1 to Y8, X1, and X2 is "0", as shown in FIG. 27B, and the bit pattern is defined by $7a=6b=6c=5d=5e=4f=4g=3h=3i=2j=2k$ $7b=7c=6d=6e=5f=5g=4h=4i=3j=3k=0$, shown in FIG. 27A, the pixel of interest (central pixel) $5f$ is modified to $x1=1$, $x2=1$, $x3=0$, and $x4=0$, and the modified pixel is output.

Figure 31:
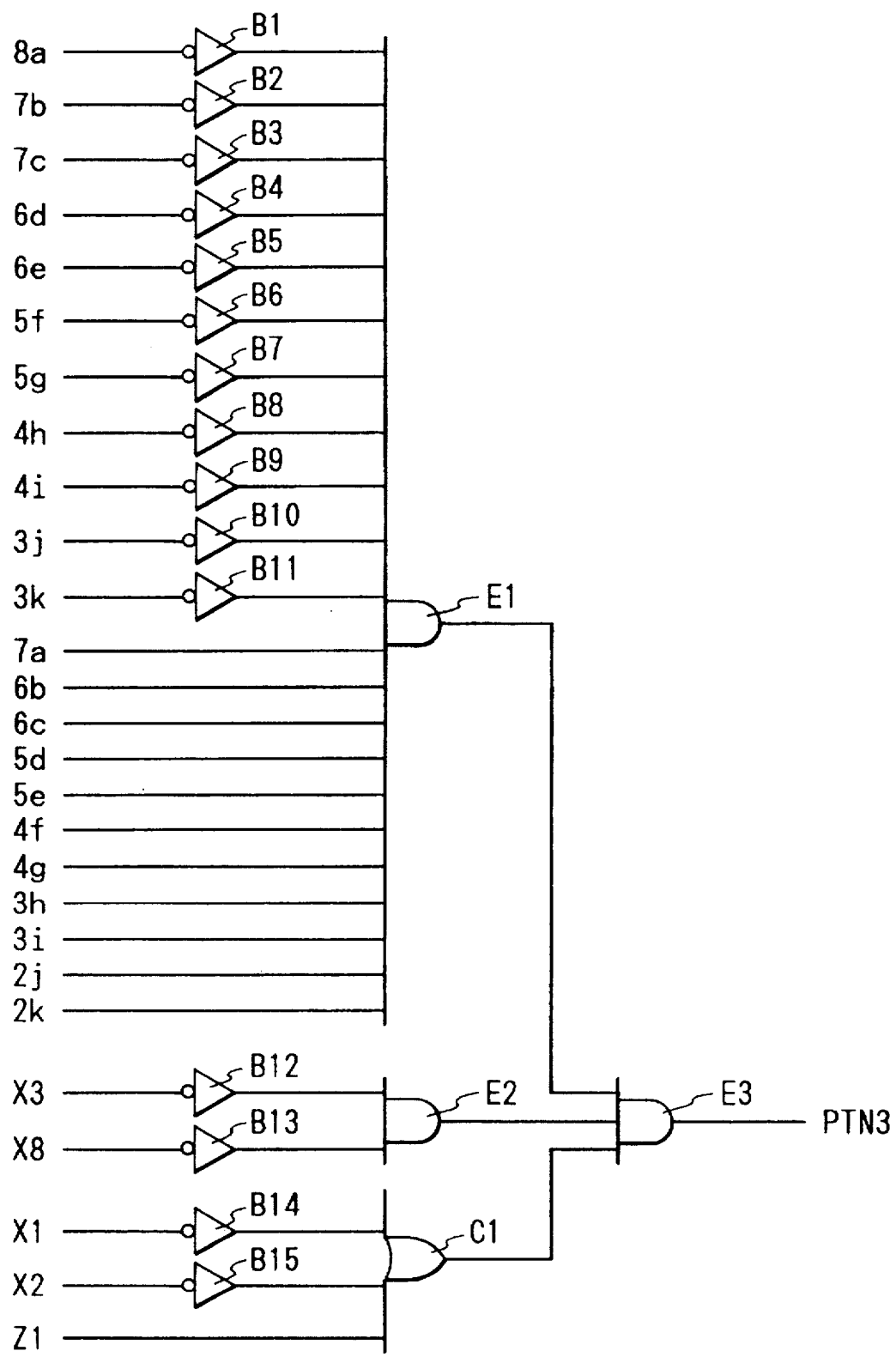
FIG. 31 is a circuit diagram showing a feature extraction circuit corresponding to FIG. 18.

FIG. 31 shows a circuit for realizing the above-mentioned algorithm. Referring to FIG. 31, the circuit includes inverter circuits B1 to B15, AND gates E1 to E3, and an OR gate C1. The AND gate E2 receives information signals of the areas X3 and X8, the OR gate C1 receives information signals of the areas X1, X2, and Y1 to Y8 (Z1), and the AND gate E1 receives information of the bit pattern. When the above-mentioned condition is satisfied, the AND gate E3 outputs "1" as an output PTN3; otherwise, the AND gate E3 outputs "0". The output PTN3 is connected to the input terminal of the OR gate Q4 in the circuit shown in FIG. 15 (to be described later).

Figure 28A:
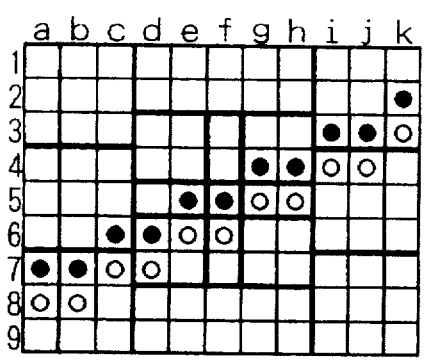
Figure 28B:
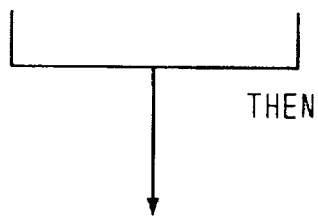
Figure 28C:
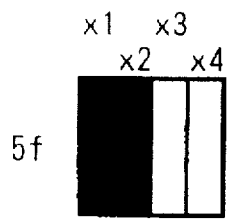

FIGS. 28A to 28C are views for explaining the detailed algorithm corresponding to FIG. 23D. If the areas X4="0" and X8=0, and at least one of the areas Y1 to Y8, X1, X2, and X6 is "0", as shown in FIG. 28B, and if the bit pattern is defined by $7a=7b=6c=6d=5e=5f=4g=4h=3i=3j=2k=8b=7c=7d=6e=6f=5g=5h=4i=4j=3k=0$, as shown in FIG. 28A, the pixel of interest (central pixel) $5f$ is modified to $x1=1$, $x2=1$, $x3=0$, and $x4=0$, and the modified pixel is output.

Figure 32:
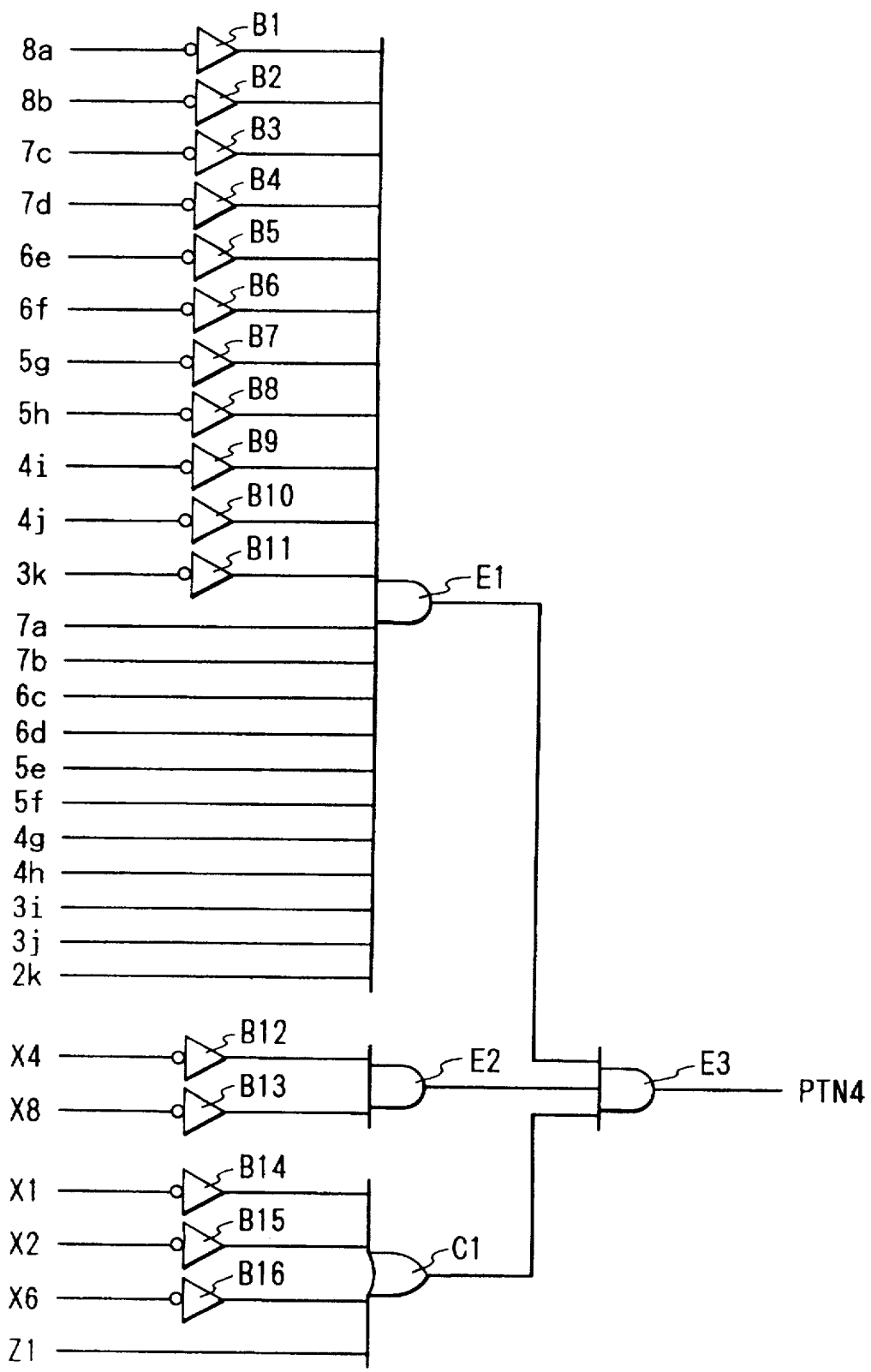
FIG. 32 is a circuit diagram showing a feature extraction circuit corresponding to FIG. 19.

FIG. 32 shows a circuit for realizing the above-mentioned algorithm. Referring to FIG. 32, the circuit includes inverter circuits B1 to B16, AND gates E1 to E3, and an OR gate C1. The AND gate E2 receives information signals of the areas X4 and X8, the OR gate C1 receives information signals of the areas X1, X2, X6, and Y1 to Y8 (Z1), and the AND gate E1 receives information of the bit pattern. When the above-mentioned condition is satisfied, the AND gate E3 outputs "1" as an output PTN4; otherwise, the AND gate E3 outputs "0". The output PTN4 is connected to the input terminal of an OR gate Q13 in the circuit shown in FIG. 15 (to be described later).

FIGS. 34A to 34D are views for explaining smoothing processing for a figure whose boundary portion has an inclination of ½ (a longitudinal line inclined at 45° or more). In each of FIGS. 34A to 34D, when the bit pattern in the left figure is detected, the pixel of interest (central pixel) is modified, as shown in the right figure. FIGS. 35A to 38C show the detailed algorithms corresponding to FIGS. 34A to 34D.

Figure 34A:
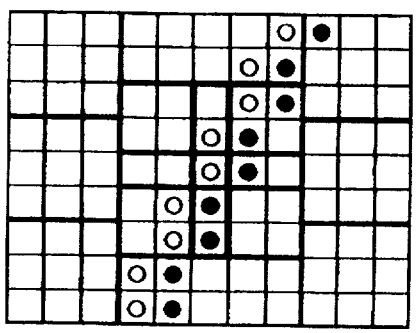
FIGS. 34A to 34D are views for explaining smoothing processing for a longitudinal line inclined at 45° or more.

FIGS. 35A to 35C are views for explaining the detailed algorithm corresponding to FIG. 34A. If the areas X1="0" and X6="0", and at least one of the areas Y1 to Y8, X4, and X7 is "0", as shown in FIG. 35B, and if the bit pattern is defined by $1h=2g=3g=4f=5f=6e=7e=8d=9d=0$ and $1i=2h=4g=5g=6f=7f=8e=9e=1$, as shown in FIG. 35A, the pixel of interest (central pixel) $5f$ is modified to $x1=0$, $x2=0$, $x3=0$, and $x4=1$, and the modified pixel is output.

Figure 34C:
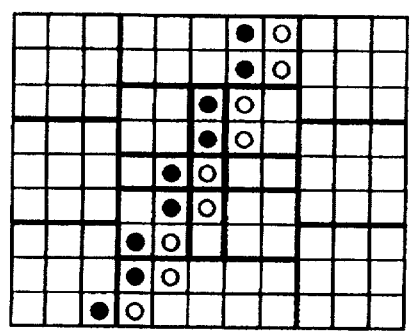
Figure 34B:
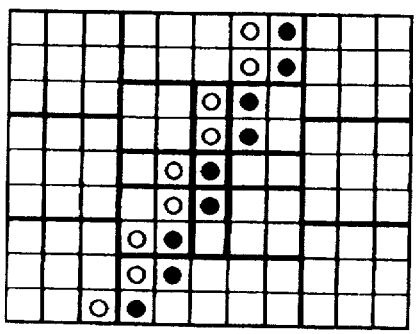

FIGS. 36A to 36D are views for explaining the detailed algorithm corresponding to FIG. 34B. If the area X5="0", and at least one of the areas Y1 to Y8, X3, X8, and X7 is "0", as shown in FIG. 36B, and if the bit pattern is defined by $1h=2h=3g=4g=5f=6f=7e=8e=9d=1$ and $1g=2g=3f=4f=5e=6e=8d=9c=0$, as shown in FIG. 36A, the pixel of interest (central pixel) $5f$ is modified to $x1=0$, $x2=1$, $x3=1$, and $x4=1$, and the modified pixel is output.

FIGS. 37A to 37C are views for explaining the detailed algorithm corresponding to FIG. 34C. If the areas X4=0 and X7=0, and at least one of the areas Y1 to Y8, X1, and X6 is "0", as shown in FIG. 37B, and if the bit pattern is defined by $1h=2h=3g=4g=5f=6f=7e=8e=9d=0$ and $1g=2g=3f=4f=5e=6e=7d=8d=9c=1$, as shown in FIG. 37A, the pixel of interest (central pixel) $5f$ is modified to $x1=1$, $x2=0$, $x3=0$, and $x4=0$, and the modified pixel is output.

Figure 34D:
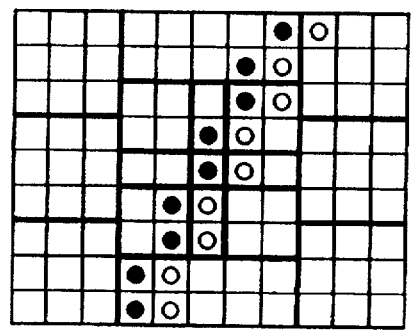

FIGS. 38A to 38C are views for explaining the detailed algorithm corresponding to FIG. 34D. If the areas X4="0" and X8="0", and at least one of the areas Y1 to Y8, X1, and X8 is "0" as shown in FIG. 38B, and if the bit pattern is defined by $1h=2g=3g=4f=5f=6e=7e=8d=9d=1$ and $1i=2h=3h=4g=5g=6f=7f=8e=9e=0$, as shown in FIG. 38A, the pixel of interest (central pixel) $5f$ is modified to $x1=1$, $x2=1$, $x3=1$, and $x4=0$, and the modified pixel is output.

In practice, the patterns shown in FIGS. 23A to 23D also have feature extraction patterns obtained by horizontally reversing the above-mentioned patterns to have the pixel of interest (central pixel) as the center (a total of eight patterns). The patterns shown in FIGS. 34A to 34D also have feature extraction patterns obtained by horizontally reversing the above-mentioned patterns to have the pixel of interest (central pixel) as the center (a total of eight patterns).

For example, a pattern obtained by horizontally reversing the feature extraction pattern shown in FIG. 23A is as shown in FIG. 24. In a smoothing algorithm in this case, if the bit pattern is defined by $2a=3b=3c=4d=4e=5f=5g=6h=6i=7j=0$ (● dots) and $3a=4b=4c=5d=5e=6f=6g=7h=7i=8j=8k=1$ (○ dots), and if X7=X1="0" and at least one of Y1 to Y8, X3, and X4 is "1", the pixel 5f of interest is modified to x1=1, x2=1, x3=0, and x4=0.

Similarly, horizontally symmetrical algorithms are set for FIGS. 23B, 23C, and 23D.

Since the horizontally symmetrical feature extraction algorithms are prepared, smoothing for, e.g., characters "O", "U", "V", "W", and the like are achieved by symmetrical algorithms, and the smoothed characters can have natural appearances.

Figure 15:
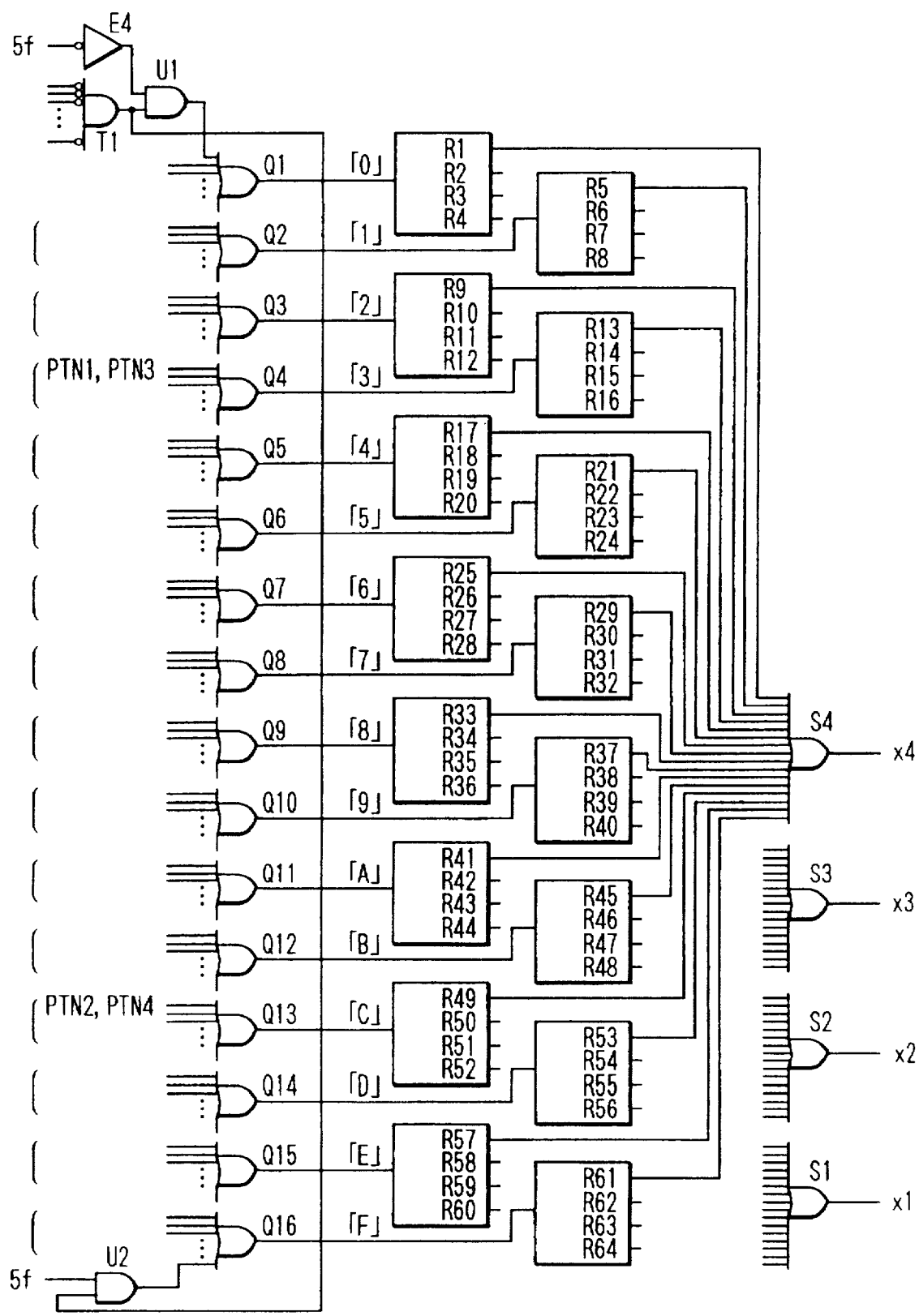
Figure 16:
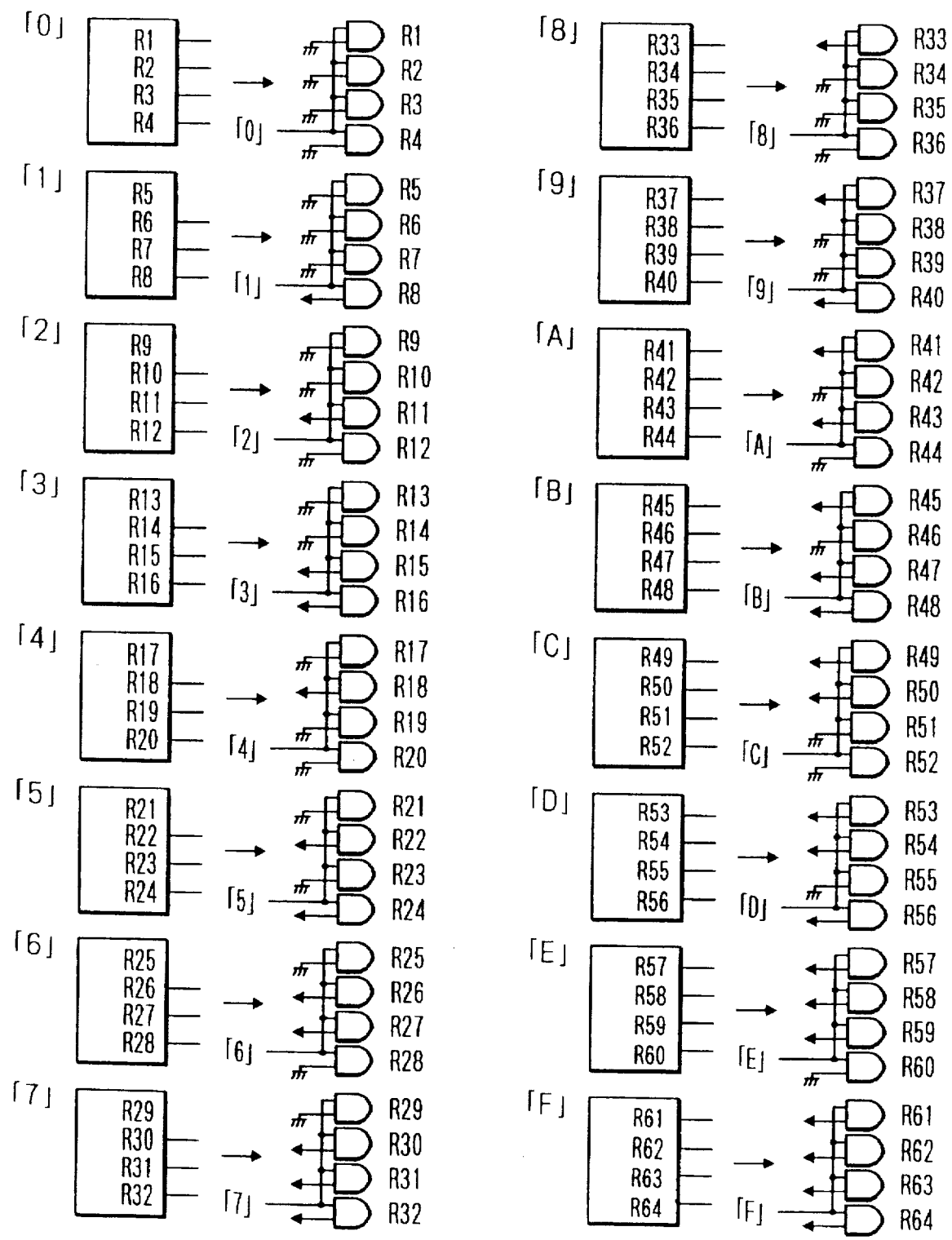
FIG. 16 is a circuit diagram showing in detail a portion of FIG. 15.

FIGS. 15 and 16 show a data generation circuit for receiving output signals from a plurality of feature detection circuits including the above-mentioned feature detection circuits, and generating data of the pixel 5f of interest in correspondence with the input signals. Note that FIG. 16 shows in detail some circuits shown in FIG. 15. Referring to FIGS. 15 and 16, the circuit includes OR gates Q1 to Q16, 2-input AND gates R1 to R61, U1, and U2, 16-input OR gates S1 to S4, an inverter circuit E4, and a NOR gate T1. Each of the output signals from the feature detection circuits extracted as the plurality of features is connected to one of the OR gates Q1 to Q16. Of the outputs from the above-mentioned feature detection circuits, the outputs PTN1 and PTN3 are connected to the OR gate Q4, and the outputs PTN2 and PTN4 are connected to the OR gate Q13, and so on.

The signals, including the outputs PTN1 to PTN4, from all the feature detection circuits are connected to the NOR gate T1. In correspondence with outputs "1" from the OR gates Q1 to Q16, code generation circuits each constituted by four out of the AND gates R1 to R64 generate codes "0" to "F" as 4-bit codes of $2^0$ (R4 output), $2^1$ (R3 output), $2^2$ (R2 output), and $2^3$ (R1 output). The $2^0$'s digits of these code outputs are logically ORed by the OR gate S1, and the OR is output as an output from the OR gate S1, i.e., x1. The $2^1$'s digits of these code outputs are logically ORed by the OR gate S2, and the OR is output as an output from the OR gate S2, i.e., x2. The $2^2$'s digits of these code outputs are logically ORed by the OR gate S3, and the OR is output as an output from the OR gate S3, i.e., x3. The $2^3$'s digits of these code outputs are logically ORed by the OR gate S4, and the OR is output as an output from the OR gate S4, i.e., x4.

In this manner, one of codes "0" to "F" corresponding to the output from one of the OR gates Q1 to Q16, which are never simultaneously selected, is obtained as the outputs from the OR gates S1 to S4, i.e., the outputs x1 to x4.

For example, when the code is "3", x1=1, x2=1, x3=0, and x4=0; when the code is "9", x1=1, x2=0, x3=0, and x4=1.

Since the NOR gate T1 receives all feature coincidence signals, if none of the feature coincidence signals become "1" (i.e., if no coincidence of features is found), the NOR gate T1 outputs "1". At this time, if the pixel 5f of interest is a ○ dot, the output from the 2-input AND gate U1 goes to "1", which sets the output from the OR gate Q1 to "1", and the code "0" is output to x1 to x4 (x1=0, x2=0, x3=0, and x4=0); if the pixel 5f of interest is a ● dot, the output from the 2-input AND gate U2 goes to "1", which sets the output from the OR gate Q16 to "1", and the code "F" is output to x1 to x4 (x1=1, x2=1, x3=1, and x4=1). In this manner, when a pattern does not coincide with a predetermined feature, the data of the pixel 5f of interest is preserved and printed without any modifications.

The outputs x1 to x4 from the data generation circuit are input to the known P/S conversion circuit 44, and the circuit 44 generates a signal VDOM (a signal SVDO) which is output in the order of x1, x2, x3, and x4 in synchronism with a clock signal VCK. The signal VDOM drives the laser via the laser driver.

Figure 22A:
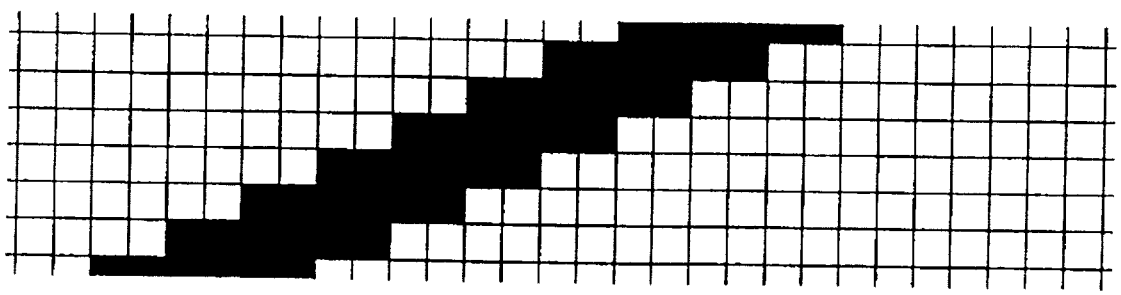
FIGS. 22A and 22B are views for explaining a smoothing effect of this embodiment for a lateral line inclined at 45° or less.
Figure 22B:
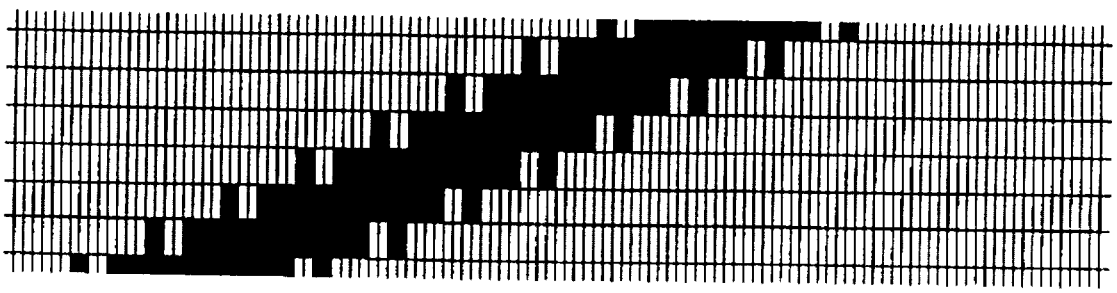

FIG. 22B shows an output image signal obtained when a lateral line which is inclined at 45° or less shown in FIG. 22A is smoothed using the above-mentioned algorithm. As can be seen from FIGS. 22A and 22B, pulse-width signal components to be added to each left boundary portion of a line image, and those to be deleted from a portion between the central portion and the left boundary portion of the line image, are processed to have the same time width. The same processing is performed for each right boundary portion of the line image. Also, the pulse width to be added to each left boundary portion of the line image and that to be added to each right boundary edge are processed to become equal to each other.

Figure 33A:
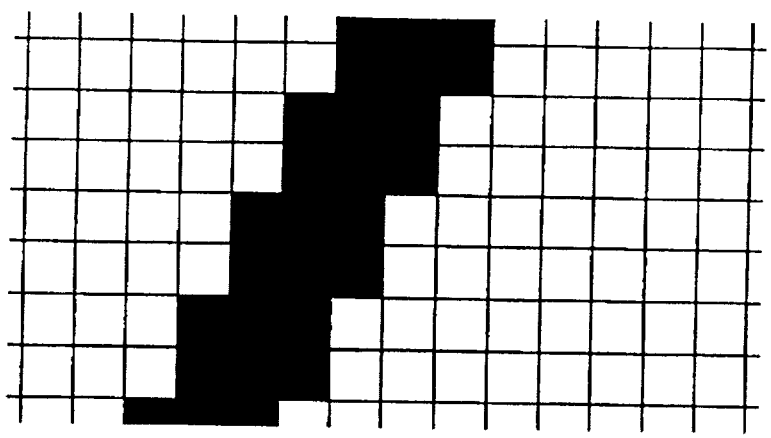
FIGS. 33A and 33B are views for explaining a smoothing effect for a longitudinal line inclined at 45° or less.
Figure 33B:
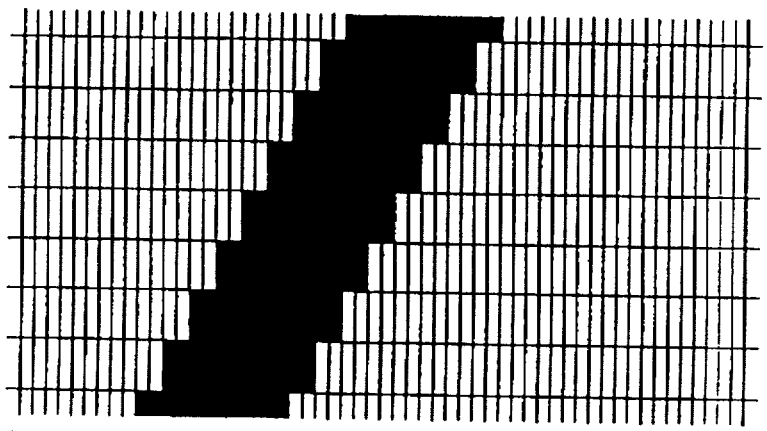

FIG. 33B shows an output image signal obtained when a longitudinal line which is inclined at 45° or more shown in FIG. 33A is smoothed using the above-mentioned algorithm. As can be seen from FIGS. 33A and 33B, the same signal width components as those added to (or deleted from) each left-end boundary portion of a line image are deleted from (or added to) each right-end boundary portion. As a result, the width of a smoothed line is not changed from that before smoothing.

With the above-mentioned processing, an increase or decrease in width of a smoothed line can be prevented. In addition, the right and left end portions of a line appear uniformly, thus effectively improving image quality of the line.

FIGS. 40A to 40H are views showing a conventional smoothing algorithm for a lateral line with an almost horizontal boundary portion. Since the detailed algorithm is the same as that described above, a detailed description thereof will be omitted.

Figure 39A:
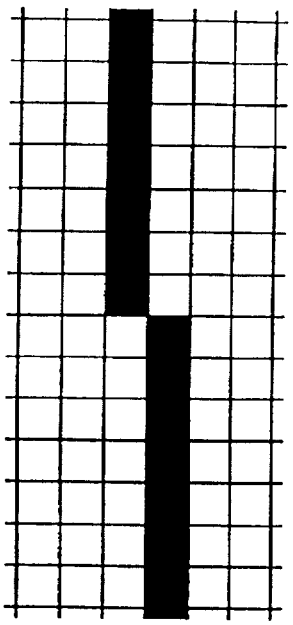
FIGS. 39A to 39F are views showing smoothing processing for two different 1-dot lines.
Figure 39D:
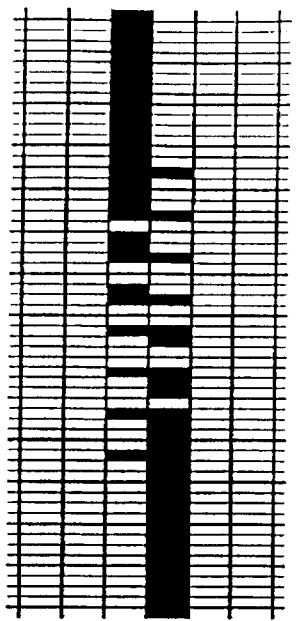
Figure 39B:
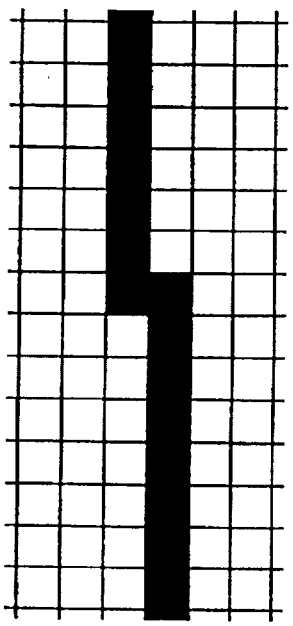
Figure 39E:
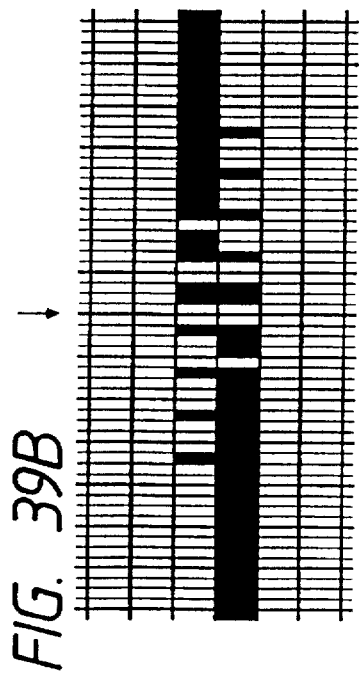
Figure 39C:
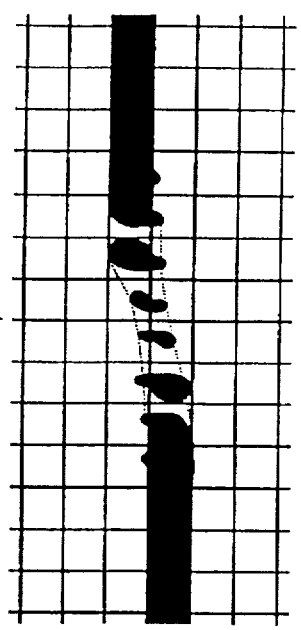

Upon execution of smoothing using this algorithm, a signal obtained by smoothing a one-dot line shown in FIG. 39A is as shown in FIG. 39B, and as a result, this signal is printed on a paper sheet, as shown in FIG. 39C, in accordance with the electrophotographic characteristics. A signal obtained by smoothing a one-dot line shown in FIG. 39D is as shown in FIG. 39E, and as a result, this signal is printed on a paper sheet, as shown in FIG. 39F, in accordance with the electrophotographic characteristics.

Figure 39F:
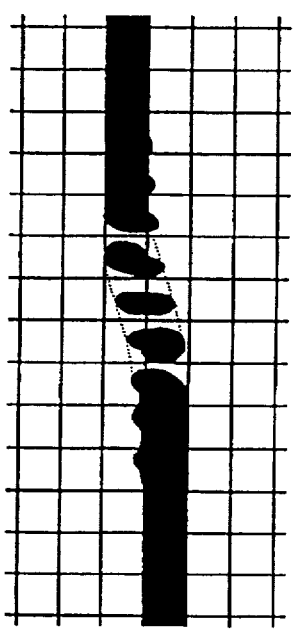
Figure 40A:
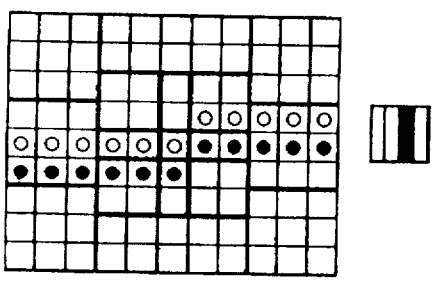
FIGS. 40A to 40H are views showing a smoothing algorithm for a lateral line with an almost horizontal boundary portion.
Figure 40E:
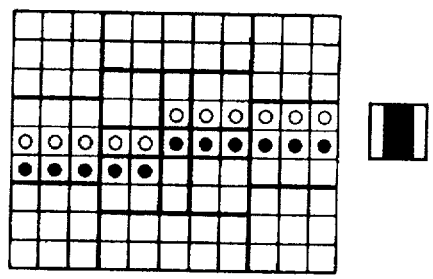
Figure 40B:
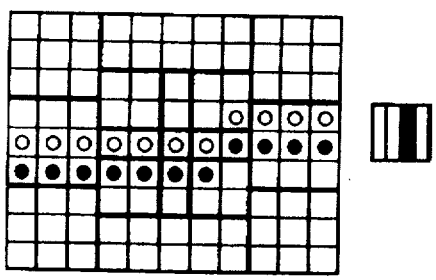
Figure 40F:
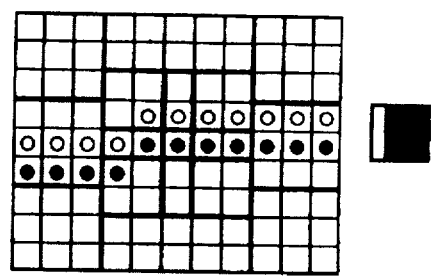
Figure 40C:
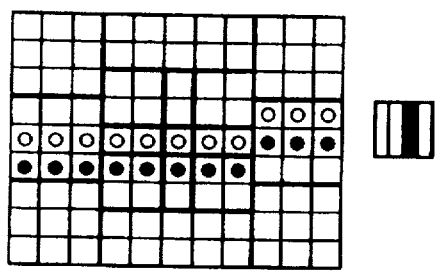
Figure 40G:
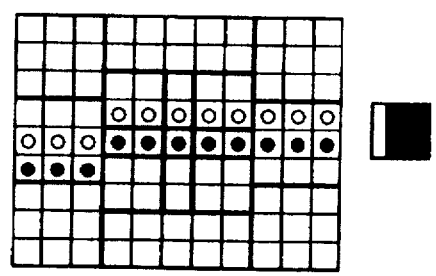
Figure 40D:
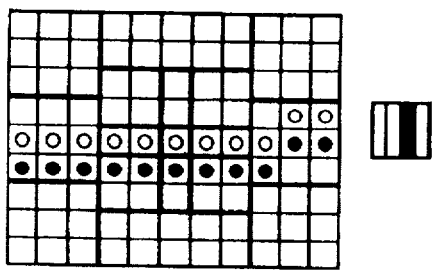
Figure 40H:
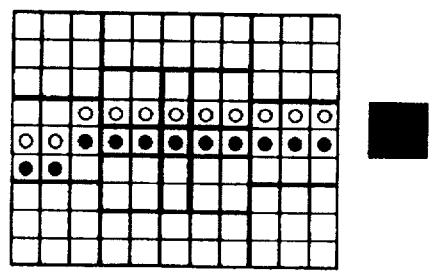
Figure 41A:
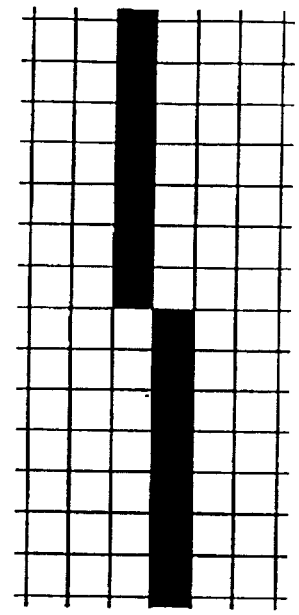
FIGS. 41A to 41F, are views showing a smoothing effect of this embodiment for an almost horizontal lateral line.
Figure 41B:
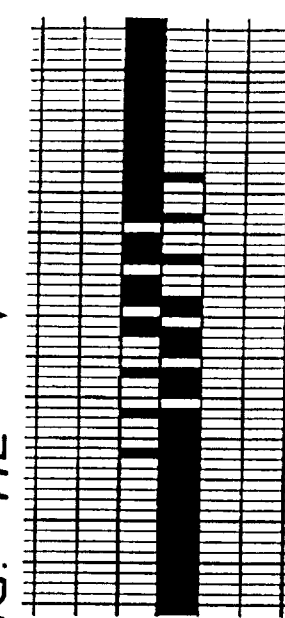
Figure 41C:
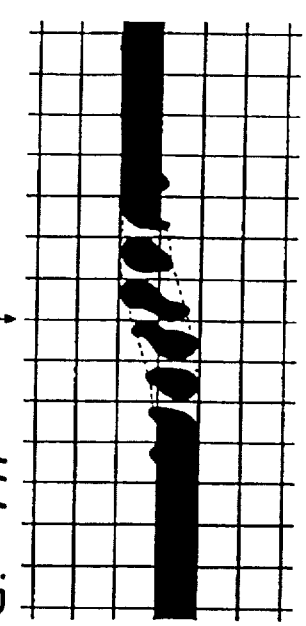
Figure 41D:
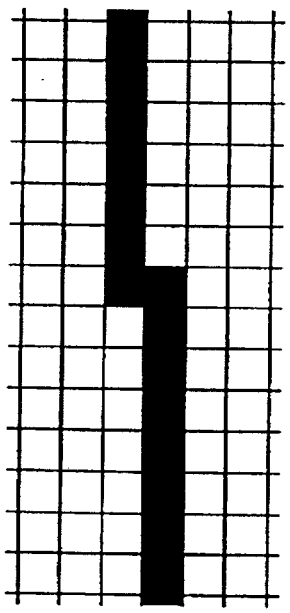
Figure 41E:
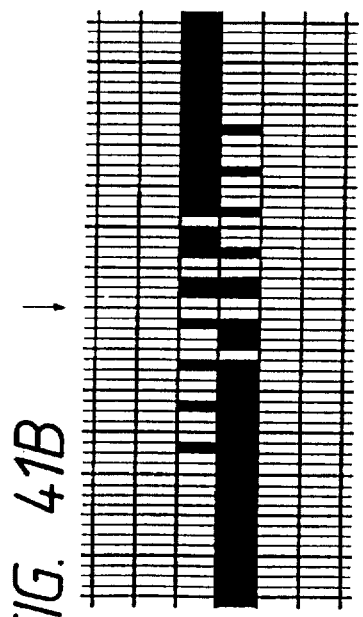
Figure 41F:
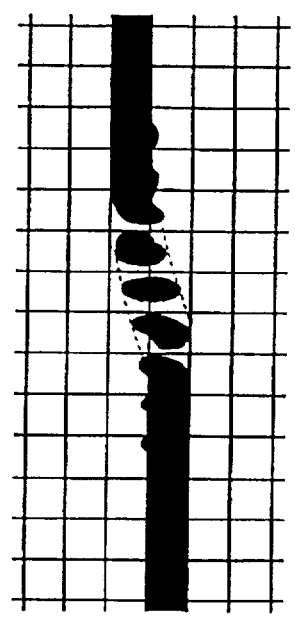
Figure 43A:
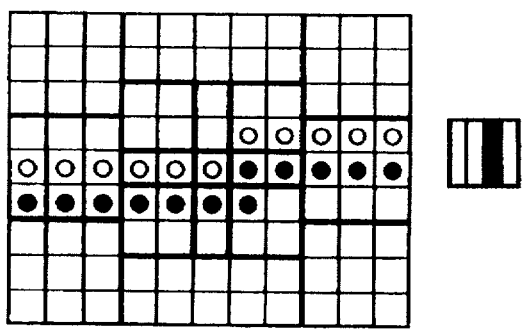
FIGS. 43A to 43D are views showing a deformed pattern of FIG. 42A.
Figure 43C:
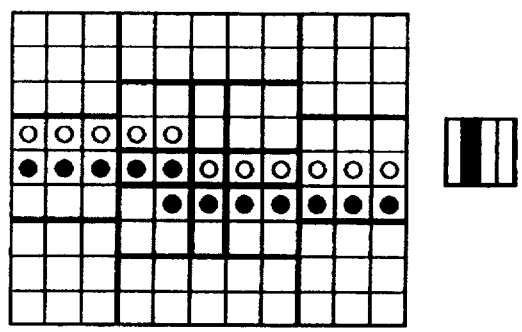
Figure 43B:
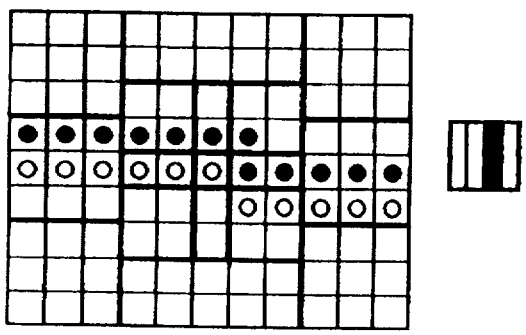
Figure 43D:
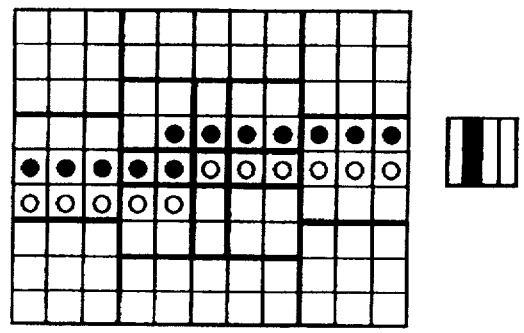

As can be seen from FIGS. 39C and 39F, even in similar one-dot lines, the black dot area to be added to a smoothed portion in FIG. 39D is smaller by one dot than that to be added to a smoothed portion in FIG. 39A. As a result, in a smoothed image of FIG. 39D, the width of a line in FIG. 39F is decreased, and the line is disconnected. On the contrary, when the dot area to be added to a smoothed portion is increased by an algorithm for preventing a decrease in width for the image shown in FIG. 39F, a decrease in width of the line by the smoothing processing of the image shown in FIG. 39D can be prevented, but the width of a line is undesirably increased in a smoothed portion corresponding to FIG. 39A.

FIGS. 42A to 42P show smoothing processing algorithms for a boundary portion of an almost horizontal lateral line according to the present invention. Since the detailed algorithm is the same as that described above, a detailed description thereof will be omitted. Note that the algorithm shown in FIG. 42A has a set of a total of four patterns which are horizontally and vertically symmetrical about the pixel of interest (central pixel), as shown in FIGS. 43A to 43D. Also, each of the algorithms shown in FIGS. 42B to 42P has a set of a total of four patterns (not shown) which are horizontally and vertically symmetrical about the pixel of interest (central pixel).

Since one-dot line in question can be determined to be either one of the two different types of one-dot lines, optimal processing can be performed in accordance with the type of each line.

FIGS. 41A to 41F are explanatory views when smoothing processing is performed for the two different types of one-dot lines using the algorithms according to the present invention. As can be seen from FIGS. 41A to 41F, the algorithms of the present invention can identify the two different types of one-dot lines, and the black areas of pixels in smoothed portions are equal to each other in the two types of one-dot lines. As a result, an increase or decrease in line width of a smoothed portion can be prevented, and a print operation with high image quality can be realized.

FIGS. 45A to 45F are views showing a conventional smoothing algorithm for a longitudinal line with an almost vertical boundary portion. Since the detailed algorithm is the same as that described above, a detailed description thereof will be omitted.

Figure 44A:
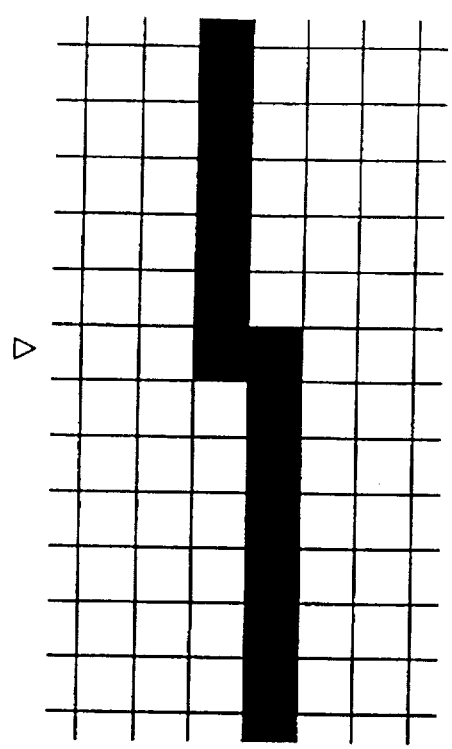
FIGS. 44A to 44D are views showing an example of conventional smoothing processing.
Figure 44C:
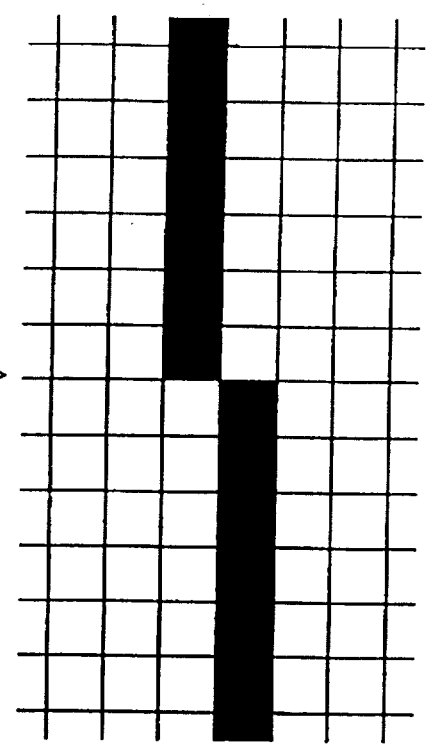
Figure 44B:
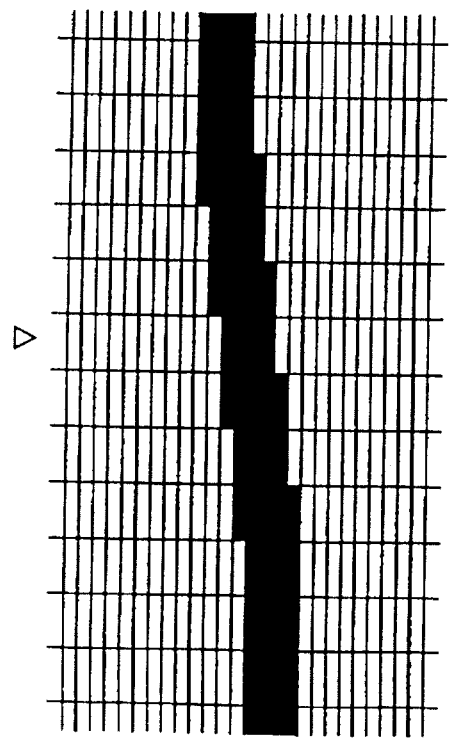
Figure 44D:
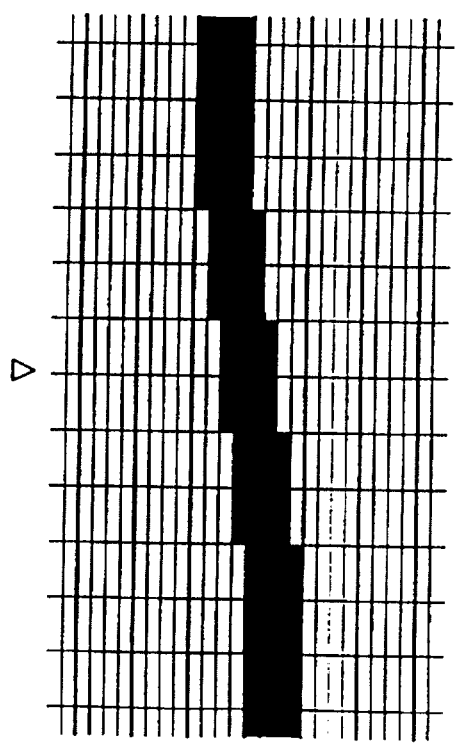
Figure 45A:
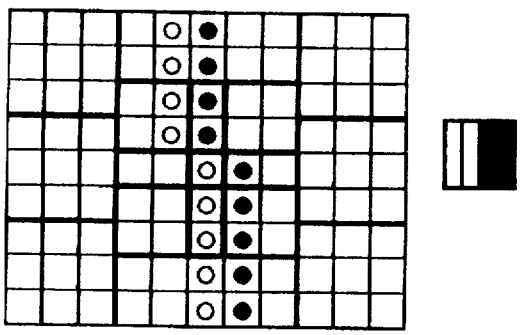
FIGS. 45A to 45F are views showing a smoothing algorithm for a longitudinal line with an almost vertical boundary portion.
Figure 45D:
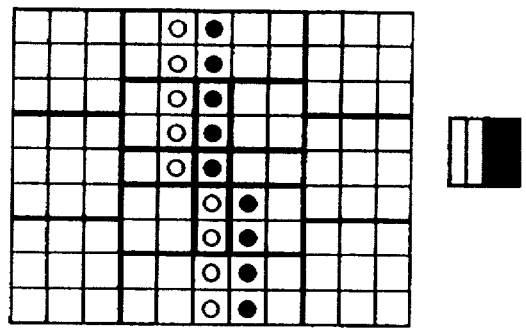
Figure 45B:
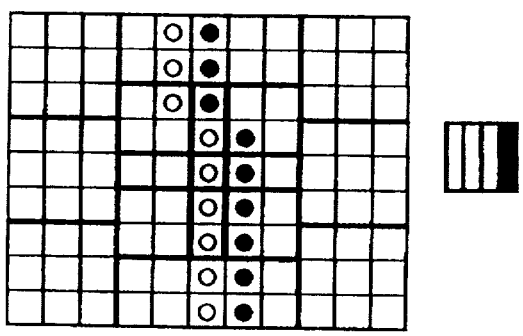
Figure 45E:
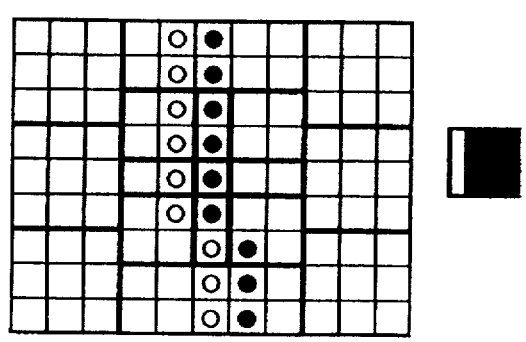
Figure 45C:
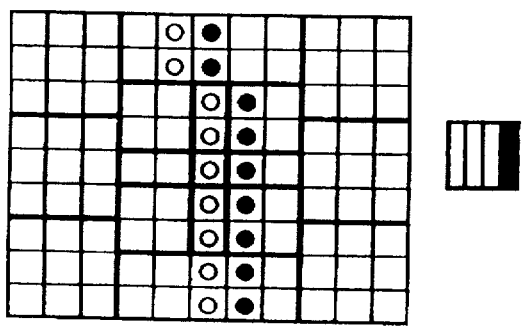
Figure 45F:
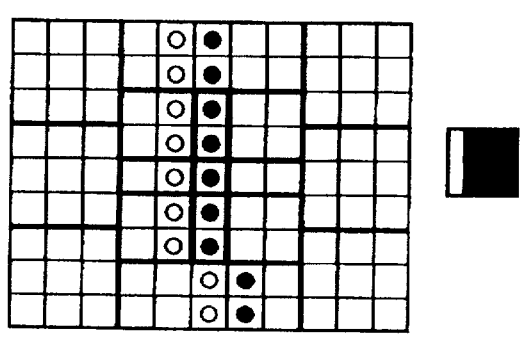
Figure 46A:
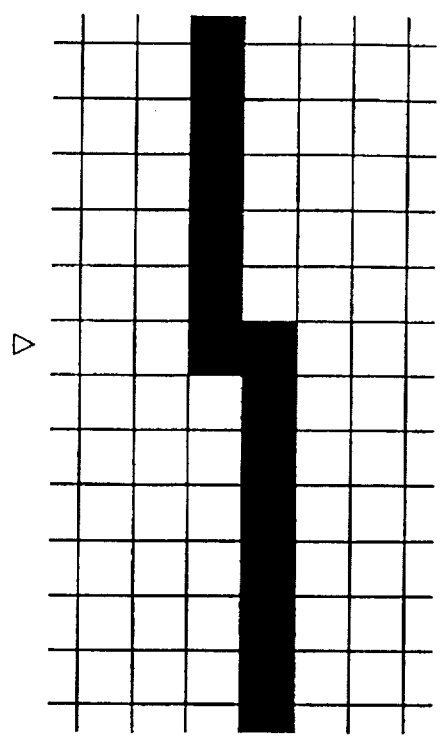
FIGS. 46A to 46D are views showing a smoothing effect of this embodiment for an almost vertical longitudinal line.
Figure 46C:
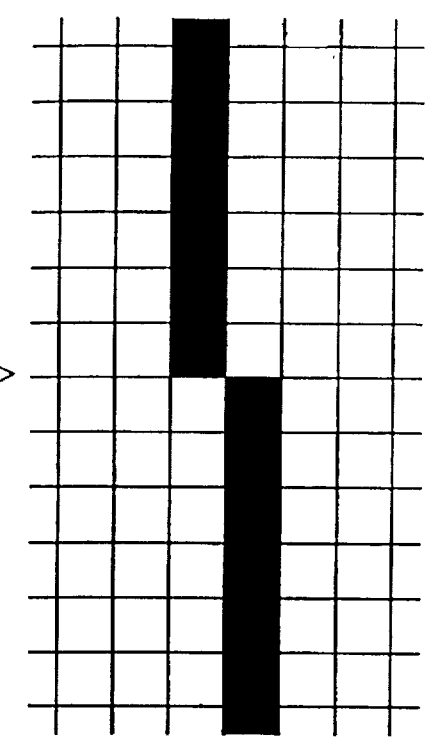
Figure 46B:
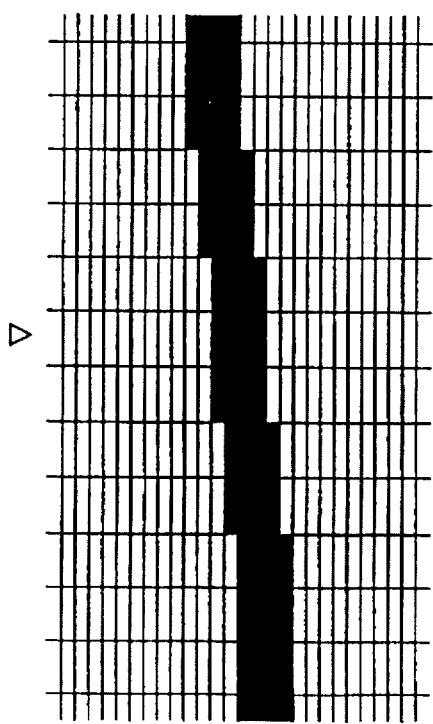
Figure 46D:
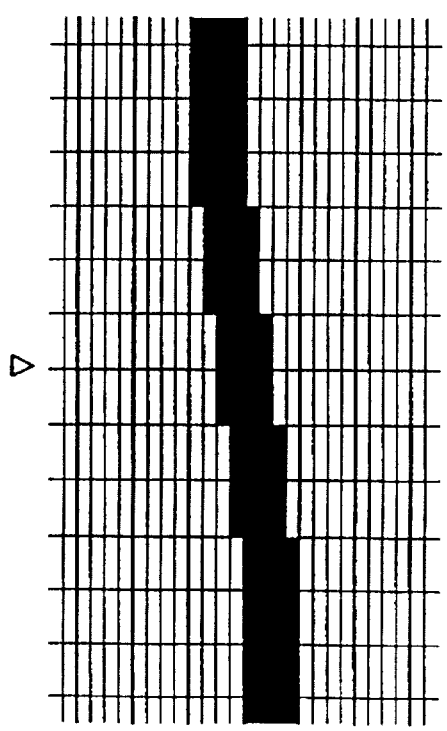

When smoothing is performed using this algorithm, a signal obtained by smoothing a one-dot line shown in FIG. 44A is as shown in FIG. 44B. On the other hand, a signal obtained by smoothing a one-dot line shown in FIG. 44C is as shown in FIG. 44D. As can be seen from FIGS. 44B and 44D, even in similar one-dot lines, the black dot area to be added to a smoothed portion in FIG. 44A is larger by one dot than that to be added to a smoothed portion in FIG. 44D. Thus, in a smoothed image corresponding to FIG. 44A, the width of a line shown in FIG. 44B increases, resulting in a line with a bump. On the contrary, when the dot area to be added to the smoothed portion is decreased by an algorithm for preventing an increase in width of the line in FIG. 44A, the increase in width of the line can be prevented in smoothing processing for FIG. 44A, but the width of a smoothed portion for FIG. 44C is undesirably decreased.

FIGS. 47A to 47M show smoothing processing algorithms for a boundary portion of an almost vertical longitudinal line according to the present invention. Since the detailed algorithm is substantially the same as that described above, a detailed description thereof will be omitted. Note that the algorithm shown in FIG. 47A has a set of a total of four patterns which are horizontally and vertically symmetrical about the pixel of interest (central pixel).

In the algorithms shown in FIGS. 47A to 47M, whether a one-dot line corresponds to a line with or without an overlapping portion for one pixel can be discriminated. Therefore, optimal processing which can prevent an increase or decrease in width of a line can be executed depending on the discriminated type of a one-dot line.

FIGS. 46A to 46D are explanatory views when smoothing processing is performed for the two different types of one-dot lines using the algorithms according to the present invention. As can be seen from FIGS. 46A to 46D, the algorithms of the present invention can identify the two different types of one-dot lines, and the black areas of pixels in smoothed portions are equal to each other in the two types of one-dot lines. As a result, an increase or decrease in line width of a smoothed portion can be prevented, and a print operation with high image quality can be realized.

Figure 50:
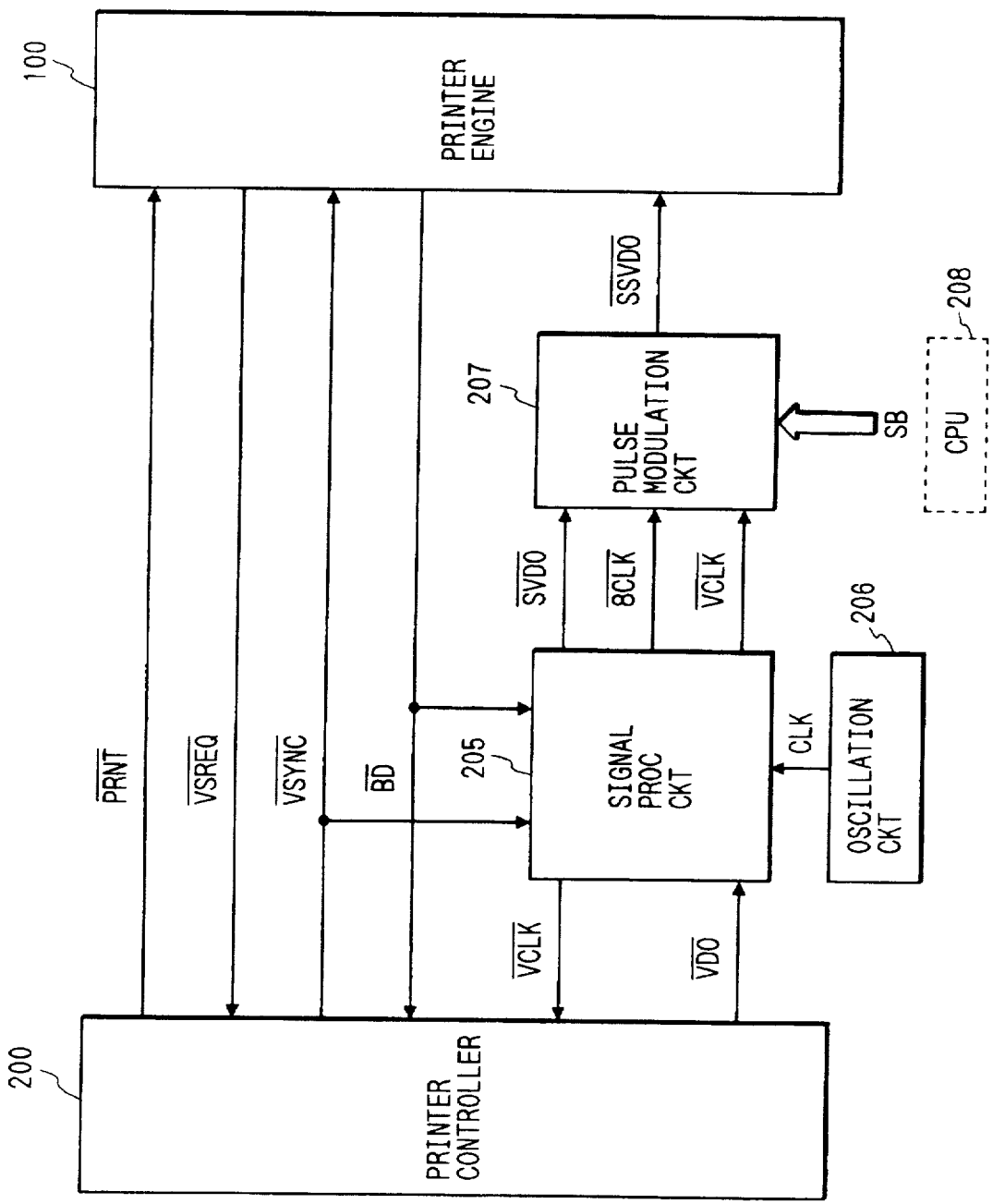

FIG. 50 is a block diagram showing in detail another embodiment to which an image processing apparatus according to the present invention is applied. The same reference numerals in FIG. 50 denote the same parts as in FIG. 49. Referring to FIG. 50, a signal 8CLK is a clock signal having a frequency eight times that of the signal VCLK, and is the same as the signal CLK, in practice. In a laser beam printer shown in FIG. 50, a pulse modulation circuit 207 is inserted between the signal processing circuit 205 and the printer engine 100. The pulse modulation circuit 207 receives the signals 8CLK and VCLK in addition to the signal SVDO. The circuit 207 outputs a signal SSVDO (to be described later) to the printer engine. The pulse modulation circuit 207 receives 6-bit parallel signals SB under the control of a CPU 208 for controlling either the controller 200 or the printer engine 100.

Referring to FIG. 50, the signal processing circuit 205 increases the resolution, in the main scanning direction of a 300-dpi image signal VDO output from the controller 200 to 1,200 dpi four times that of the signal VDO, and outputs the processed signal as a smoothed signal SVDO to the pulse modulation circuit 207 in synchronism with the signal VCLK. The pulse modulation circuit 207 modulates the received signal SVDO into a signal SSVDO by increasing the resolution, in the main scanning direction of a predetermined signal to a value corresponding to an integer multiple of that of the signal SVDO (e.g., twice; 2,400 dpi), and outputs the signal SSVDO to the printer engine 100.

Figure 51:
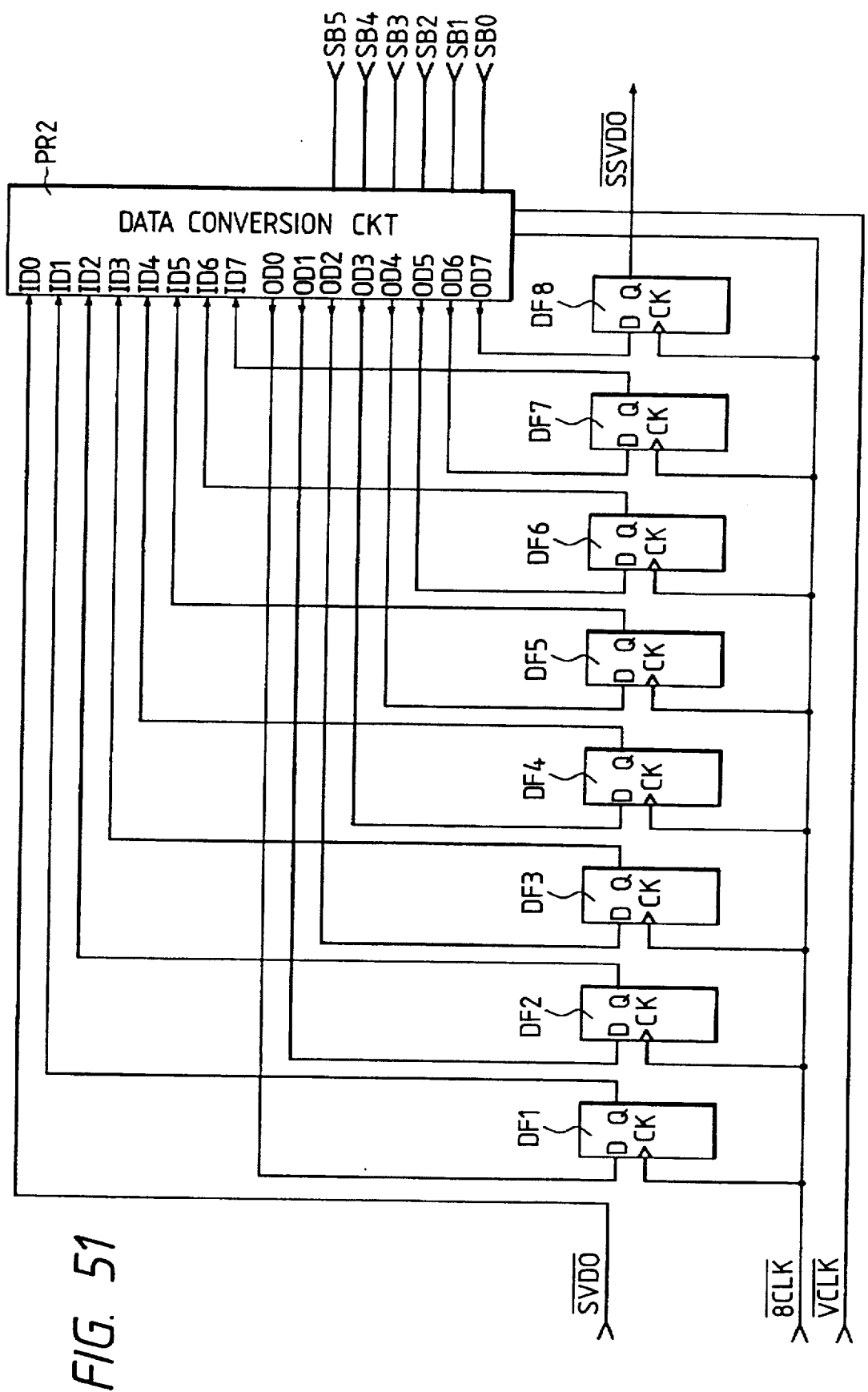
FIG. 51 is a circuit diagram showing in detail a pulse modulation circuit 207 shown in FIG. 50.
Figure 52:
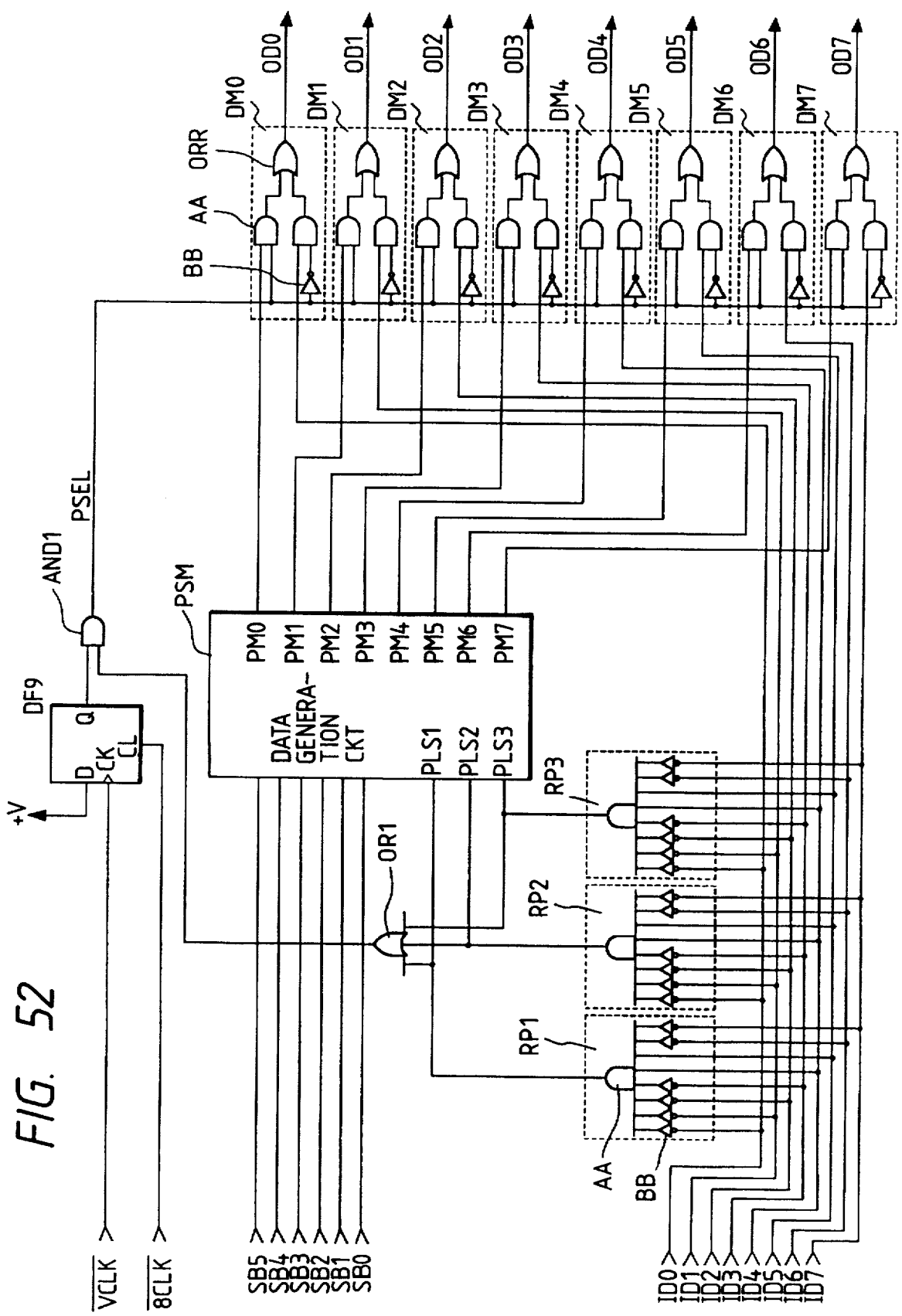
FIG. 52 is a circuit diagram showing the pulse modulation circuit shown in FIG. 51.

FIGS. 51 and 52 are detailed circuit diagrams of the pulse modulation circuit 207.

Referring to FIG. 51, the circuit includes D-type flip-flops DF1 to DF8, and a data conversion circuit RR1.

The signal SVDO is input to the data conversion circuit RR1 as an input ID0. In response to the input ID0, the data conversion circuit RR1 outputs a signal OD0 as the D input of the flip-flop DF1.

The Q output from the flip-flop circuit DF1 is input to the data conversion circuit RR1 as an input ID1. In response to the input ID1, the data conversion circuit RR1 outputs a signal OD1 as the D input of the flip-flop DF2.

The Q output from the flip-flop circuit DF2 is input to the data conversion circuit RR1 as an input ID2. In response to the input ID2, the data conversion circuit RR1 outputs a signal OD2 as the D input of the flip-flop DF3.

The Q output from the flip-flop circuit DF3 is input to the data conversion circuit RR1 as an input ID3. In response to the input ID3, the data conversion circuit RR1 outputs a signal OD3 as the D input of the flip-flop DF4.

The Q output from the flip-flop circuit DF4 is input to the data conversion circuit RR1 as an input ID4. In response to the input ID4, the data conversion circuit RR1 outputs a signal OD4 as the D input of the flip-flop DF5.

The Q output from the flip-flop circuit DF5 is input to the data conversion circuit RR1 as an input ID5. In response to the input ID5, the data conversion circuit RR1 outputs a signal OD5 as the D input of the flip-flop DF6.

The Q output from the flip-flop circuit DF6 is input to the data conversion circuit RR1 as an input ID6. In response to the input ID6, the data conversion circuit RR1 outputs a signal OD6 as the D input of the flip-flop DF7.

The Q output from the flip-flop circuit DF7 is input to the data conversion circuit RR1 as an input ID7. In response to the input ID7, the data conversion circuit RR1 outputs a signal OD7 as the D input of the flip-flop DF8.

The Q output from the flip-flop circuit DF8 is output as the signal SSVDO. The data conversion circuit RR1 receives 6-bit parallel signals SB (SB0 to SB5). The parallel signals SB are controlled by the CPU 208 (not shown) for controlling either the printer engine 100 or the controller 200.

The signal 8CLK is input as the clock inputs CK of the flip-flops DF1 to DF8. The signal VCLK is input to the data conversion circuit RR1.

FIG. 52 shows the detailed circuit of the data conversion circuit RR1.

Referring to FIG. 52, the circuit includes inverters BB, AND gates AA and AND1, OR gates ORR and OR1, a D-type flip-flop DF9, and a data generation circuit PSM.

A decoder RP1 is constituted by the inverters BB and one AND gate AA. When the signals ID0 to ID7 are ID0=0, ID1=0, ID2=0, ID3=0, ID4=1, ID5=1, ID6=0, and IF7=0, the decoder RP1 outputs an output signal PLS1, and the signal PLS1 is input to the OR gate OR1 and the data generation circuit PSM.

A decoder RP2 is constituted by the inverters BB and one AND gate AA. When the signals ID0 to ID7 are ID0=0, ID1=0, ID2=1, ID3=1, ID4=0, ID5=0, ID6=0, and IF7=1, the decoder RP2 outputs an output signal PLS2, and the signal PLS2 is input to the OR gate OR1 and the data generation circuit PSM.

A decoder RP3 is constituted by the inverters BB and one AND gate AA. When the signals ID0 to ID7 are ID0=0, ID1=0, ID2=1, ID3=1, ID4=1, ID5=1, ID6=0, and IF7=0, the decoder RP3 outputs an output signal PLS3, and the signal PLS3 is input to the OR gate OR1 and the data generation circuit PSM.

At the Q output of the flip-flop DF9, a signal obtained by extracting a ⅛ pulse from the leading edge of the signal VCLK is obtained. This signal is logically ANDed with a signal output from the OR gate OR1 as an OR signal of the signals PLS1 to PLS3 by the AND gate AND1, and the AND gate AND1 generates a signal PSEL.

The data generation circuit PSM receives the signals PLS1 to PLS3, and also receives the signals SB0 to SB5. The circuit PSM generates 8-bit signals PM0 to PM7 according to a logic (to be described later), and these signals are input to data selectors DM0 to DM7 each of which is constituted by an inverter BB and two AND gates AA.

The data selector DM0 receives the signals PM0 and ID0. When the signal PSEL is "0", the selector DM0 selects the signal ID0; when the signal PSEL is "1", the selector DM0 selects the signal PM0 and outputs an output OD0.

The data selector DM1 receives the signals PM1 and ID1. When the signal PSEL is "0", the selector DM1 selects the signal ID1; when the signal PSEL is "1", the selector DM1 selects the signal PM1 and outputs an output OD1.

The data selector DM2 receives the signals PM2 and ID2. When the signal PSEL is "0", the selector DM2 selects the signal ID2; when the signal PSEL is "1", the selector DM2 selects the signal PM2 and outputs an output OD2.

The data selector DM3 receives the signals PM3 and ID3. When the signal PSEL is "0", the selector DM3 selects the signal ID3; when the signal PSEL is "1", the selector DM3 selects the signal PM3 and outputs an output OD3.

The data selector DM4 receives the signals PM4 and ID4. When the signal PSEL is "0", the selector DM4 selects the signal ID4; when the signal PSEL is "1", the selector DM4 selects the signal PM4 and outputs an output OD4.

The data selector DM5 receives the signals PM5 and ID5. When the signal PSEL is "0", the selector DM5 selects the signal ID5; when the signal PSEL is "1", the selector DM5 selects the signal PM5 and outputs an output OD5.

The data selector DM6 receives the signals PM6 and ID6. When the signal PSEL is "0", the selector DM6 selects the signal ID6; when the signal PSEL is "1", the selector DM6 selects the signal PM6 and outputs an output OD6.

The data selector DM7 receives the signals PM7 and ID7. When the signal PSEL is "0", the selector DM7 selects the signal ID7; when the signal PSEL is "1", the selector DM7 selects the signal PM7 and outputs an output OD7.

Figures 53A, 53B, 53C, 53D, 53E:
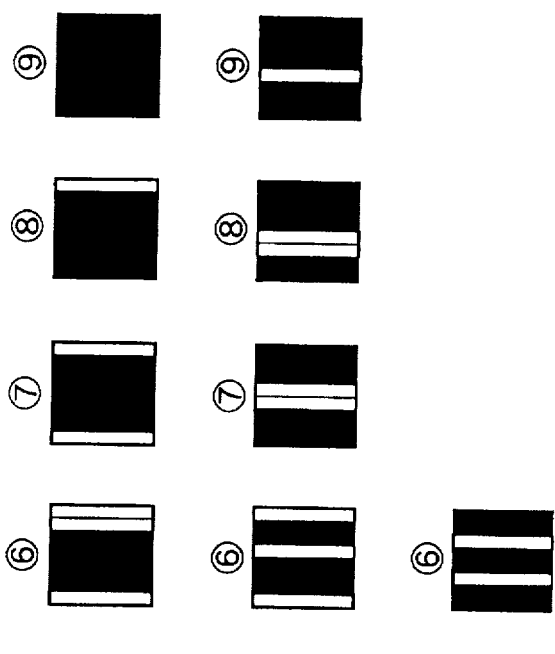

Prior to the detailed description of the operation of the data generation circuit, pulse modulation patterns will be described below with reference to FIGS. 53A to 55E. Referring to FIGS. 53A to 55A, FIG. 53A shows a pattern corresponding to one dot (equivalent to that at 300 dpi) of the signal SVDO (when the modified pixel size is set to be ¼). In FIG. 53A, four modified pixel portions obtained by dividing one dot are respectively represented by I, II, III, and IV in turn from the left.

FIG. 53A shows a pattern when I=0, II=1, III=0, and IV=0.

FIGS. 53B to 53E show various candidate patterns for modulating the dot when the modified pixel size is set to be ⅛. Patterns ① to ⑨ shown in FIG. 53B are examples obtained when the pattern in FIG. 53A is replaced by one-pulse patterns with different pulse widths. Patterns ① to ⑨ shown in FIG. 53C are examples obtained when the pattern in FIG. 53A is replaced by two-pulse patterns. Patterns ① to ⑥ shown in FIG. 53D are examples obtained when the pattern in FIG. 53A is replaced by three-pulse patterns. A pattern ① shown in FIG. 53E is an example obtained when the pattern in FIG. 53A is replaced by a four-pulse pattern. Of these patterns, for example, eight different patterns ① to ⑧ shown in FIG. 59B are sampled.

Figures 54A, 54B, 54C, 54D, 54E:
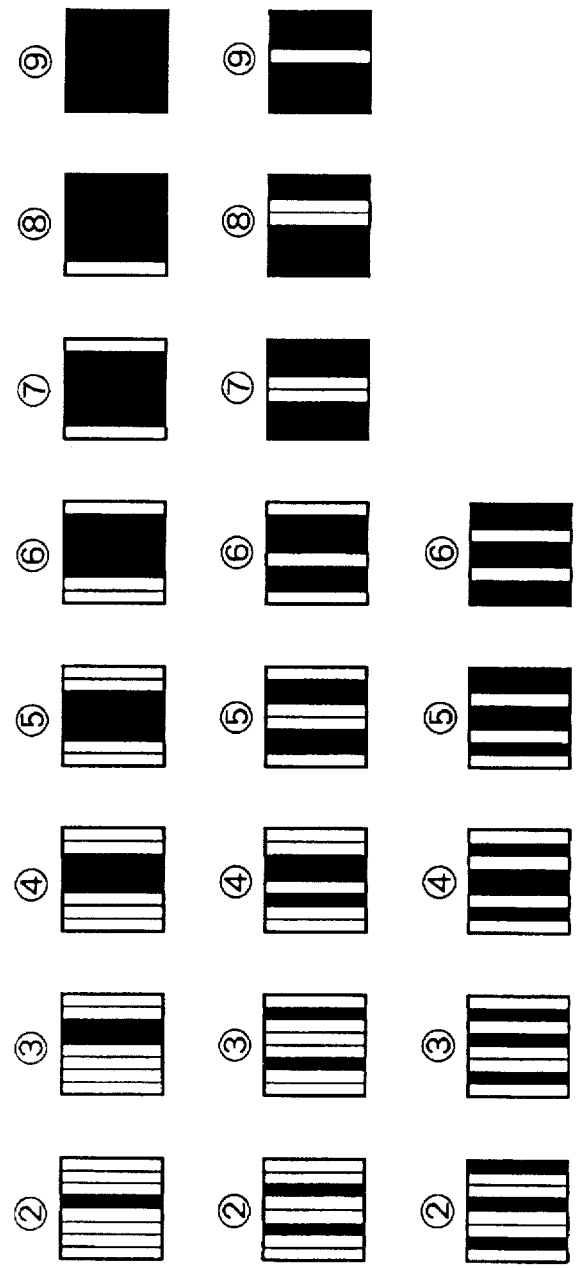

FIG. 54A shows a pattern when I=0, II=0, III=1, and IV=0.

FIGS. 54B to 54E show various candidate patterns for modulating the dot when the modified pixel size is set to be ⅛. Patterns ① to ⑨ shown in FIG. 54B are examples obtained when the pattern in FIG. 54A is replaced by one-pulse patterns with different pulse widths. Patterns ① to ⑨ shown in FIG. 54C are examples obtained when the pattern in FIG. 54A is replaced by two-pulse patterns. Patterns ① to ⑥ shown in FIG. 54D are examples obtained when the pattern in FIG. 54A is replaced by three-pulse patterns. A pattern ① shown in FIG. 54E is an example obtained when the pattern in FIG. 54A is replaced by a four-pulse pattern. Of these patterns, for example, eight different patterns ① to ⑧ shown in FIG. 58B are sampled.

Figures 55A, 55B, 55C, 55D, 55E:
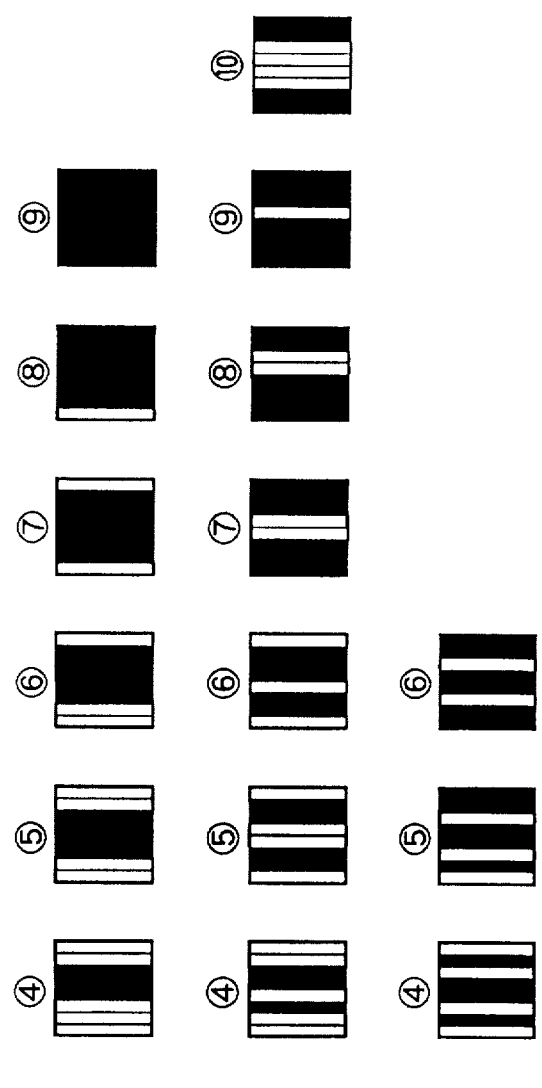

FIG. 55A shows a pattern when I=0, II=1, III=1, and IV=0.

FIGS. 55B to 55E show various candidate patterns for modulating the dot when the modified pixel size is set to be ⅛. Patterns ① to ⑨ shown in FIG. 55B are examples obtained when the pattern in FIG. 55A is replaced by one-pulse patterns with different pulse widths. Patterns ① to ⑩ shown in FIG. 55C are examples obtained when the pattern in FIG. 55A is replaced by two-pulse patterns. Patterns ① to ⑥ shown in FIG. 55D are examples obtained when the pattern in FIG. 55A is replaced by three-pulse patterns. A pattern ① shown in FIG. 55E is an example obtained when the pattern in FIG. 55A is replaced by a four-pulse pattern. Of these patterns, for example, eight different patterns ① to ⑧ shown in FIG. 60B are sampled.

FIG. 56 is a table showing the operation logic of the data generation circuit for practicing the pattern conversions shown in FIGS. 58A to 59B.

FIG. 57 is a table showing the operation logic of the data generation circuit for practicing the pattern conversions shown in FIGS. 60A and 60B.

The output PLS1 of the decoder RP1 goes to "1" when the pattern (I=0, II=0, III=1, and IV=0) shown in FIG. 58A is detected.

Figure 59A:
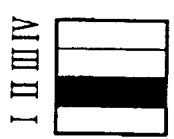
Figure 59B:
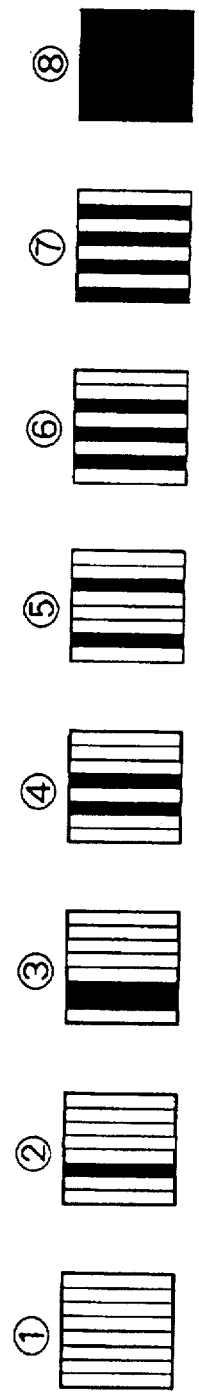

The output PLS2 of the decoder RP2 goes to "1" when the pattern (I=0, II=1, III=0, and IV=0) shown in FIG. 59A is detected.

The output PLS3 of the decoder RP3 goes to "1" when the pattern (I=0, II=1, III=1, and IV=0) shown in FIG. 60A is detected.

Referring to FIG. 56, for example, when SB5=0, SB4=1, and SB3=1, if PLS3=0, PLS2=0, and PLS1=1, PM7=0, PM6=0, PM5=0, PM4=1, PM3=0, PM2=0, PM1=0, and PM0=0 are output independently of the values of SB2 to SB0, and the pattern shown in FIG. 58A is converted to the pattern ④ shown in FIG. 58B. In this case, if PLS3=0, PLS2=1, and PLS1=0, PM7=0, PM6=0, PM5=1, PM4=0, PM3=1, PM2=0, PM1=0, and PM0=0 are output, and the pattern shown in FIG. 59A is converted to the pattern ④ shown in FIG. 59B.

Similarly, by selecting the values of SB5 to SB3, the pattern shown in FIG. 58A can be converted into a designated one of the patterns ① to ⑧ shown in FIG. 58B, and the pattern shown in FIG. 59A can be converted into a designed one of the patterns ① to ⑧ shown in FIG. 59B.

Referring to FIG. 57, for example, when SB2=0, SB1=1, and SB0=1, if PLS3=1, PLS2=0, and PLS1=0, PM7=0, PM6=1, PM5=1, PM4=0, PM3=0, PM2=1, PM1=1, and PM0=0 are output independently of the values of SB5 to SB3, and the pattern shown in FIG. 60A is converted to the pattern ③ shown in FIG. 60B.

Similarly, by selecting the values of SB2 to SB0, the pattern shown in FIG. 60A can be converted into a designated one of the patterns [<b]x;1① to ⑧ shown in FIG. 60B.

As described above, a pulse-converted first pulse signal is received, and the first pulse signal can be converted into a second pulse signal with a smaller modified pixel size than that of the first pixel size in correspondence with the feature of a pulse.

Figure 61A:
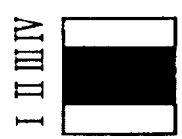
Figure 61B:
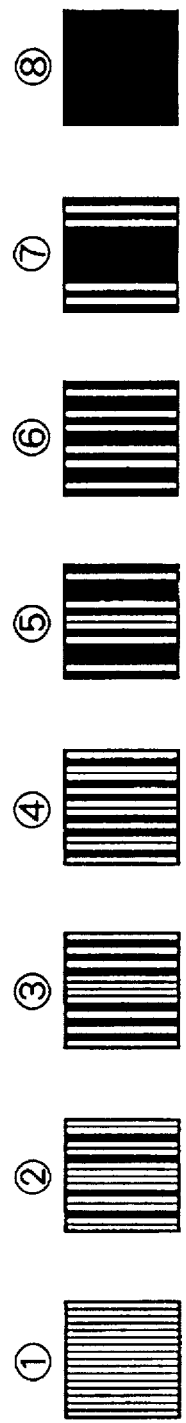
Figure 62A:
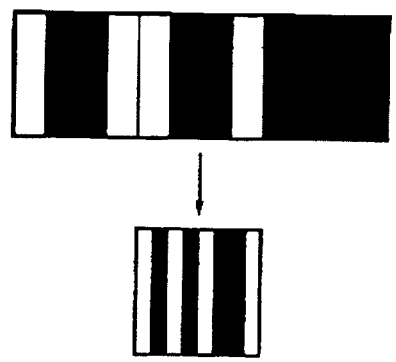
Figure 62B:
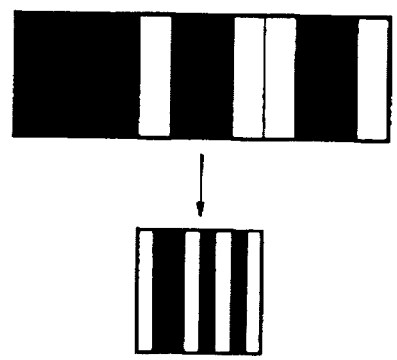
Figure 62C:
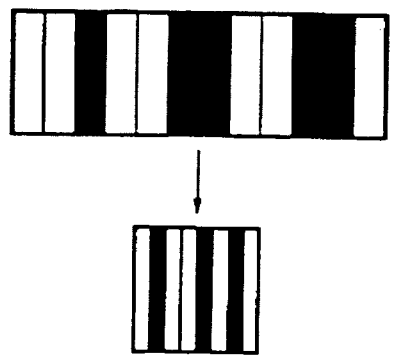
Figure 62D:
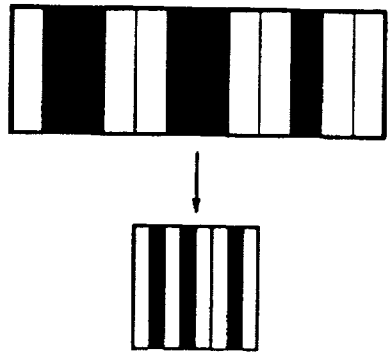

FIGS. 61A and 61B show examples of modulated patterns when the modified pixel size is set to be smaller, e.g., 1/16. This modulation can be realized by using a signal 16CLK obtained by doubling the frequency of the signal 8CLK shown in FIG. 51, and using 16 flip-flops by increasing the number of D-type flip-flops DF1 to DF8.

FIGS. 62A to 62D show another data conversion example. More specifically, FIGS. 62A to 62D show an example for referring to three pixels, and determining a modification pattern of the central pixel in correspondence with the state of these three pixels. This example can be realized by arranging the D-type flip-flops DF1 to DF8 in correspondence with the three pixels (i.e., 24 flip-flops) in FIGS. 51 and 52.

Figure 66C:
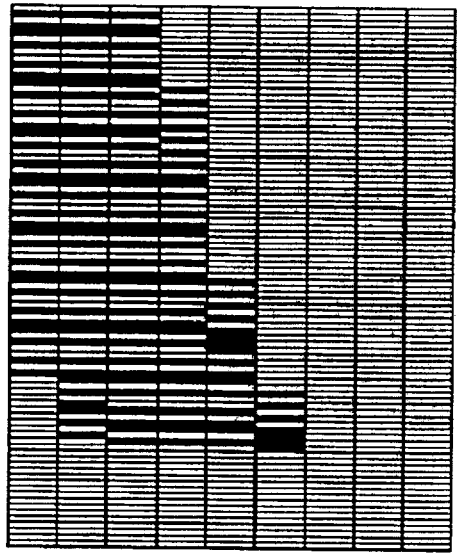
FIGS. 66A to 66D are views showing print examples of this embodiment.
Figure 66D:
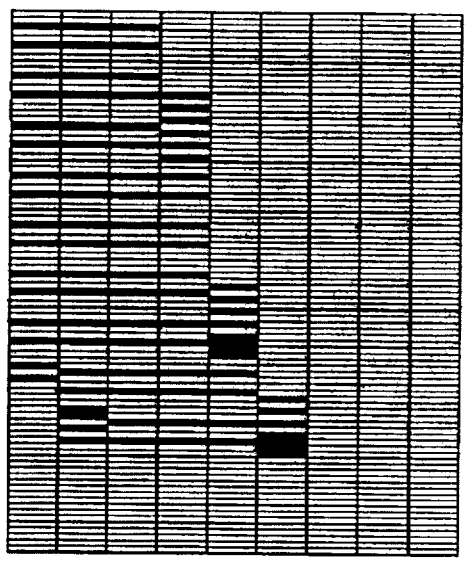
Figure 66A:
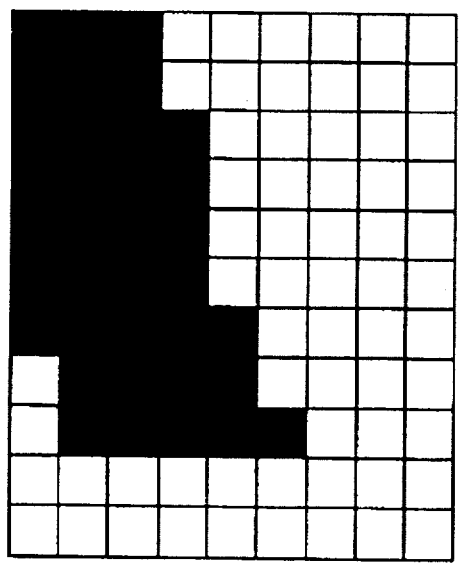
Figure 66B:
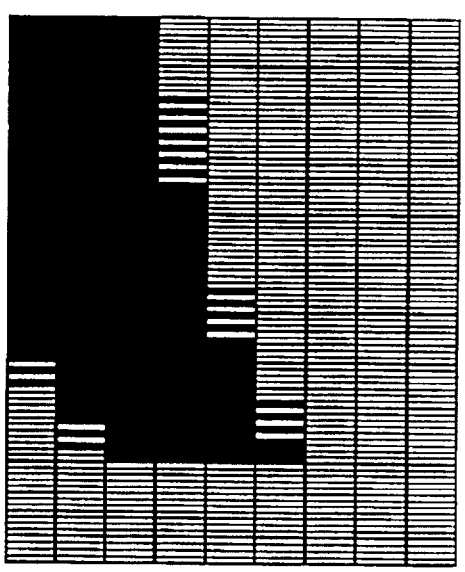

With this processing, when no smoothing processing is executed, the portion of a character "a" shown in FIG. 7 is printed by driving the laser, as shown in FIG. 66A. However, when smoothing processing is executed, the portion of the character "a" is printed by driving the laser, as shown in FIG. 66B. In this manner, a printed image with a smooth edge can be obtained.

The signal processing circuit 205 and the pulse modulation circuit 207 may be integrated to a single IC package. If these circuits are realized by separate IC packages, the signal processing circuit 205 which requires a relatively large logic circuit scale but does not require relatively high-speed processing can adopt a low-speed, inexpensive C-MOS logic IC, and the pulse modulation circuit 207 which requires a relatively small logic circuit scale but requires relatively high-speed processing can adopt a high-speed, relatively expensive BI-CMOS logic IC or ECL logic IC, thus realizing a circuit arrangement with high cost performance as a whole.

When the above-mentioned pulse conversion function is used, the following conventional drawbacks can be eliminated.

By selecting the select signals SB5 to SB0 in correspondence with the toner particle size, in the case of, e.g., a normal particle size toner (a toner particle size of 10 to 12 microns), the pattern ③ in FIGS. 58A and 58B, the pattern ③ in FIGS. 59A and 59B, or the pattern ③ in FIGS. 60A and 60B is selected. In the case of a small particle size toner (a toner particle size of 5 to 6 microns), the pattern ⑥ in FIGS. 58A and 58B, the pattern ⑥ in FIGS. 59A and 59B, or the pattern ④ in FIGS. 60A and 60B is selected. In this manner, as the toner particle size becomes smaller, a pulse is segmented more finely (the number of pulses is increased), thereby avoiding the modified pixel from being developed to be a "whisker"-like pattern. In addition, since the modified pixel is printed in a "blurred" pattern, smoothing print quality can be prevented from being impaired, thus maintaining high-image quality.

When the print resolution is switched between, e.g., 240 dpi and 300 dpi, a modification pattern is changed in correspondence with the print resolution, as shown in FIGS. 63A to 63D, thus maintaining high image quality in correspondence with the print resolution. Upon switching of the print resolution, in FIG. 50, for example, the controller 200 sends a command to the printer engine 100 via the serial signal, and the CPU 208 for controlling the printer engine 100, which received the command, generates the signals SB corresponding to the print resolution.

Figure 63A:
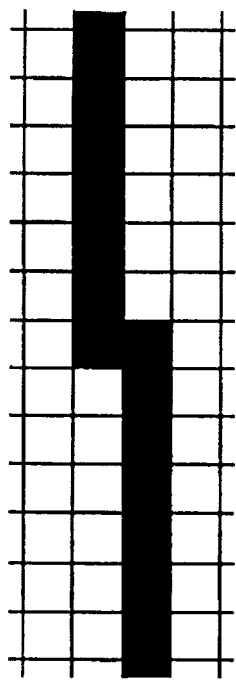
Figure 63B:
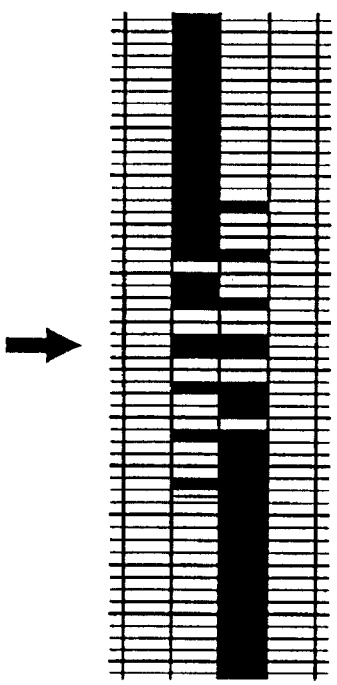
Figure 63D:
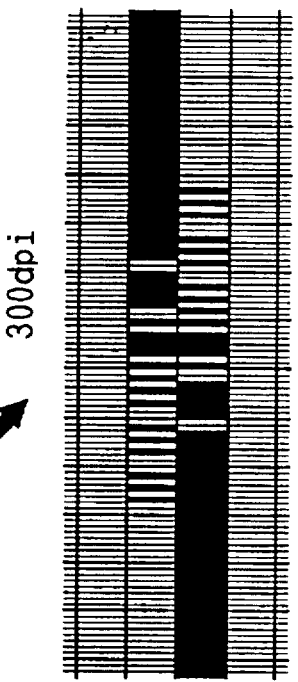
Figure 63C:
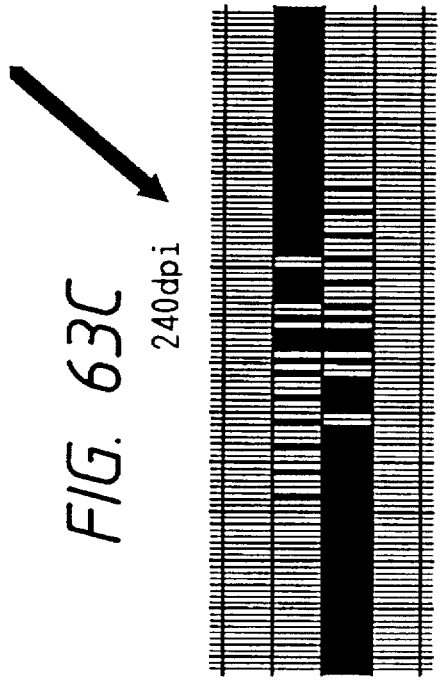

FIGS. 63A to 63D are views illustrating the flow of the smoothing processing for an almost horizontal black line with a one-dot width. In FIGS. 63A to 63D, FIG. 63A shows a dot pattern before smoothing processing, and FIG. 63B shows a pattern subjected to smoothing processing using a first modified pixel size (¼ of one dot). Upon conversion into a pattern of a second modified pixel size (⅛ of one dot), the pattern shown in FIG. 63B is converted into a pattern shown in FIG. 63C in the case of 240 dpi, and is converted into a pattern shown in FIG. 63D in the case of 300 dpi.

When the print resolution is switched between 300 dpi and 600 dpi in response to a command, the circuit shown in the circuit diagram in FIG. 8 is used for 300 dpi, and the circuit shown in the circuit diagram in FIG. 18 is used for 600 dpi. When these circuits are combined, an optimal pattern can be similarly set in correspondence with the print resolution.

A case will be explained below wherein the print density is changed. In FIG. 50, for example, the controller 200 transmits a command for changing the print density to the printer engine via the serial signal. The CPU 208 for controlling the printer engine 100, which received the density change command, changes the density in a process by, e.g., changing the developing bias voltage in correspondence with the designated density, and generates the signals SB in correspondence with the density. For example, in FIGS. 58B, 59B, and 60B, as the density becomes low, patterns are selected in turn in the order of ①→⑧. On the contrary, as the density becomes high, the patterns are selected in turn in the order of ⑧→①. In this manner, a smoothed portion can be maintained at a uniform density, and high image quality can be maintained.

In the above description, the density is changed in response to a command from the controller. Alternatively, the CPU 208 may fetch information of a density change means operated by a user from, e.g., an operation unit volume of the printer engine 100, and the signals SB may be changed in correspondence with the fetched information, thereby switching a pattern.

In FIG. 50, a thermistor or humidity sensor (neither are shown) is connected to the input port of the CPU 208 for controlling the printer engine 100, and the temperature or humidity may be fetched by the CPU 208 as A/D-converted data. Then, the signals SB are changed in correspondence with the value of the detected temperature or humidity, thus maintaining a smoothed portion at a uniform density, and maintaining high image quality.

A method of saving the consumption amount of a toner using the above-mentioned pulse modulation circuit will be described below.

In this case, a logic for modulating a pattern of "a dot in which the entire one-dot area is black", which pattern is not modulated in the above embodiment, is assumed to be added. More specifically, when the processing circuit 43 determines a "dot in which the entire one-dot area is black", pulse-width or pulse-number modulation is performed based on a print density command.

Figure 65A:
Figure 65B:
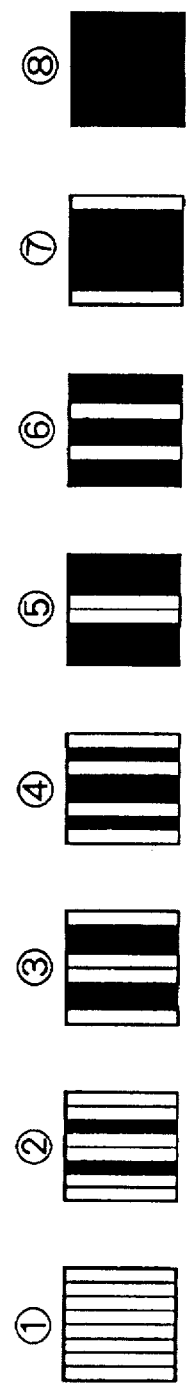

In the same manner as in FIGS. 58A to 60B, in correspondence with a pattern of I=1, II=1, III=1, and IV=1 (i.e., a signal for printing, in black, the entire one-dot area at 300 dpi), for example, eight different patterns ① to ⑧ shown in FIG. 65B are sampled from the various candidate patterns used for modulation using a modified pixel size of ⅛ and shown in FIGS. 64B to 64E.

One of the patterns ① to ⑧ shown in FIG. 65B is designated by an operator via a host computer, or by the pulse modulation circuit 207 in correspondence with the signals SB output from the CPU 208 shown in FIG. 50, which received a command signal corresponding to a required print density input by a key on a controller panel of the printer.

FIG. 66C shows an example of processing executed when the pattern ④ of the patterns shown in FIG. 65B is selected and printed. FIG. 66D shows an example of processing executed when the pattern ② in FIG. 65B is selected and printed. As can be seen from FIGS. 66C and 66D, a signal for performing a solid-black portion other than a smoothed portion is pulse-width or pulse-number modulated without using full power of a laser, and the consumption amount of the toner can be changed in correspondence with the ON ratio of the signal. The density of a printed image shown in FIG. 66C becomes lower than that of a printed image shown in FIG. 66B, and the consumption amount of the toner can decrease accordingly. Furthermore, the density of a printed image shown in FIG. 66D is still lower, and the consumption amount of the toner can further decrease.

In this case, since the consumption amount of the toner can be controlled by changing the density by only changing the ON signal of the laser without changing the developing bias voltage, an image can be stably printed with high image quality even when the print density is lowered. This toner save mode can be selected according to an operator's favor when a test print operation is performed, or when an importance need not be placed on the density.

In this case, when the density is lowered by printing a solid-black print portion at a low density without changing a signal to be added or changed for smoothing, the smoothing effect of an edge portion can be prevented from being impaired. Of course, a method of changing a signal for smoothing processing as well may be used.

Figure 67:
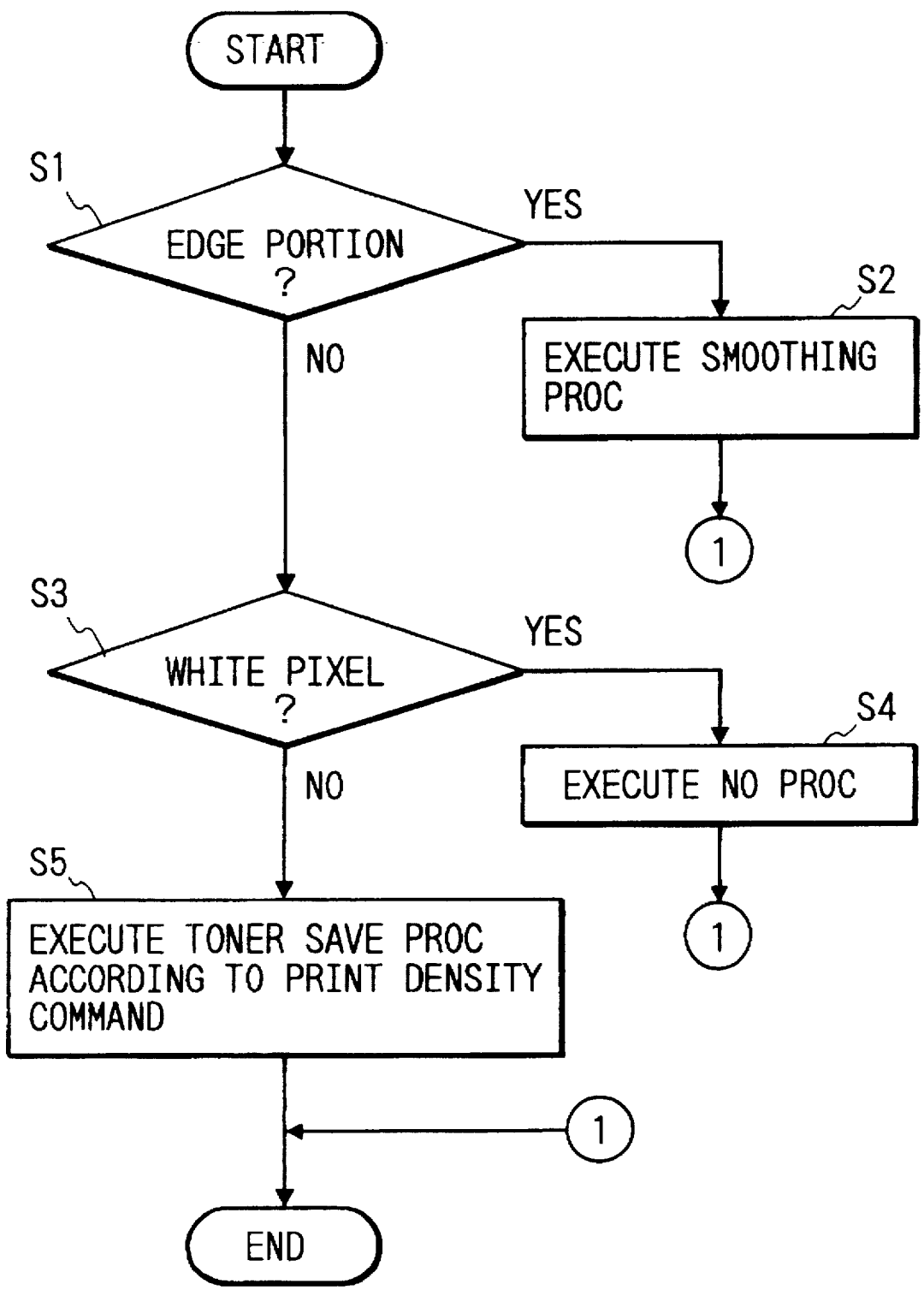
FIG. 67 is a flow chart showing smoothing processing and toner save processing of this embodiment.

FIG. 67 is a flow chart showing the processing flow associated with smoothing processing and toner save processing to be executed by the CPU 208. FIG. 67 shows processing for one pixel.

If it is determined in step S1 that the pixel of interest corresponds to an edge portion, the flow advances to step S2 independently of whether the pixel is a black or white pixel, and smoothing processing for smoothing the edge portion is executed. However, if NO in step S1, and if it is determined in step S3 that the pixel of interest is a white pixel, the flow advances to step S4, and the pixel of interest is output without executing any processing. If NO in step S3, i.e., if it is determined that the pixel of interest is a black pixel, the flow advances to step S5, and toner save processing is executed in correspondence with a print density command. More specifically, in this embodiment, smoothing processing is executed for a pixel present on an edge portion, and toner save processing is executed for a black pixel which is not present on an edge portion. For this reason, the toner save processing can be executed without influencing the smoothing processing.

[Another Embodiment]

Another embodiment of the present invention will be described below. In this embodiment, when a controller transmits image data at 300 dots/inch in both the main scanning and sub-scanning directions to a printer engine having a print function of 600 dots/inch, the printer engine prints data equivalently at a print resolution of 1,200 dots/inch in the main scanning direction and at 600 dots/inch in the sub-scanning direction.

Figure 17:
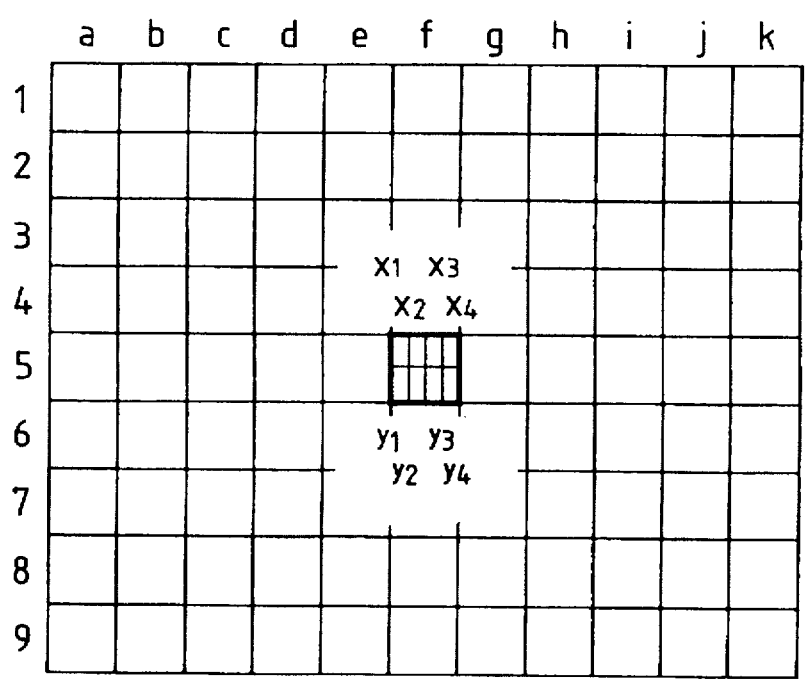
FIG. 17 is a view showing another embodiment for dividing a pixel of interest to four sections in the main scanning direction and two sections in the sub-scanning direction.

FIG. 17 shows a division method of small pixel domains for printing a pixel of interest in this embodiment. In FIG. 17, a pixel of interest (5f) at the central portion of a dot matrix memory consisting of 11 dots in the main scanning direction×9 dots in the sub-scanning direction at 300 dots/inch is modified to image data defined by a set (x1, x2, x3, x4, y1, y2, y3, and y4) of small pixel domains at a print resolution four times in the main scanning direction×twice in the sub-scanning direction, and the modified image data is printed.

In this embodiment, in data transmitted from the controller, the features of image data in an area (11 pixels in the main scanning direction×9 pixels in the sub-scanning direction) around the pixel of interest are checked, and the pixel of interest is modified in correspondence with the checking result.

More specifically, for example, when a pixel of interest in a dot data group of an English letter "a" at a resolution of 300 dots/inch shown in FIG. 6 is to be printed, dot data in an area (11 pixels in the main scanning direction×9 pixels in the sub-scanning direction=99 pixels) around the pixel of interest are stored in a temporary storage means. Thereafter, the features of the dot data group in the area are checked, and data of the pixel of interest is modified in correspondence with the features. Then, the modified data is printed. In this case, the data is modified to smoothly print an edge of a figure constituted by a dot group. In this embodiment, as shown in FIG. 17, the pixel of interest is constituted by small pixel domains (x1, x2, x3, x4, y1, y2, y3, and y4) obtained by dividing a pixel into four domains in the main scanning direction, and two domains in the sub-scanning direction. Therefore, in a print process, the pixel of interest is equivalently printed at a print resolution of 1,200 dots/inch in the main scanning direction and 600 dots/inch in the sub-scanning direction.

FIG. 18 is a circuit diagram showing the circuit blocks of a VDO signal processing unit 101 which is arranged in an input section of the printer engine at 600 dots/inch and performs smoothing processing. FIG. 18 corresponds to FIG. 8 described in the first embodiment. The same reference numerals in FIG. 18 denote the same devices as in FIG. 8.

Referring to FIG. 18, each of switch means SW1 to SW9 switches an input between positions "α" and "β" in FIG. 18, thereby switching a signal to be input to a corresponding one of line memories 25 to 33. The switching position of each switch means is controlled by a control signal SWC generated by a control circuit 47 (to be described below). The control circuit 47 receives a synchronization signal BD' corresponding to the resolution of 600 dots/inch in the sub-scanning direction for performing a print operation at 600 dots/inch, and generates the control signal SWC which is inverted in synchronism with the signal BD' every time the synchronization signal BD' is input. Note that the synchronization signal BD for interfacing with the controller is generated as a signal which is obtained by thinning out the synchronization signal BD' at every other main scanning line in correspondence with 300 dots/inch in the sub-scanning direction.

The switch means SW1 to SW9 are set at the positions "α". The controller transmits image data VDO at 300 dots/inch in synchronism with the signal BD. The line memories 1 to 9 sequentially shift and store the image signal VDO at 300 dots/inch in synchronism with a clock signal VCLK, and each line memory stores dot information having the main scanning length for a page to be printed. The line memories are coupled in the order of line memory 1→line memory 2→line memory 3→ . . . →line memory 9, and store dot information having the main scanning length for nine nines in the sub-scanning direction.

Thereafter, the switch means SW1 to SW9 are switched to the position "β" sides in response to the control signal SWC generated by the control circuit 47. Shift registers (1 to 9) 34 to 42 receive the outputs from the corresponding line memories 1 to 9 in synchronism with a clock signal VCKN. At this time, the line memories 1 to 9 receive data output therefrom again via the switch means SW1 to SW9.

The shift registers each have a 11-bit arrangement, and constitute a dot matrix memory (1a to 1k, 2a to 2k, 3a to 3k, . . . , 9a to 9k) of 11 dots in the main scanning direction×9 lines in the sub-scanning direction, as shown in FIG. 18. Of the matrix memory, a central dot 5f is defined as a dot of interest. A processing circuit 43 detects the features of data stored in the dot matrix memory for the purpose of smoothing, and modifies the pixel 5f of interest as needed. The processing circuit 43 receives the respective bits (1a to 9k; a total of 99 bits) from the shift registers 1 to 9, and outputs modified parallel signals MDT (x1, x2, x3, and x4). The parallel signals MDT (x1, x2, x3, and x4) are input to a P/S conversion circuit 44. The P/S conversion circuit 44 converts the input parallel signals MDT into a serial signal VDOM, and thereafter, drives the laser 51 via the laser driver 50. Similarly, processing for one main scanning line is sequentially performed.

Thereafter, the switch means SW1 to SW9 are switched to the position "α" sides. Data which is read out from each of the line memories 1 to 9 in synchronism with the synchronization signal BD' input at the next timing is shifted to the next line memory, and is output to the corresponding one of the shift registers 1 to 9. The processing circuit 43 detects the features of data stored in the dot matrix memory of 11 dots in the main scanning direction×9 dots in the sub-scanning direction output from the shift registers, modifies the pixel 5f of interest, as needed, and outputs parallel signals MDT (y1, y2, y3, and y4). The P/S conversion circuit 44 converts the input parallel signals MDT (y1, y2, y3, and y4) into a serial signal VDOM, and drives the semiconductor laser 51 via the laser driver 50. Similarly, the processing for one main scanning line is sequentially performed.

Thereafter, the switch means SW1 to SW9 are switched to the position "α" sides. Then, the switch means SW1 to SW9 receive an image signal VDO of the next sub-scanning line at 300 dots/inch, which signal is transmitted from the controller.

In this embodiment, as described above, the parallel signals are four bits, and first MDT signals (x1, x2, x3, and x4) and second MDT signals (y1, y2, y3, and y4) are alternately output in synchronism with the synchronization signals BD'. A clock generation circuit 45 receives the signal BD' as a main scanning synchronization signal, and generates a clock signal VCK as a clock signal synchronized with the signal BD'. The clock signal VCK has a frequency twice a clock frequency f0 necessary for performing recording at 600 dots/inch in the main scanning direction.

The serial signal VDOM (x1, x2, x3, and x4 or y1, y2, y3, and y4) is sequentially output in synchronism with the clock signal VCK. A frequency division circuit 46 receives the clock signal VCK, and frequency-divides the signal VCK by 2, thereby generating a clock signal VCKN having the frequency f0. The clock signal VCKN is used as a synchronization clock when the processing circuit 43 fetches dot data from the dot matrix memory.

Figure 19:
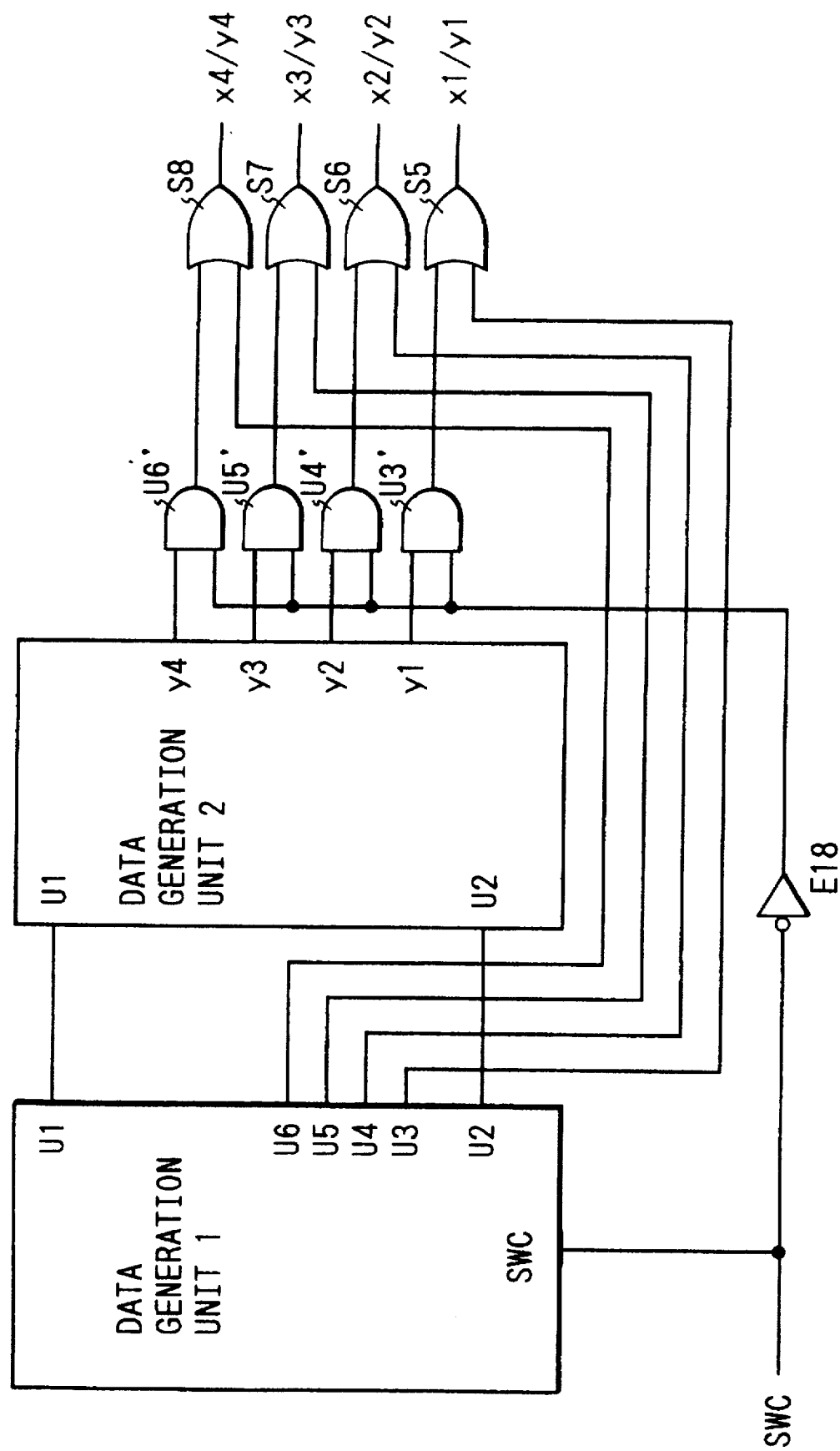
FIG. 19 is a circuit diagram showing an example of a circuit of a feature extraction section of the embodiment shown in FIG. 17.
Figure 20:
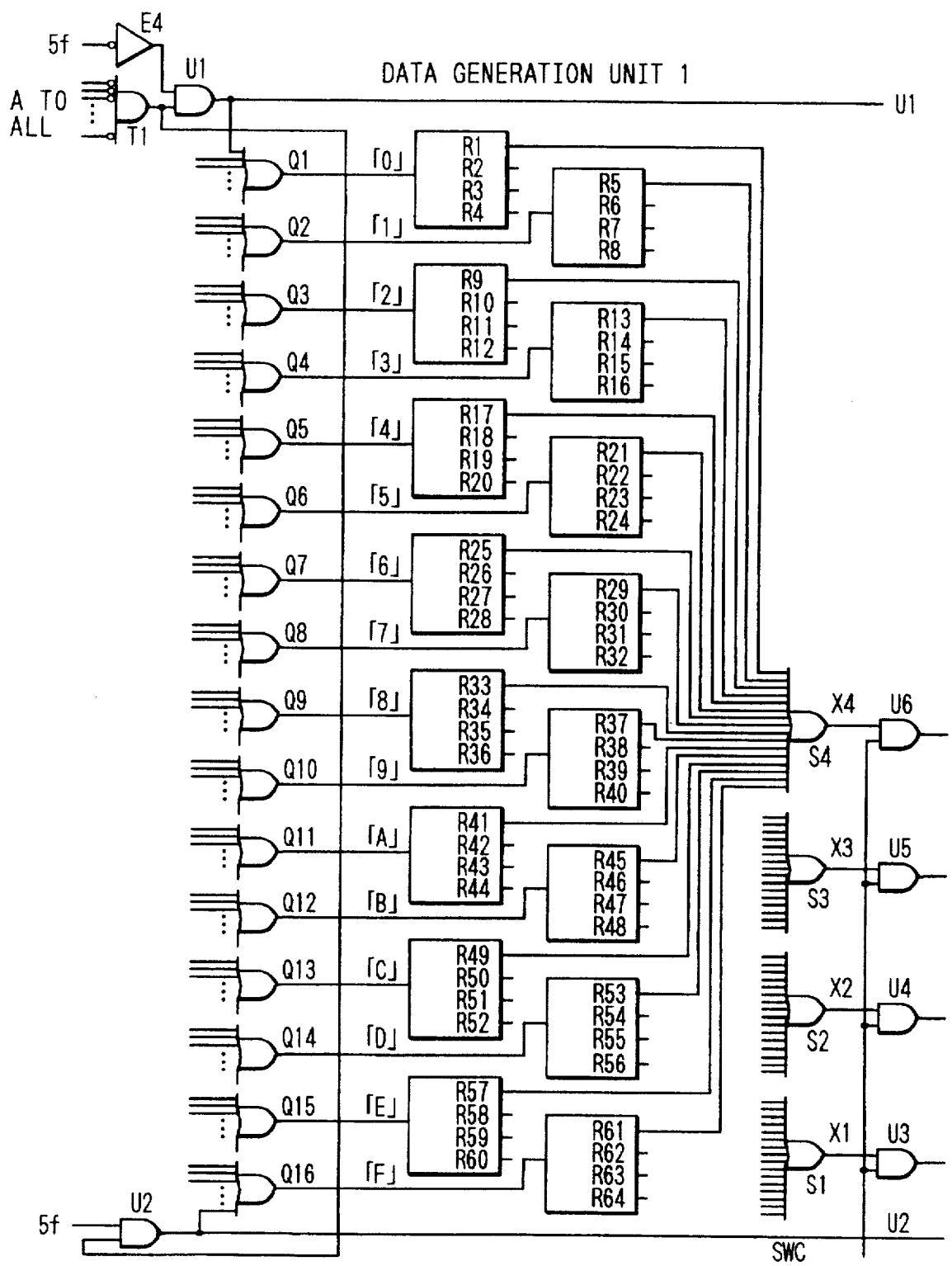
FIG. 20 is a circuit diagram showing in detail a data generation unit 1 shown in FIG. 19.
Figure 21:
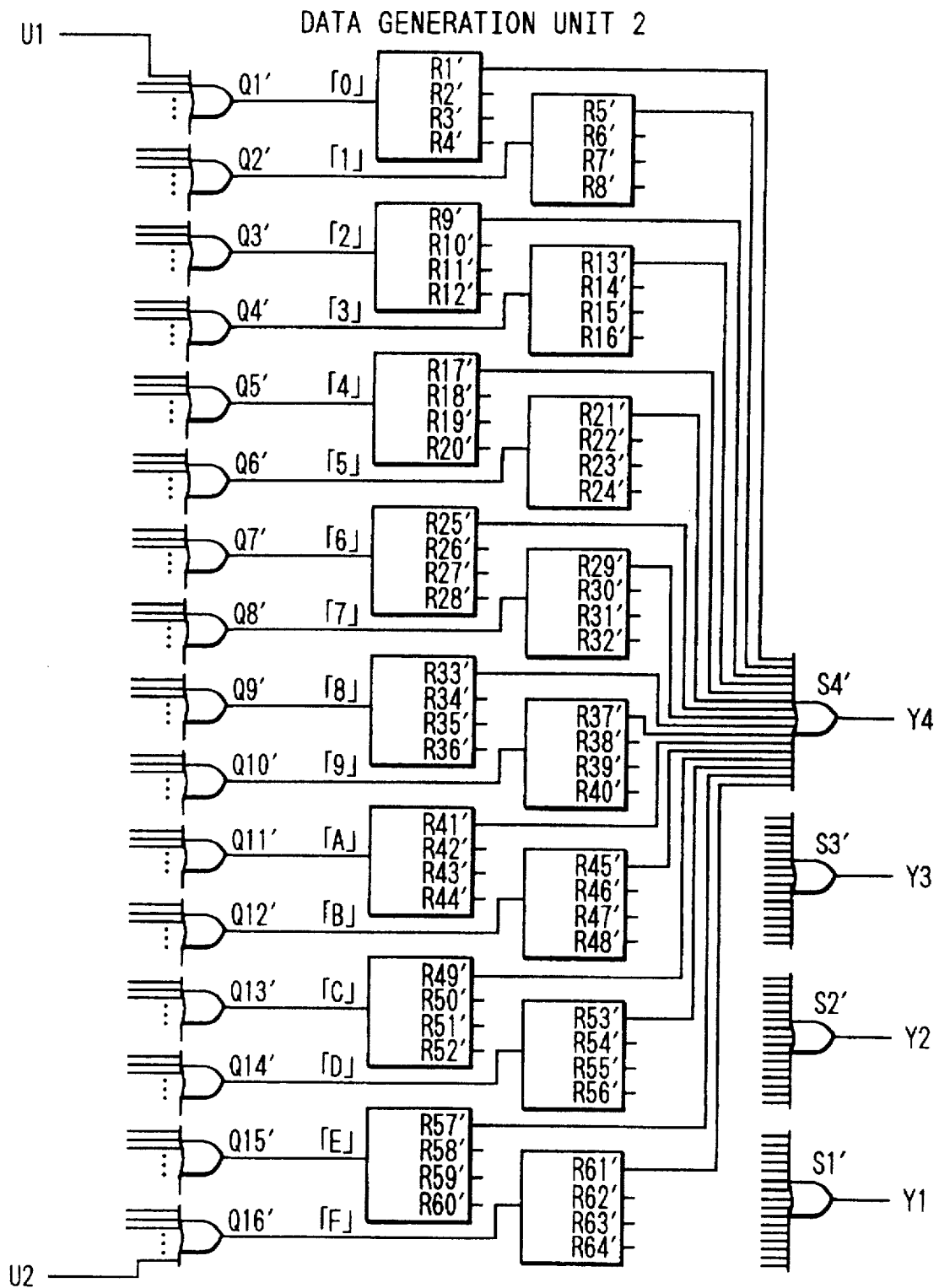
FIG. 21 is a circuit diagram showing in detail a data generation unit 2 shown in FIG. 19.

Of the processing circuit 43, the feature extraction circuit portion has the same circuits as the those shown in FIGS. 13, 14, and 29 to 32 described in the first embodiment. FIGS. 19 to 21 show a data generation circuit, used in this embodiment, of the processing circuit 43. The same reference numerals in FIGS. 19 to 21 denote the same devices as in FIGS. 15 and 16. FIG. 20 shows in detail a data generation unit 1 in FIG. 19, and FIG. 21 shows in detail a data generation unit 2 in FIG. 19.

FIGS. 19, 20, and 21 show a data generation circuit for generating data of the pixel 5f of interest in accordance with the detected features of the data string. The circuit shown in FIGS. 19 to 21 includes OR gates Q1 to Q16 and Q1' to Q16', 2-input AND gates R1 to R64, R1' to R64', U1, and U2, 16-input OR gates S1 to S4, S1' to S4', and S5 to S8, inverter circuits E4 and E18, and a NOR gate T1. When the first MDT signals described in FIG. 18 are to be generated, the control circuit 47 outputs the control signal SWC of "1" level. In this state, the data generation unit 1 is selected by 2-input AND gates U3 to U6 and U3' to U6', and 2-input OR gates S5 to S8, and signals x1, x2, x3, and x4 are output as the parallel signals. Also, when the second MDT signals described in FIG. 18 are to be generated, the control circuit 47 outputs the control signal SWC of "0" level. In this state, the data generation unit 2 is generated by the 2-input AND gates U3 to U6 and U3' to U6', and the 2-input OR gates S5 to S8, and signals y1, y2, y3, and y4 are output as the parallel signals.

Each of the output signals from the feature detection circuits corresponding to a plurality of patterns is connected to one of the OR gates Q1 to Q16 so as to select output data of the signals x1 to x4, and is also connected to one of the OR gates Q1' to Q16' so as to select data of the signals y1 to y4.

The output signals x1 to x4 from the data generation circuit are input to the known P/S conversion circuit 44 to generate a signal VDOM, which is output in the order of x1, x2, x3, and x4 in synchronism with clock signals VCK. Also, the output signals y1 to y4 from the data generation circuit are input to the P/S conversion circuit to generate a signal VDOM, which is output in the order of y1, y2, y3, and y4 in synchronism with clock signals VCK. These signals VDOM drive the semiconductor laser via the laser driver.

The above-mentioned algorithm can be similarly applied to the printer engine of 600 dots/inch.

The first pulse group including the outputs x1, x2, x3, and x4, and the outputs y1, y2, y3, and y4 is input to the pulse modulation circuit, and the pattern of data is verified. If the pattern of input data coincides with a predetermined pattern, the input data are replaced by data having a smaller modified pixel size than that of the input data, thereby changing the modified pixel size. For example, in this case, each pixel is replaced by pixels having a size as a fraction of that of the original pixel like x1→x1' and x1"; x2→x2' and x2"; x3→x3' and x3"; x4→x4' and x4"; y1→y1' and y1"; y2→y2' and y2"; y3→y3' and y3"; and y4→y4' and y4".

As described above, according to this embodiment, since the consumption amount of the toner can be freely controlled, a print mode for reducing print cost per page can be provided. In addition, since two or more modified pixel sizes are provided, a smoothing circuit can execute processing in correspondence with toners of different toner particle sizes. Furthermore, since only a circuit portion for determining a modified pixel size is realized as an IC separated from that of a pattern reference circuit portion, only the circuit portion for determining a modified pixel size, which requires a logic of a higher speed than the pattern reference circuit portion can be realized by a high-speed logic.

Since optimal algorithms are prepared in correspondence with different print resolutions, the algorithms can be switched upon switching of the print resolution.

Also, since a plurality of algorithms corresponding to different densities are prepared, the algorithms can be switched in correspondence with a change in density.

Furthermore, the temperature or humidity is detected, and a corresponding algorithm can be selected from a plurality of predetermined algorithms in accordance with the detected temperature or humidity.

As described above, this embodiment provides a technique which can compensate for the conventional drawbacks, and can control the consumption amount of the toner by controlling the print density, thus reducing print cost per page. Also, this embodiment provides the following technique. That is, the features of dot patterns in a wide area around a pixel of interest are extracted, the pixel of interest is modified in correspondence with the extracted features, an almost horizontal or vertical edge portion can be detected by a simplified logic circuit, and optimal smoothing correction can be performed in accordance with the curvature of the edge portion. Furthermore, since the modified pixel signal can be modified to another pixel signal, high-quality smoothing processing can be realized even when the type of toner, resolution, environment, and the like change.

As described above, this embodiment can provide an effective technique for saving the consumption amount of a toner, and can also provide an effective technique for realizing high-quality smoothing processing even when the consumption amount of the toner is to be saved.

As described above, according to the present invention, since the recording density is controlled by changing the modulation ratio of pulse-width or pulse-number modulation, image quality can be prevented from deteriorating by thin-out processing, and the signal ON period in one dot can be changed based on the pulse-width or pulse-number modulation by signal processing, thus stabilizing image quality.

According to the present invention, the image density can be lowered by suppressing the consumption amount of a toner per unit area, thus reducing print cost.

Also, according to the present invention, even when a print operation is performed while suppressing toner consumption, high image quality can be maintained without impairing the effect of smoothing processing.

The present invention has been described with reference to its preferred embodiments. However, the present invention is not limited to the above-mentioned embodiments, and various changes and modifications may be made within the scope of claims.

What is claimed is:

1. An information recording apparatus comprising:

input means for inputting an information signal;

smoothing processing means for, when the input information signal represents a predetermined pattern, executing smoothing processing of the information signal;

recording density change processing means for executing change processing of a recording density for an information signal of a pixel which is not subjected to the smoothing processing of said smoothing processing means; and recording means for recording an image on the basis of the information signals processed by said smoothing processing means and said recording density change processing means.

2. An apparatus according to claim 1, wherein said input means inputs the information signal transmitted from a controller for controlling said information recording apparatus.

3. An apparatus according to claim 1, wherein when a pattern represented by information signals of a plurality of pixels is an edge pattern, said smoothing processing means converts an information signal of one pixel into information signals of a plurality of areas.

4. An apparatus according to claim 2, wherein said recording density change processing means converts an information signal of one pixel into information signals of a plurality of areas, and controls the number of recording areas of the plurality of areas in accordance with a command from said controller.

5. An apparatus according to claim 1, wherein said recording means comprises modulation means for modulating a light beam in accordance with the information signals processed by said smoothing processing means and said recording density change processing means, scanning means for deflecting the light beam to scan a recording medium, and forming an electrostatic latent image on the recording medium, and developing means for visualizing the electrostatic latent image on the recording medium.

6. An information recording method comprising:

the input step of inputting an information signal;

the smoothing processing step of executing smoothing processing of an information signal when the input information signal represents a predetermined pattern;

the recording density change processing step of executing change processing of a recording density for an information signal of a pixel which is not subjected to the smoothing processing in the smoothing processing step; and the recording step of recording an image on the basis of the information signals processed in the smoothing processing step and the recording density change processing step.

7. A method according to claim 6, wherein the input step comprises the step of inputting the information signal transmitted from a controller for controlling an information recording apparatus.

8. A method according to claim 6, wherein the smoothing processing step comprises the step of converting an information signal of one pixel into information signals of a plurality of areas when a pattern represented by information signals of a plurality of pixels is an edge pattern.

9. A method according to claim 7, wherein the recording density change processing step comprises the step of converting an information signal of one pixel into information signals of a plurality of areas, and controlling the number of recording areas of the plurality of areas in accordance with a command from said controller.

10. A method according to claim 6, wherein the recording step comprises the modulation step of modulating a light beam in accordance with the information signals processed in the smoothing processing step and the recording density change processing step, the scanning step of deflecting the light beam to scan a recording medium, and forming an electrostatic latent image on the recording medium, and the developing step of visualizing the electrostatic latent image on the recording medium.

* * * * *

UNITED STATES PATENT AND TRADEMARK OFFICE
CERTIFICATE OF CORRECTION

PATENT NO. : 5,581,358

DATED : December 3, 1996

INVENTOR(S) : Kaoru Seto et al.

Page 1 of 2

It is certified that error appears in the above-identified patent and that said Letters Patent is hereby corrected as shown below:

<u>COLUMN 2</u>
  Line 42, "a" should be deleted.

<u>COLUMN 6</u>
  Line 14, "by" should read --by means of--.

<u>COLUMN 13</u>
  Line 23, "●" should read --O--;
  Line 24, "O" should read --●--;
  Line 27, "(●" should read --(O-- and "O" should read --●--;
  Line 40, ".detects" should read --detects--.

<u>COLUMN 14</u>
  Line 17, "output." should read --output--.

<u>COLUMN 15</u>
  Line 49 "2k =7b=" should read --2k=1 and 8a=7b=--.

<u>COLUMN 16</u>
  Line 3, "2k=8b=" should read --2k=1 and 8a=8b=--;
  Line 31, "2h=" should read --2h=3h--;
  Line 40, "6e=8d" should read --6e=7d=8d--.

<u>COLUMN 17</u>
  Line 4, "7j=0" should read --7j=7k=0--;

UNITED STATES PATENT AND TRADEMARK OFFICE
CERTIFICATE OF CORRECTION

PATENT NO. : 5,581,358

DATED : December 3, 1996

INVENTOR(S) : Kaoru Seto et al.

It is certified that error appears in the above-identified patent and that said Letters Patent is hereby corrected as shown below:

<u>COLUMN 17 (cont'd)</u>
  Line 5, "(●" should read --(O-- and "(O" should read --(●--;
  Line 39, "the." should read --the--.

<u>COLUMN 23</u>
  Line 34, "[<b>]x;1" should be deleted.

Signed and Sealed this

Twenty-sixth Day of August, 1997

BRUCE LEHMAN

*Attest:*

*Attesting Officer*     *Commissioner of Patents and Trademarks*